United States Patent [19]

Fujisaki et al.

[11] Patent Number: 5,361,330
[45] Date of Patent: Nov. 1, 1994

[54] IMAGE PROCESSING APPARATUS

[75] Inventors: Shigehisa Fujisaki, Fukuoka; Tadayuki Kajiwara, Chikushino; Yasuhiko Isobe, Kasuga; Takumi Shimokawa, Tosu; Yoshinori Senju, Saga; Masanobu Narazaki, Fukuoka; Tatsuya Yoshida, Fukuoka; Atsushi Wakiyama, Karatsu, all of Japan

[73] Assignee: Matsushita Electric Industrial Co., Ltd., Osaka, Japan

[21] Appl. No.: 864,769

[22] Filed: Apr. 7, 1992

[30] Foreign Application Priority Data

| Apr. 8, 1991 | [JP] | Japan | 3-075020 |
| Apr. 9, 1991 | [JP] | Japan | 3-076229 |
| Apr. 9, 1991 | [JP] | Japan | 3-076230 |
| Apr. 11, 1991 | [JP] | Japan | 3-079183 |
| Apr. 12, 1991 | [JP] | Japan | 3-079729 |
| Apr. 23, 1991 | [JP] | Japan | 3-092011 |
| Apr. 24, 1991 | [JP] | Japan | 3-094016 |

[51] Int. Cl.$^5$ .................................. G06F 15/62
[52] U.S. Cl. .................. 395/107; 395/118; 348/571
[58] Field of Search .............. 382/22, 54, 51; 358/160, 166; 395/107, 127, 118, 101, 133, 134; 345/136, 189

[56] References Cited

U.S. PATENT DOCUMENTS

| 4,321,610 | 3/1982 | Moore et al. |
| 4,815,010 | 3/1989 | O'Donnell | 364/521 |
| 4,819,189 | 4/1989 | Kikuchi et al. | 364/521 |
| 4,847,641 | 7/1989 | Tung | 346/154 |
| 5,029,108 | 7/1991 | Lung |
| 5,081,689 | 1/1992 | Meyer et al. | 382/22 |

FOREIGN PATENT DOCUMENTS 0162259 11/1985 European Pat. Off.
0199502 10/1986 European Pat. Off.

Primary Examiner—Robert L. Richardson
Attorney, Agent, or Firm—Lowe, Price, LeBlanc & Becker

[57] ABSTRACT

An image processing apparatus includes a window setting device for setting a portion of a written region of an image composed of dots in an orthogonal matrix as a window, and for moving the set portion within the written region. A first edge detecting device serves to detect differences between image data of a given dot in the window set by the window setting device and image data of dots neighboring the given dot, and serves to detect directions of the detected differences. A second edge detecting device serves to detect edges between neighboring dots other than the given dot, the detected edges relating to image data differences and image data difference directions respectively equal to the image data differences and the image data difference directions detected by the first edge detecting device. A calculating device serves to provide the edges, detected by the second edge detecting device, with predetermined coefficients respectively, and serves to add the predetermined coefficients for the edges detected by the second edge detecting device to calculate a sum of the predetermined coefficients. A signal generating device serves to generate an image signal which varies a size of the given dot in accordance with the sum of the predetermined coefficients which is calculated by the calculating device.

14 Claims, 41 Drawing Sheets

FIG. 19

|   | 1 | 2 | 3 | 4 | 5 | 6 | 7 |
|---|---|---|---|---|---|---|---|
| A |   |   |   | ② | ① |   |   |
| B |   |   | ① | ② | ① | ① |   |
| C |   |   |   | ④ | ① |   |   |
| D |   |   |   |   | ① |   |   |
| E |   |   |   | ④ | ① |   |   |
| F |   |   | ① | ② | ① | ① |   |
| G |   |   |   | ② | ① |   |   |

|   | 1 | 2 | 3 | 4 | 5 | 6 | 7 |
|---|---|---|---|---|---|---|---|
| A |   |   |   | ① | ② |   |   |
| B |   |   | ① | ① | ② | ① |   |
| C |   |   |   | ① | ④ |   |   |
| D |   |   |   | ① |   |   |   |
| E |   |   |   | ① | ④ |   |   |
| F |   |   | ① | ① | ② | ① |   |
| G |   |   |   | ① | ② |   |   |

IMAGE PROCESSING APPARATUS

BACKGROUND OF THE INVENTION

1. Field of the Invention

This invention relates to an image processing apparatus usable in various image handling equipments such as dot matrix printers or laser beam printers.

2. Description of the Prior Art

Recently, dot matrix printers or laser beam printers have been widely used. U.S. Pat. No. 4,847,641 discloses piecewise print image enhancement for dot matrix printers.

In an apparatus of U.S. Pat. No. 4,847,641, a print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this way, all bits in a desired bit map, or set of bit maps, are examined and their corresponding laser drive signals are modified to compensate for the errors associated with the matched templates in a piece-wise manner.

The print image enhancement techniques disclosed in U.S. Pat. No. 4,847,641 have the following problem. A large number of templates is necessary for good and reliable enhancement. Thus, the matching network for comparing the sample window bit pattern with the templates tends to be complicated in structure.

SUMMARY OF THE INVENTION

It is an object of this invention to provide an improved image processing apparatus.

A first aspect of this invention provides an image processing apparatus comprising window setting means for setting a portion of a written region of an image composed of dots in an orthogonal matrix as a window, and for moving the set portion within the written region; first edge detecting means for detecting differences between image data of a given dot in the window set by the window setting means and image data of dots neighboring said given dot, and for detecting directions of said detected differences; second edge detecting means for detecting edges between neighboring dots other than said given dot, said detected edges relating to image data differences and image data difference directions respectively equal to the image data differences and the image data difference directions detected by said first edge detecting means; calculating means for providing said edges, detected by said second edge detecting means, with predetermined coefficients respectively, and for adding said predetermined coefficients for said edges detected by said second edge detecting means to calculate a sum of said predetermined coefficients; and signal generating means for generating an image signal which varies a size of said given dot in accordance with the sum of the predetermined coefficients which is calculated by said calculating means.

A second aspect of this invention provides an image processing apparatus comprising window setting means for setting a portion of a written region of an image composed of dots in an orthogonal matrix as a window, and for moving the set portion within the written region; first edge detecting means for detecting differences between image data of a given dot in the window set by the window setting means and image data of dots neighboring said given dot, and for detecting directions of said detected differences; second edge detecting means for detecting edges between neighboring dots other than said given dot, said detected edges relating to image data differences and image data difference directions respectively equal to the image data differences and the image data difference directions detected by said first edge detecting means; weighting means for setting predetermined values with respect to said edges detected by said second edge detecting means respectively, said predetermined values depending on positions of the related edges relative to a position of an edge corresponding to the image data differences and the image data difference directions detected by said first edge detecting means; calculating means for adding said predetermined values set by said weighting means to calculate a sum of said predetermined values; and signal generating means for generating an image signal which varies a size of said given dot in accordance with the sum of the predetermined values which is calculated by said calculating means.

A third aspect of this invention provides an image processing apparatus comprising window setting means for setting a portion of a written region of an image composed of dots in an orthogonal matrix as a window, and for moving the set portion within the written region; first edge detecting means for detecting differences between image data of a given dot in the window set by the window setting means and image data of dots neighboring said given dot, and for detecting directions of said detected differences; second edge detecting means for detecting edges between neighboring dots other than said given dot, said detected edges related to image data differences and image data difference directions respectively equal to the image data differences and the image data difference directions detected by said first edge detecting means; weighting means for setting predetermined values with respect to said edges detected by said second edge detecting means respectively, said predetermined values depending on positions of the related edges relative to a position of an edge corresponding to the image data differences and the image data difference directions detected by said first edge detecting means, said predetermined values increasing as the positions of the related edges, which lie on extensions of an inter-dot boundary opposite the edge detected by said first edge detecting means, are closer to said given dot; calculating means for adding said predetermined values set by said weighting means to calculate a sum of said predetermined values; and signal generating means for generating an image signal which varies a size of said given dot in accordance with the sum of the predetermined values which is calculated by said calculating means.

A fourth aspect of this invention provides an apparatus for processing bi-state pixel-corresponding signals, wherein an image is composed of an array of bi-state pixels represented by the bi-state pixel-corresponding signals respectively, wherein an edge is defined as a boundary between pixels which are represented by bi-state pixel-corresponding signals having different states respectively, and wherein the bi-state pixels are classified into a pixel of interest and pixels of non-interest which surround the pixel of interest, the apparatus comprising first detecting means for detecting whether or not a first edge adjoining the pixel of interest is present; selecting means for selecting boundaries between pixels of non-interest, the selected boundaries extending in positions having predetermined relations with a position of the first edge detected by the first detecting means; second detecting means for, when the first detecting means detects that a first edge adjoining the pixel of interest is present, detecting second edges extending at the boundaries selected by the selecting means; calculating means for calculating a number of the second edges detected by the second detecting means; means for converting the bi-state pixel-corresponding signal representing the pixel of interest into an analog signal; and means for correcting the analog signal in accordance with the number of the second edges which is calculated by the calculating means.

A fifth aspect of this invention provides an apparatus for processing bi-state pixel-corresponding signals, wherein an image is composed of an array of bi-state pixels represented by the bi-state pixel-corresponding signals respectively, wherein an edge is defined as a boundary between pixels which are represented by bi-state pixel-corresponding signals having different states respectively, and wherein the bi-state pixels are classified into a pixel of interest and pixels of non-interest which surrounds the pixel of interest, the apparatus comprising first detecting means for detecting whether or not a first edge adjoining the pixel of interest is present; selecting means for selecting boundaries between pixels of non-interest, the selected boundaries extending in positions having predetermined relations with a position of the first edge detected by the first detecting means; second detecting means for, when the first detecting means detects that a first edge adjoining the pixel of interest is present, detecting second edges extending at the boundaries selected by the selecting means; weighting means for providing a weight value to the first edge detected by the first detecting means, and for providing weight values to the second edges detected by the second detecting means respectively, wherein the weight values of the second edges are varied as a function of the positions of the second edges relative to the position of the first edge detected by the first detecting means; calculating means for calculating a sum of the weight values of the first and second edges which are provided by the weighting means; means for converting the bi-state pixel-corresponding signal representing the pixel of interest into an analog signal; and means for correcting the analog signal in accordance with the sum which is calculated by the calculating means.

BRIEF DESCRIPTION OF THE DRAWINGS

FIG. 19 is a diagram illustrating a first example of the positions of considered edges and the weights of the edges in the sample window.

FIG. 20 is a diagram illustrating a second example of the positions of considered edges and the weights of the edges in the sample window.

FIG. 21 is a diagram illustrating a third example of the positions of considered edges and the weights of the edges in the sample window.

FIG. 22 is a diagram illustrating a fourth example of the positions of considered edges and the weights of the edges in the sample window.

FIG. 23 is a diagram illustrating a first example of an image in the sample window.

FIG. 24 is a diagram illustrating a second example of an image in the sample window.

FIG. 31 is a diagram illustrating a fifth example of an image in the sample window.

FIG. 32 is a diagram illustrating a sixth example of an image in the sample window.

FIG. 34 is a diagram illustrating a seventh example of an image in the sample window.

FIG. 35 is a diagram illustrating an eighth example of an image in the sample window.

DESCRIPTION OF THE FIRST PREFERRED EMBODIMENT

Figure 6:
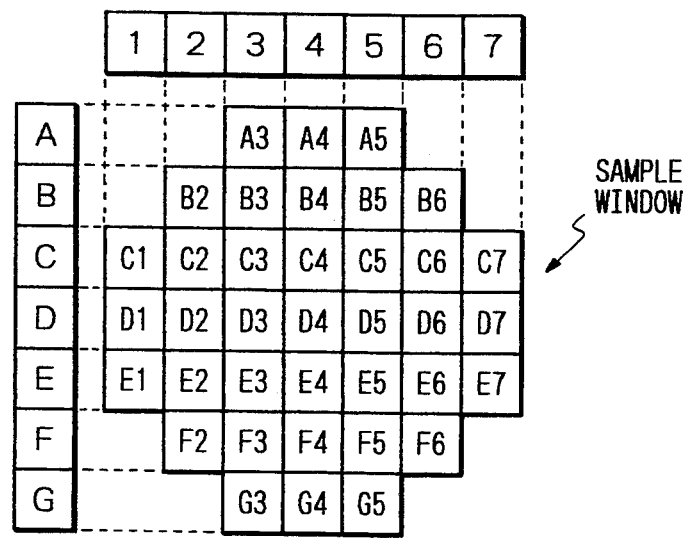
FIG. 6 is a diagram showing the sample window used in the correction circuit of FIG. 5.

An image processing apparatus according to a first embodiment of this invention will be briefly described hereinafter. An image is composed of an array of bi-state pixels represented by bi-state pixel-corresponding signals respectively. A sample window is composed of bi-state pixel-corresponding signals representing a given number of neighboring pixels. Specifically, as shown in FIG. 6, the sample window corresponds to a group of neighboring pixels A3-A5, B2-B6, C1-C7, D1-D7, E1-E7, F2-F6, and G3-G5. The sample window has a shape which is approximately symmetrical with respect to the central pixel D4. During a scanning process, the sample window is moved relative to the image while one of the bi-state pixel-corresponding signals is sequentially selected as corresponding to the central pixel D4 of the sample window.

An edge is defined as a boundary between pixels which are represented by bi-state pixel-corresponding signals having different states respectively. Thus, an edge corresponds to a signal-state change. Edges are classified into horizontal edges and vertical edges. The horizontal edges extend in a horizontal direction, for example, a main scanning direction. The vertical edges extend in a vertical direction, for example, a sub scanning direction. Furthermore, horizontal edges are classified into first and second types. Horizontal edges of the first type correspond to a signal-state change from "1" to "0", for example, from "black" to "white", in the sub scanning direction. Horizontal edges of the second type correspond to a signal-state change from "0" to "1", for example, from "white" to "black", in the sub scanning direction. Also, vertical edges are classified into first and second types. Vertical edges of the first type correspond to a signal-state change from "1" to "0", for example, from "black" to "white", in the main scanning direction. Vertical edges of the second type correspond to a signal-state change from "0" to "1", for example, from "white" to "black", in the main scanning direction.

An upper horizontal edge, a lower horizontal edge, a right-hand vertical edge, and a left-hand vertical edge which adjoin the central pixel D4 are referred to as an upper central edge, a lower central edge, a right-hand central edge, and a left-hand central edge respectively. In the sample window, edges between pixels other than the central pixel D4 are referred to out-center edges.

Figures 21, 22:
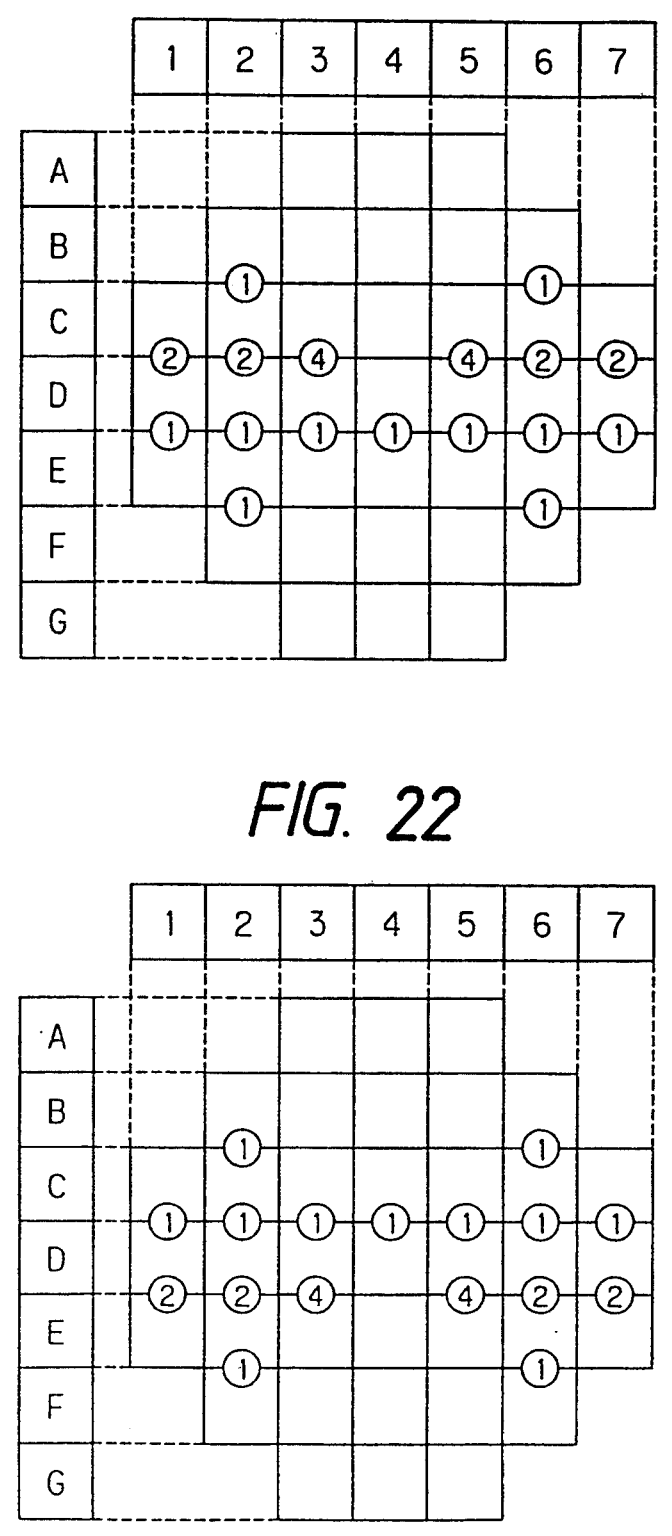

The image processing apparatus includes a first detecting device which serves to detect an upper central edge, a lower central edge, a right-hand central edge, and a left-hand central edge. The image processing apparatus includes a selecting device. When the first detecting device detects a right-hand central edge, the selecting device selects boundaries between pixels other than the central pixel. In FIG. 19, circles denote the boundaries selected by the selecting device in this case. As shown in FIG. 19, the selected boundaries extend in the sample window and have a predetermined arrangement relative to the right-hand central edge. Specifically, the selected boundaries extend in positions have predetermined relations with the position of the right-hand central edge. When the first detecting device detects a left-hand central edge, the selecting device selects boundaries between pixels other than the central pixel. In FIG. 20, circles denote the boundaries selected by the selecting device in this case. As shown in FIG. 20, the selected boundaries extend in the sample window and have a predetermined arrangement relative to the left-hand central edge. Specifically, the selected boundaries extend in positions have predetermined relations with the position of the left-hand central edge. When the first detecting device detects a lower central edge, the selecting device selects boundaries between pixels other than the central pixel. In FIG. 21, circles denote the boundaries selected by the selecting device in this case. As shown in FIG. 21, the selected boundaries extend in the sample window and have a predetermined arrangement relative to the lower central edge. Specifically, the selected boundaries extend In positions have predetermined relations with the position of the lower central edge. When the first detecting device detects an upper central edge, the selecting device selects boundaries between pixels other than the central pixel. In FIG. 22, circles denote the boundaries selected by the selecting device in this case. As shown in FIG. 22, the selected boundaries extend in the sample window and have a predetermined arrangement relative to the upper central edge. Specifically, the selected boundaries extend in positions have predetermined relations with the position of the upper central edge.

The image processing apparatus includes a second detecting device which serves to detect out-center edges being of a type equal to a type of the central edge detected by the first detecting device and extending at the boundaries selected by the selecting device in accordance with the central edge detected by the first detecting device. The image processing apparatus includes a weighting device which serves to provide a predetermined weight value to the central edge detected by the first detecting device, and to provide predetermined weight values to the out-center edges detected by the second detecting device respectively. In FIGS. 19-22, the numerals in the circles denote the weight values of a central edge and out-center edges. As shown in FIGS. 19-22, the weight values of the out-center edges are varied as a function of the positions of the out-center edges relative to the position of the central edge. The image processing apparatus includes a calculating device which serves to add the weight values of the central edge and the out-center edges detected by the first and second detecting devices. The image processing apparatus includes a converting device which serves to convert the bi-state pixel-corresponding signal representing the central pixel D4 into an analog signal. The image processing apparatus includes a correcting device which serves to correct the analog signal in accordance with a result of the addition executed by the calculating device. For example, the analog signal has a pulse of a width which is corrected in accordance with the result of the addition executed by the calculating device, and the analog signal is converted by a printing device into a visible pixel having a black or white portion of a size determined in accordance with the result of the addition executed by the calculating device.

Figure 1:
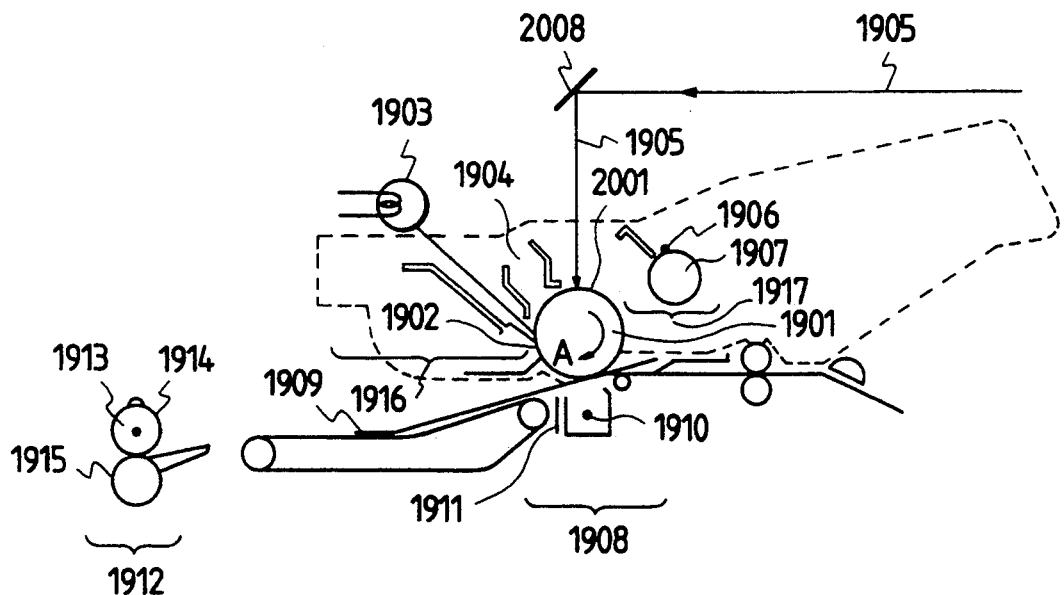
FIG. 1 is a diagram of an electrophotographic printing machine.
Figure 2:
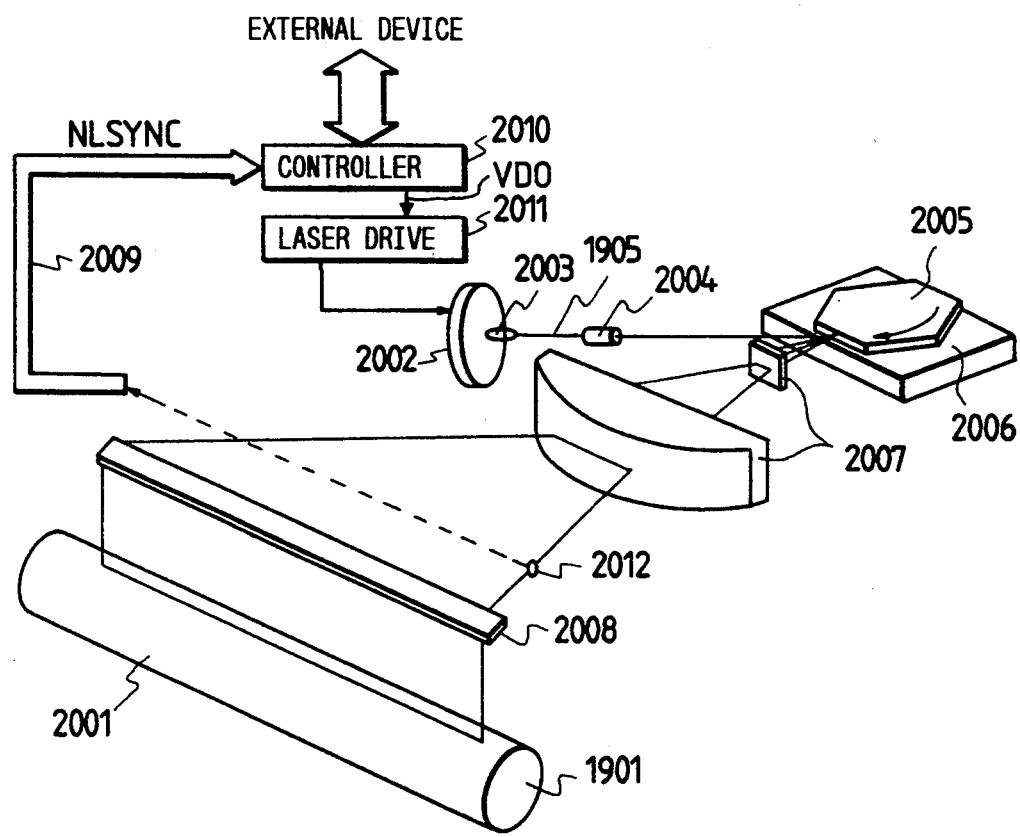
FIG. 2 is a diagram illustrating the solid state laser apparatus and the associated control circuitry for producing a scanning laser beam for the machine of FIG. 1.
Figure 3:
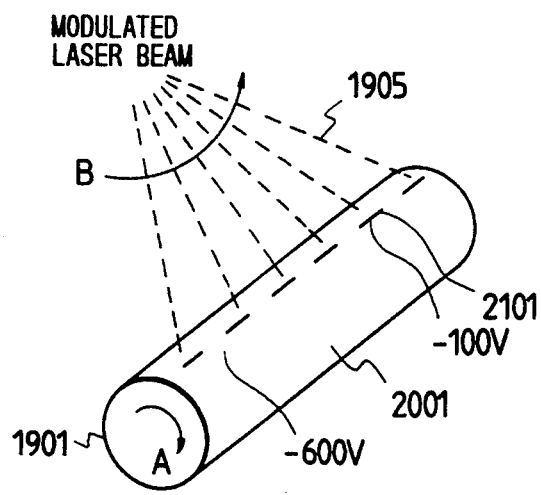
FIG. 3 is a diagram illustrating the writing process on a photosensitive drum for the machine of FIG. 1.

The first embodiment of this invention will be described in detail hereinafter. With reference to FIGS. 1, 2, and 3, an electrophotographic laser beam printing machine includes a photosensitive drum 1901 which is driven by a motor (not shown) in a direction "A". The drum 1901 is a metal cylinder, such as extruded aluminum, typically coated with a layer of organic photoconductive material. During the printing process, the drum 1901 is constantly rotating and may make several complete rotations per printed page. Prior to forming the image for a given section of print, the electrostatic surface 2001 of the drum 1901 is physically and electrostatically cleaned to execute the preparation for holding the desired electrostatic image. Physical cleaning is accomplished by a rubber cleaning blade 1902 which scrapes any toner remaining from a previous cycle off the drum 1901 and into a debris cavity (not shown). The drum 1901 is then electrostatically cleaned by erase lamps 1903 which illuminate the photosensitive material of the drum 1901 to neutralize any electrical charges which may have previously been on the drum 1901. The cleaned surface 2001 of the electrostatic drum 1901 is then conditioned by the application of a uniform negative charge. The rotating drum 1901 passes the photosensitive material through an ionized region created by a charge corona generator 1904 in which negative charges migrate from the corona generator 1904 to the surface 2001 of the drum 1901. After rotating past the charge corona generator 1904, the drum 1901 has a uniform negative 600-volt potential on its surface 2001. During a writing process, a laser beam 1905 is utilized to discharge the drum surface potential in selected areas by focusing the laser light on selected portions of the photoconductive drum surface 2001. In this manner, an electrostatic image is created which will be later developed into a visible image and transferred to the print media.

The laser beam 1905 is produced by a solid state laser (for example, a semiconductor laser) 2002 which is turned on and off by simply supplying or denying power. The laser light 1905 produced by the solid state laser 2002 is collimated into a well-defined beam by collimator lens 2003 and focused onto a scanning mirror 2005 by cylindrical lens 2004. The scanning mirror 2005 is a six-sided rotating polygon mirror which is rotated at a constant speed by the scanner motor 2006. As the scanning mirror 2005 rotates, the laser beam 1905 sweeps in an arching direction as indicated by the arrow "B". The sweeping laser beam 1905 is focused on a horizontal line 2101 on the photosensitive surface 2001 of the drum 1901 by focusing lenses 2007 and a mirror 2008.

As the laser beam 1905 sweeps the length of the drum 1901 in the direction "B" and because the drum 1901 is rotating in the direction "A", the entire surface 2001 of the drum 1901 is covered with a raster image. The speed of the scanner motor 2006 rotating the scanning mirror 2005 and the speed of a main motor (not shown) rotating the drum 1901 are synchronized so that each successive sweep of the laser beam 1905 is offset on the surface of the drum 1901 by 1/300 of an inch. The laser 2002 can also be turned on and off, thereby modulating the laser beam 1905 at such a rate as to place a dot of light every 1/300 of an inch in the horizontal direction along the line 2101, thereby achieving a 300 by 300 dots per inch (dpi) resolution.

At the beginning of each sweep prior to the laser beam 1905 reaching the drum 1901, the laser beam 1905 is reflected off a beam detector mirror 2012 into an optical fiber 2009. This momentary pulse of light is transmitted though the optical fiber 2009 to a controller 2010 where it is converted to an electrical signal used to synchronize the output of data for one sweep (scan line) with the rest of the data and for other printer control and test functions.

After the writing process, the drum 1901 has an invisible electrostatic latent image on its photosensitive surface 2001. The portions of the drum surface 2001 that were not exposed to the laser beam 1905 are still at the negative 600-volt potential, but those portions exposed to the laser light 1905 have now been discharged to approximately negative 100 volts. After the writing process, the electrostatic image is developed into a visible image on the drum surface 2001.

At a developing station 1917, developing material called toner 1906 is placed on the electrostatic image. The toner material is a powdery substance made of black plastic resin bound to iron particles. The iron in the toner 1906 causes an attraction of the toner 1906 to a metallic rotating cylinder 1907 having a permanent magnet (not shown) which extends along the length of the cylinder 1907. The plastic toner particles 1906 obtain negative surface charges by rubbing against the cylinder 1907 which is connected to a negative DC supply (not shown). This electrostatic charges obtained by the toner are such that the toner particles 1906 are attracted to the areas of the drum surface 2001 which have been exposed to the laser light 1905, and are repelled from the surface areas not exposed thereto.

At a transfer station 1908, the toner image on the drum surface 2001 is transferred to a print paper 1909. The print paper 1909, which is travelling at the same speed as that of the surface of the drum 1901, contacts the surface of the drum 1901. A corona assembly 1910 produces positive charges which deposit on the back surface of the paper 1909. The stronger positive charges on the paper 1909 pull the negatively charged toner particles 1906 off the surface of the drum 1901. A static charge eliminator 1911 weakens the attractive forces between the negatively charged drum surface 2001 and the positively charged paper 1909 to prevent the paper 1909 from wrapping around the drum 1901. The print paper 1909 moves from the transfer station 1908 to a fusing station 1912, and the drum 1901 rotates to a cleaning station 1916 to execute the preparation for receiving the next section of print.

At the fusing station 1912, the toner 1906 is melted and forced into the print paper 1909 by heat and pressure to produce a permanent printed image. The fusing station 1912 includes a nonstick heat roller (fusing roller) 1914 which is heated internally by a high intensity lamp 1913. The fusing station 1912 also includes a soft pressure roller 1915 which slightly compresses when a pressure is applied to provide a large contact area between the paper 1909 and the upper heat roller 1914. When the print paper 1909 passes through the region between the heat roller 1914 and the pressure roller 1915, the toner 1906 deposited on the paper 1909 is melted and squeezed into the paper fibers.

The controller 2010 includes a central processing unit (CPU), a read only memory (ROM) for storing the dot patterns or bit map images of desired character sets, a ROM cartridge for storing additional bit map image data, a read/write memory (dynamic random access memory, DRAM) for storing coded image data fed from an external device such as a personal computer, and a block for controlling a printer engine. The controller 2010 receives print data from the external device and converts the print data into bit map image data, and further converts the bit map image data into an image dot signal for driving a laser driver 2011. The controller 2010 outputs the image dot signal of a serial form to the laser driver 2011. The laser driver 2011 drives the solid state laser 2002 in accordance with the image dot signal fed from the controller 2010, and thereby modulates the laser beam which is applied to the drum surface 2001.

Figure 4:
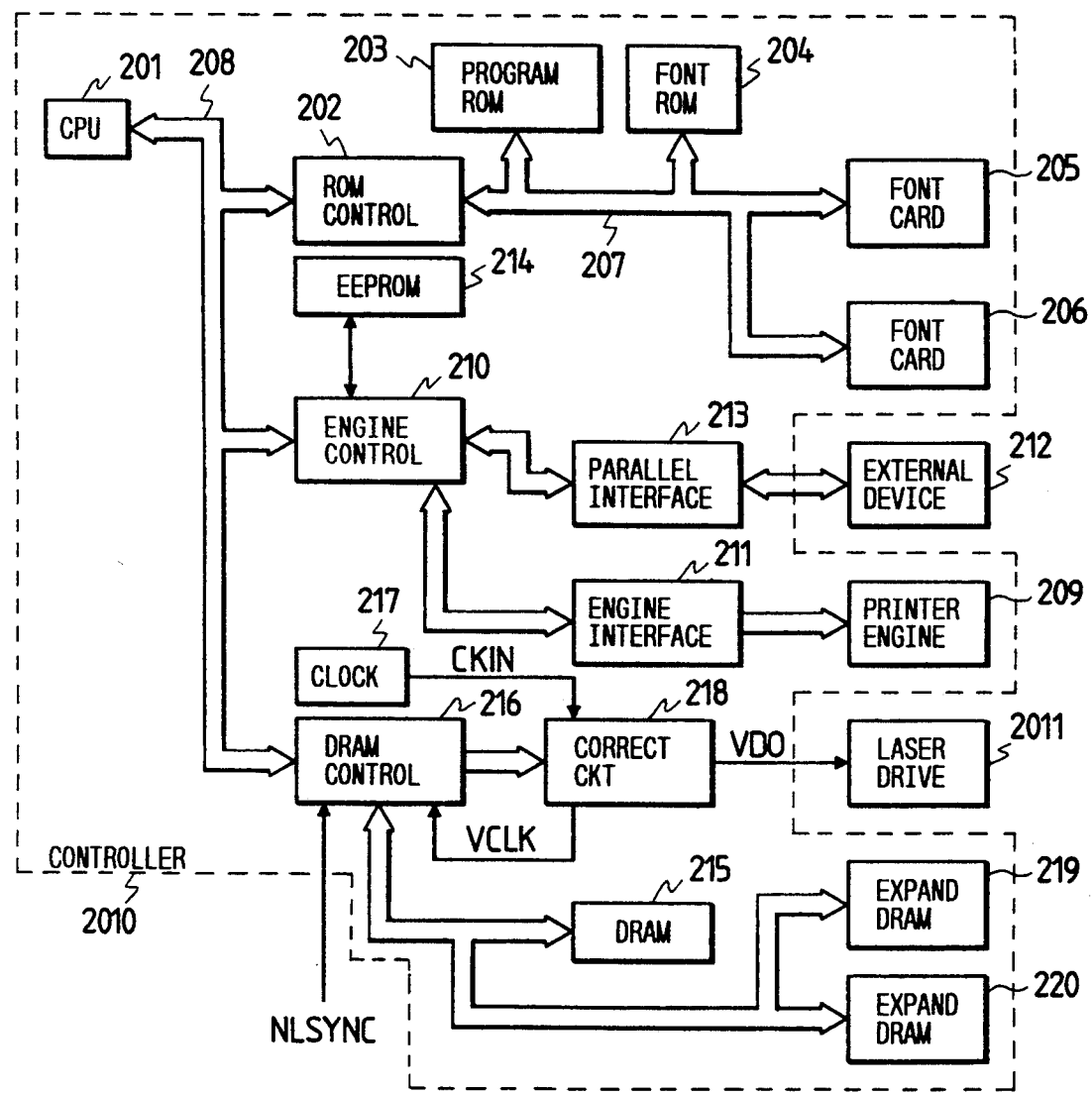
FIG. 4 is a block diagram of the controller of FIG. 2.

As shown in FIG. 4, the controller 2010 includes a CPU 201 for controlling the operation thereof. The controller 2010 also includes a ROM controller 202, a program ROM 203 for storing data of programs to be executed by the CPU 201, a font ROM 204 for bit map pattern data of printer character fonts, and font cards 205 and 206 for storing bit map data of optional character fonts. The ROM controller 202 reads out the program data, the bit map pattern data of the printer character fonts, and the bit map data of the optional character fonts from the devices 203–206 in accordance with address information fed from the CPU 201, and outputs the readout data to a main data bus 208. The font cards 205 and 206 include connector-in ROM cards respectively. A printer engine 209 including a control panel (not shown) forms a system related to an image printing process. An engine controller 210 controls the printer engine 209 and reads out data from the printer engine 209 via an engine interface 211 in accordance with address information and data fed from the CPU 201. The engine controller 210 receives the coded image data from the external device 212 via a parallel interface 213. An electric erasable programmable ROM (EEPROM) 214 is provided to store information, such as print status and page count, which is fed from the control panel within the printer engine 209. The engine controller 210 executes reading and writing information from and into the EEPROM 214 in accordance with address information fed from the CPU 201. A DRAM 215 serves to store the coded image data inputted from the external device 212, the bit map data of the character fonts, and other data. A DRAM controller 216 generates DRAM address information and timing signals necessary for reading out data from the DRAM 215 in accordance with address information fed from the CPU 201, and executes the data access to the DRAM 215. In addition, the DRAM controller 216 executes the refreshment of data in the DRAM 215 and the mediation in the main data bus 208. The DRAM controller 216 receives the parallel image data from the DRAM 215, and converts the received parallel image data into corresponding serial image data. The DRAM controller 216 outputs the serial image data to a correction circuit 218 as bit map image data in synchronism with a video data sync signal VCLK fed from the correction circuit 218. The correction circuit 218 generates the video data sync signal VCLK by frequency-dividing the output signal from a clock generator 217. The DRAM controller 216 has the function of shifting the image data to overlap or offset images in accordance with information fed from the external device 212 or the control panel within the printer engine 209. The memory area provided by the DRAM 215 can be expanded by extension DRAMs 219 and 220.

The correction circuit 218 receives the bit map image data from the DRAM controller 216 in synchronism with the video data sync signal VCLK, and converts the received bit map image data into an image dot signal for driving the laser driver 2011. The correction circuit 218 corrects the image dot signal to enhance a print quality, and outputs a corrected image dot signal (the resultant of the correction) VDO to the laser driver 2011. During the process of converting an analog character into a digital bit map image, the correction decreases a step-like image distortion and a print quality deterioration which might be caused by a low resolution of the bit map image and a low rate of sampling the analog image.

Figure 5:
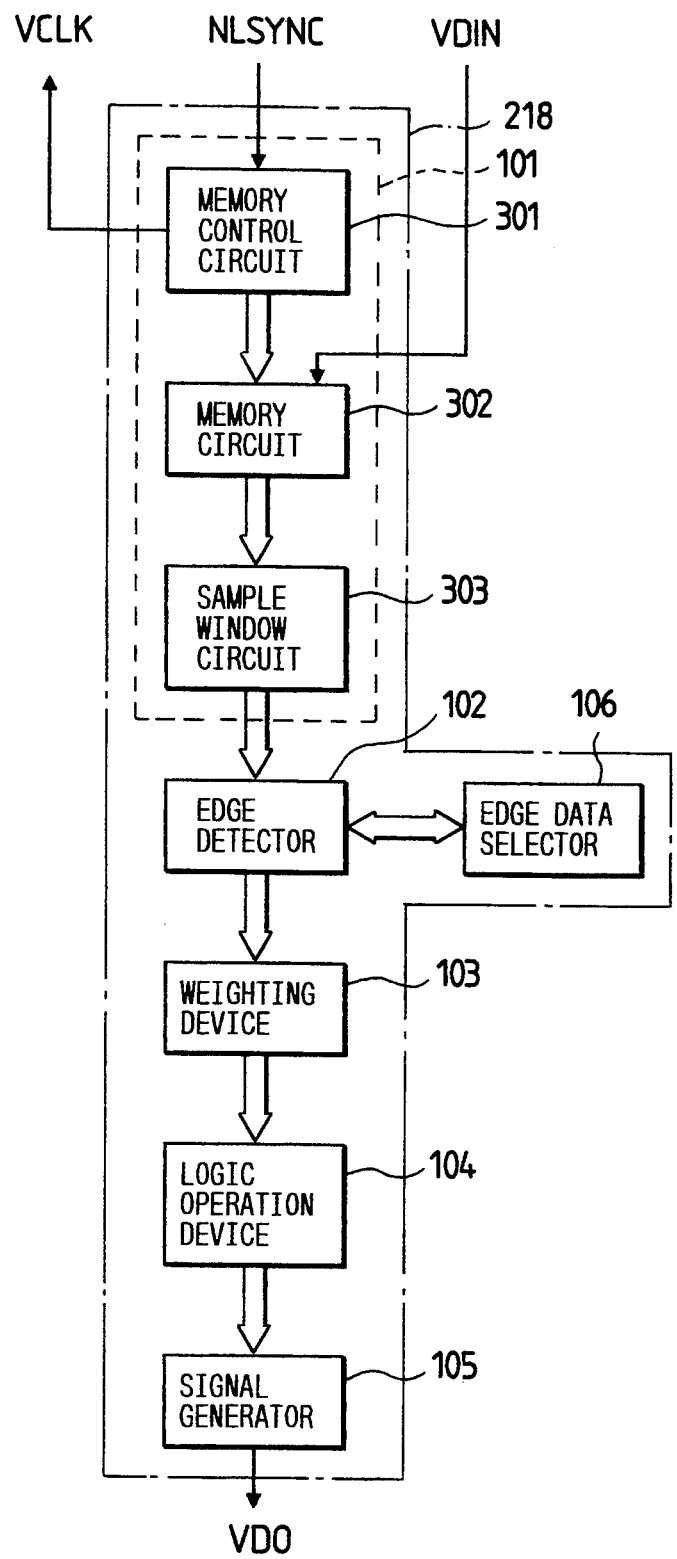
FIG. 5 is a block diagram of the correction circuit in FIG. 4 which is based on a first embodiment of this invention.

As shown in FIG. 5, the correction circuit 218 includes a temporary memory device 101. The temporary memory device 101 has shift registers composing a sample window circuit. The bit map image data is sequentially stored into the shift registers, and the window circuit samples a given number of window bits of the bit map image data which are composed of a bit of interest (a central bit) and other neighboring bits. As will be made clear data, image information of the central bit is corrected in accordance with conditions of data in the sample window.

As shown in FIG. 6, the sample window is composed of bits in 7 adjacent rows and 7 adjacent columns. Specifically, the sample window is composed of bits A3-A5, B2-B6, C1-C7, D1-D7, E1-E7, F2-F6, and G3-G5. The central bit D4 is an object subjected to the correction process.

As shown in FIG. 5, the temporary memory device 101 includes a memory control circuit 301, a memory circuit 302, and a sample window circuit 303. The memory control circuit 301 generates control signals and address signals necessary for reading and writing data from and into the memory circuit 302. The memory circuit 302 includes a high-speed static RAM (SRAM) and flip-flops. The video signal VDIN, that is, the serial-form bit map image data, is written into and read from the memory circuit 302 in accordance with the control signals and the address signals outputted from the memory control circuit 301. The sample window circuit 303 includes shift registers for storing the output data from the memory circuit 302 and outputting a signal representative of the sample pattern.

Figure 7:
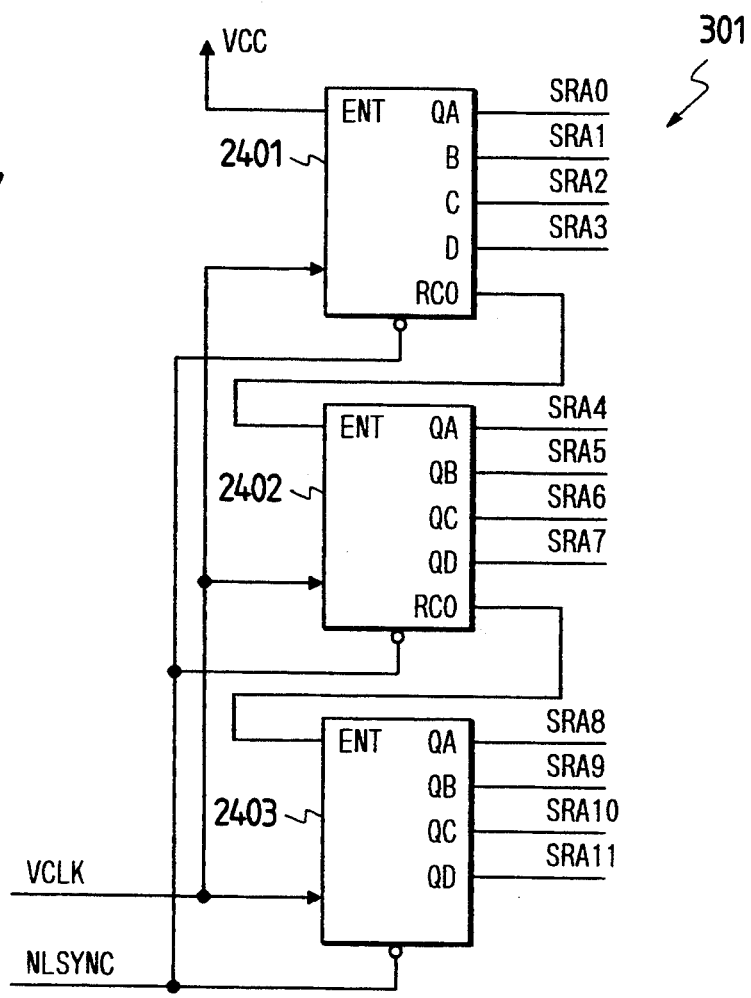
FIG. 7 is a block diagram of the memory control circuit of FIG. 5.
Figure 8:
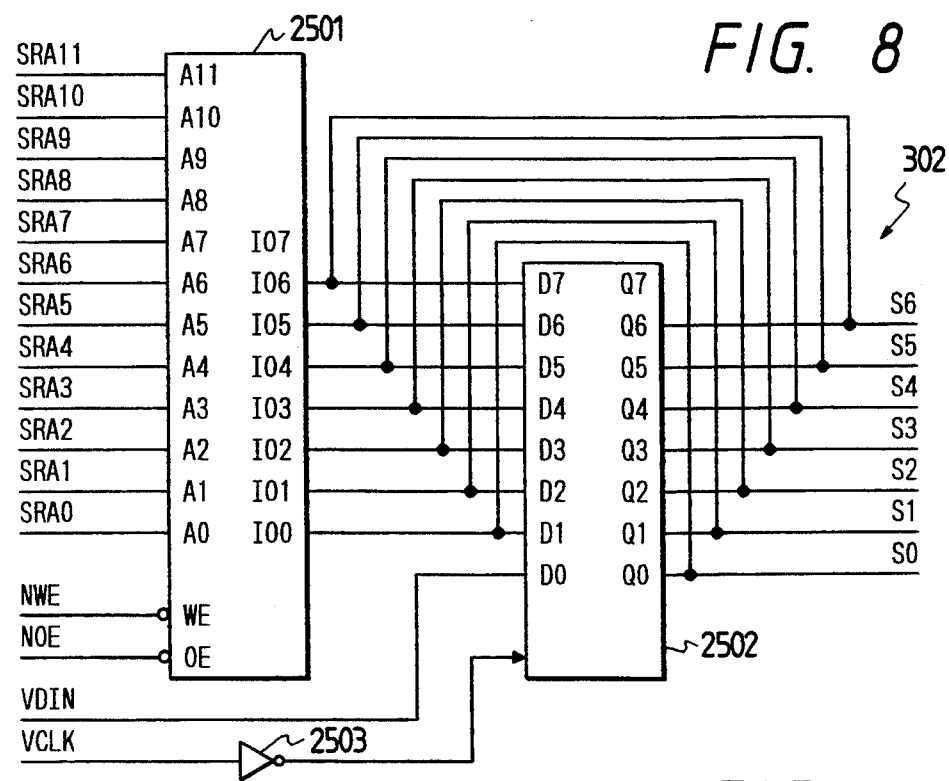
FIG. 8 is a block diagram of the memory circuit of FIG. 5.
Figure 9:
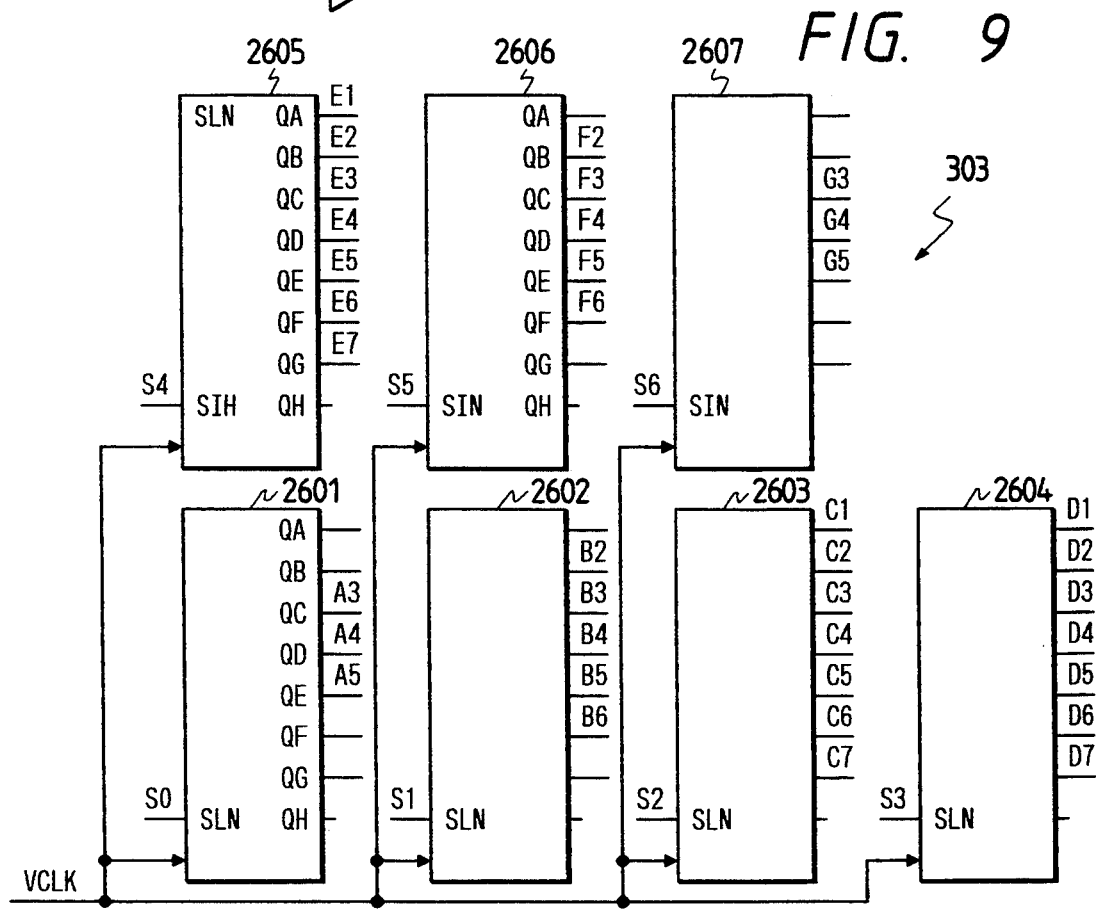
FIG. 9 is a block diagram of the sample window circuit of FIG. 5.

As shown in FIG. 7, the memory control circuit 301 includes a combination of 4-bit synchronous counters 2401-2403. As shown in FIG. 8, the memory circuit 302 includes a combination of an SRAM 2501, an 8-bit latch 2502, and an inverter 2503. As shown in FIG. 9, the sample window circuit 303 includes a combination of 8-bit shift registers 2601-2607.

With reference to FIG. 8, 1-bit information of the video signal VDIN, that is, 1-bit information of the serial-form bit map image data, is fed to an input terminal D0 of the 8-bit latch 2502 in accordance with the video data sync signal VCLK, being latched in response to a falling edge in the video data sync signal VCLK and being stored via an output terminal Q0 of the 8-bit latch 2502 into a cell of a 1-line segment IO0 of the SRAM 2501 in accordance with address data SRA0-SRA11 fed to terminals A0-A11 of the SRAM 2501. The address data SRA0-SRA11 are generated by the 4-bit synchronous counters 2401-2403 of FIG. 7 which cooperate to count up pulses of the video data sync signal VCLK. Then, the address data SRA0-SRA11 are incremented at a rising edge of the video data sync signal VCLK, and next 1-bit information of the video signal. VDIN is stored into a next cell of the 1-line segment IO0 of the SRAM 2501. This process is periodically reiterated, and 1-line information of the video signal VDIN is stored into the 1-line segment IO0 of the SRAM 2501. In this way, first-line information is stored into the 1-line segment IO0 of the SRAM 2501 through the 8-bit latch 2502.

When storing the first-line information of the video signal VDIN into the 1-line segment IO0 of the SRAM 2501 is completed, the 4-bit synchronous counters 2401-2403 of FIG. 7 are reset by a main-scan reference signal (line sync signal) NLSYNC. Then, bits of second-line information of the video signal VDIN are sequentially fed to the input terminal D0 of the 8-bit latch 2502 in accordance with the video data sync signal VCLK, being latched in response to falling edges in the video data sync signal VCLK and being stored via the output terminal Q0 of the 8-bit latch 2502 into the 1-line segment IO0 of the SRAM 2501 in accordance with the address data SRA0-SRA11. Simultaneously, bits of the first-line information are sequentially read out from the 1-line segment IO0 of the SRAM 2501, being fed to an input terminal D1 of the 8-bit latch 2502. The bits of the first-line information are sequentially latched by the 8-bit latch 2502, being stored via an output terminal Q1 of the 8-bit latch 2502 into a 1-line segment IO1 of the SRAM 2501.

The above-mentioned processes are periodically reiterated, and adjacent seven lines of the bit map image data are stored into 1-line segments IO0-IO6 of the SRAM 2501 respectively. The output signals S0-S6 from the 8-bit latch 2502 are also fed to the 8-bit shift registers 2601-2607 in the sample window circuit 303 of FIG. 9 respectively. The 8-bit shift registers 2601-2607 store and shift the fed data S0-S6 in accordance with the video data sync signal VCLK, holding a portion of the bit map image data which corresponds to the sample window of FIG. 6.

As shown in FIG. 5, the correction circuit 218 also includes an edge detector 102, a weighting device 103, a logic operation device 104, a signal generator 105, and an edge data selector 106.

The edge detector 102 receives the bit map image data in the sample window of FIG. 6 from the sample window circuit 303, and detects an edge or edges by referring to the bit map image data in the sample window. An edge is defined as corresponding to conditions where an attribute or state of data of a bit in the sample window differs from that of data of at least one of upper, lower, left, and right bits adjoining the former bit. One example of such edge conditions is that data of a bit in the sample window is "0" but data of at least one of upper, lower, left, and right neighboring bits is "1". Another example of such edge conditions is that data of a bit in the sample window is "1" but data of at least one of upper, lower, left, and right neighboring bits is "0". The edge detector 102 outputs edge data to the edge data selector 106 which assumes "1" and "0" in the presence and the absence of an edge respectively. A decision is made by the edge data selector 106 as to whether or not each "1" edge data generated by the edge detector 102 which represents an edge in a specified location within the sample window should be outputted from the edge detector 102 to the weighting device 103 in accordance with edge data related to another specified location within the sample window. The weighting device 103 classifies each edge data selected by the edge data selector 106 in accordance with the type of an edge upward, downward, leftward, or rightward of the correction-object central bit D4 (see FIG. 6) within the sample window. It should be noted that the word "downward" is used to mean being situated at a lower side of the central bit D4. The type of an edge depends on whether the edge corresponds to a "0"-to-"1" change or a "1"-to-"0" change in a main scanning direction or a sub scanning direction, and also depends on the direction and position of the edge which corresponds to one of "vertical right", "vertical left", "horizontal upper", and "horizontal lower". The weighting device 103 collects the selected edge data in accordance with the positions of the edges relative to the position of the edge adjoining the central bit D4. The logic operation device 104 receives the edge data collected by the weighting device 103, and multiplies the collected edge data by numerical values which depend on the positions of the edges relative to the position of the edge adjoining the central bit D4. The logic operation device 104 executes logic operation in this way, thereby generating correction data and outputting the correction data to the signal generator 105. The signal generator 105 converts the signal of the image bit D4 into a correction image dot signal VDO in accordance with the correction data outputted from the logic operation device 104. The signal generator 105 outputs the correction image dot signal VDO to the laser driver 2011 of FIG. 4.

Figure 10:
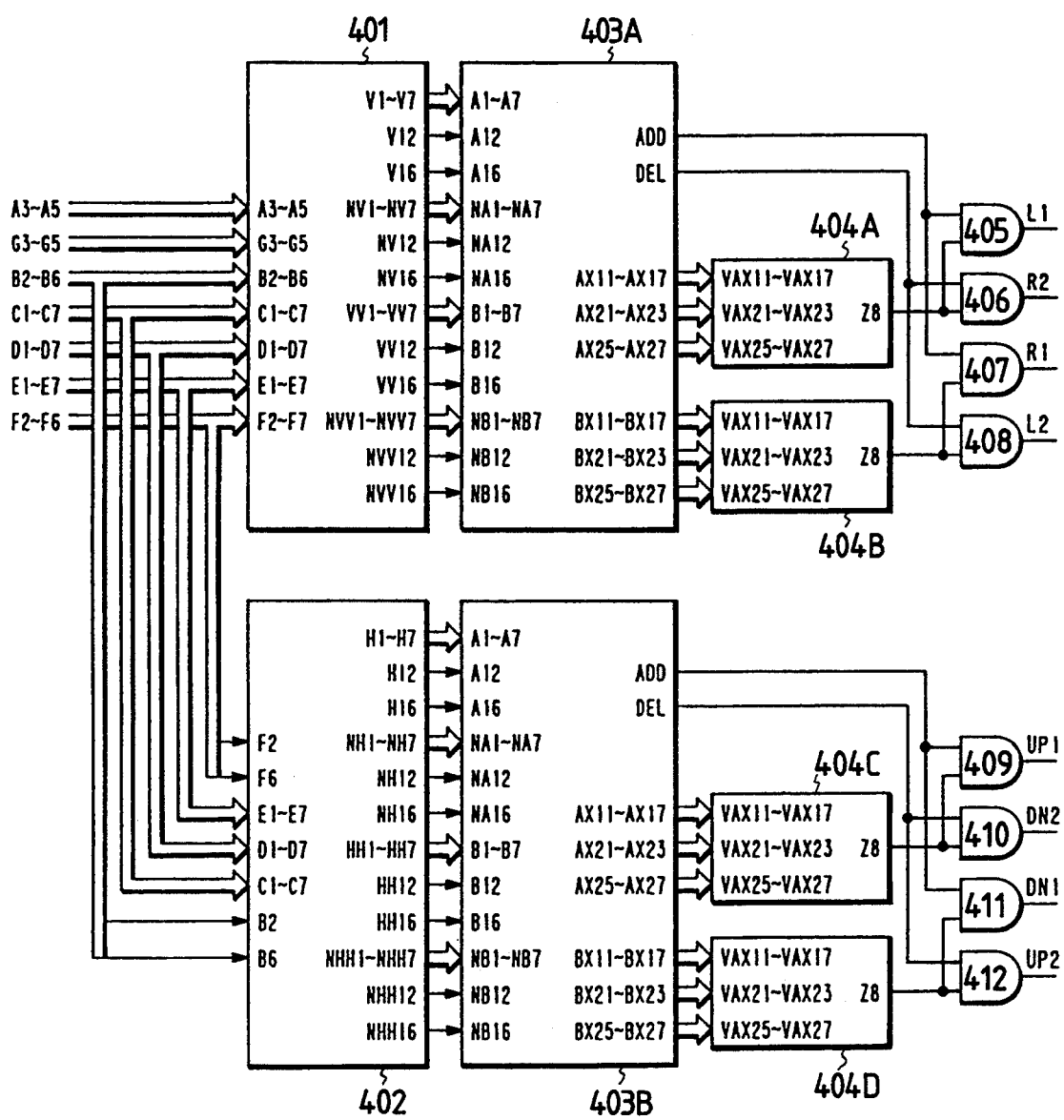
FIG. 10 is a block diagram of a circuitry forming the edge detector, the edge data selector, the weighting device, and the logic operation device in FIG. 5.

FIG. 10 shows a circuitry forming the edge detector 102, the edge data selector 106, the weighting device 103, and the logic operation device 104. The circuitry of FIG. 10 includes a vertical edge detecting and selecting circuit 401, and a horizontal edge detecting and selecting circuit 402. The vertical edge detecting and selecting circuit 401 detects whether or not edges are present in adjacent bits of the bit map image data in the sample window in the main scanning direction (the direction along lines), and decides whether or not the detected edges should be outputted as edge data. The horizontal edge detecting and selecting circuit 402 detects whether or not edges are present in adjacent bits of the bit map image data in the sample window in the sub scanning direction (the direction perpendicular to lines), and decides whether or the detected edges should be outputted as edge data. The vertical edge detecting and selecting circuit 401 and the horizontal edge detecting and selecting circuit 402 form the edge detector 102 and the edge data selector 106 of FIG. 5. A vertical edge data weighting circuit 403A receives the edge data outputted from the vertical edge detecting and selecting circuit 401, and classifies each of the received edge data in accordance with the type of an edge leftward or rightward of the correction-object central bit D4 within the sample window. Specifically, the type of an edge depends on whether the edge corresponds to a "0"-to-"1" change or a "1"-to-"0" change in the main scanning direction, and also depends on the position of the edge which corresponds to one of "left" and "right" relative to the central bit D4. In addition, the vertical edge data weighting circuit 403A collects the edge data in accordance with the positions of the edges relative to the position of the edge adjoining the central bit D4. Furthermore, the vertical edge data weighting circuit 403A outputs a signal of "1" to a signal line ADD when the correction-object bit D4 is "0", and outputs a signal of "1" to a signal line DEL when the correction-object bit D4 is "1". A horizontal edge data weighting circuit 403B receives the edge data outputted from the horizontal edge detecting and selecting circuit 402, and classifies each of the received edge data in accordance with the type of an edge upward or downward of the correction-object central bit D4 within the sample window. Specifically, the type of an edge depends on whether the edge corresponds to a "0"-to-"1" change or a "1"-to-"0" change in the sub scanning direction, and also depends on the position of the edge which corresponds to one of "upper" and "lower" relative to the central bit D4. In addition, the horizontal edge data weighting circuit 403B collects the edge data in accordance with the positions of the edges relative to the position of the edge adjoining the central bit D4. Furthermore, the horizontal edge data weighting circuit 403B outputs a signal of "1" to a signal line ADD when the correction-object bit D4 is "0", and outputs a signal of "1" to a signal line DEL when the correction-object bit D4 is "1". The vertical edge data weighting circuit 403A and the horizontal edge data weighting circuit 403B compose the weighting device 103 of FIG. 5. Adding circuits 404A, 404B, 404C, and 404D receive the edge data collected by the vertical edge data weighting circuit 403A and the horizontal edge data weighting circuit 403B, and have the functions of multiplying the received edge data by numerical values which depend on the positions of the edges relative to the position of the edge adjoining the central bit D4. The adding circuits 404A, 404B, 404C, and 404D sum the resultants of the multiplications, and output data of "1" when the result of the summation are equal to or greater than a predetermined threshold value (for example, 8) and outputs data of "0" otherwise. AND gates 405-412 of the 2-input type execute logic AND operation between the data outputted from the adding circuits 404A, 404B, 404C, and 404D and the data fed from the vertical edge data weighting circuit 403A and the horizontal edge data weighting circuit 403B via the signal lines ADD and DEL. The adding circuits 404A, 404B, 404C, and 404D, and the AND gates 405-412 compose the logic operation device 104.

Figure 11:
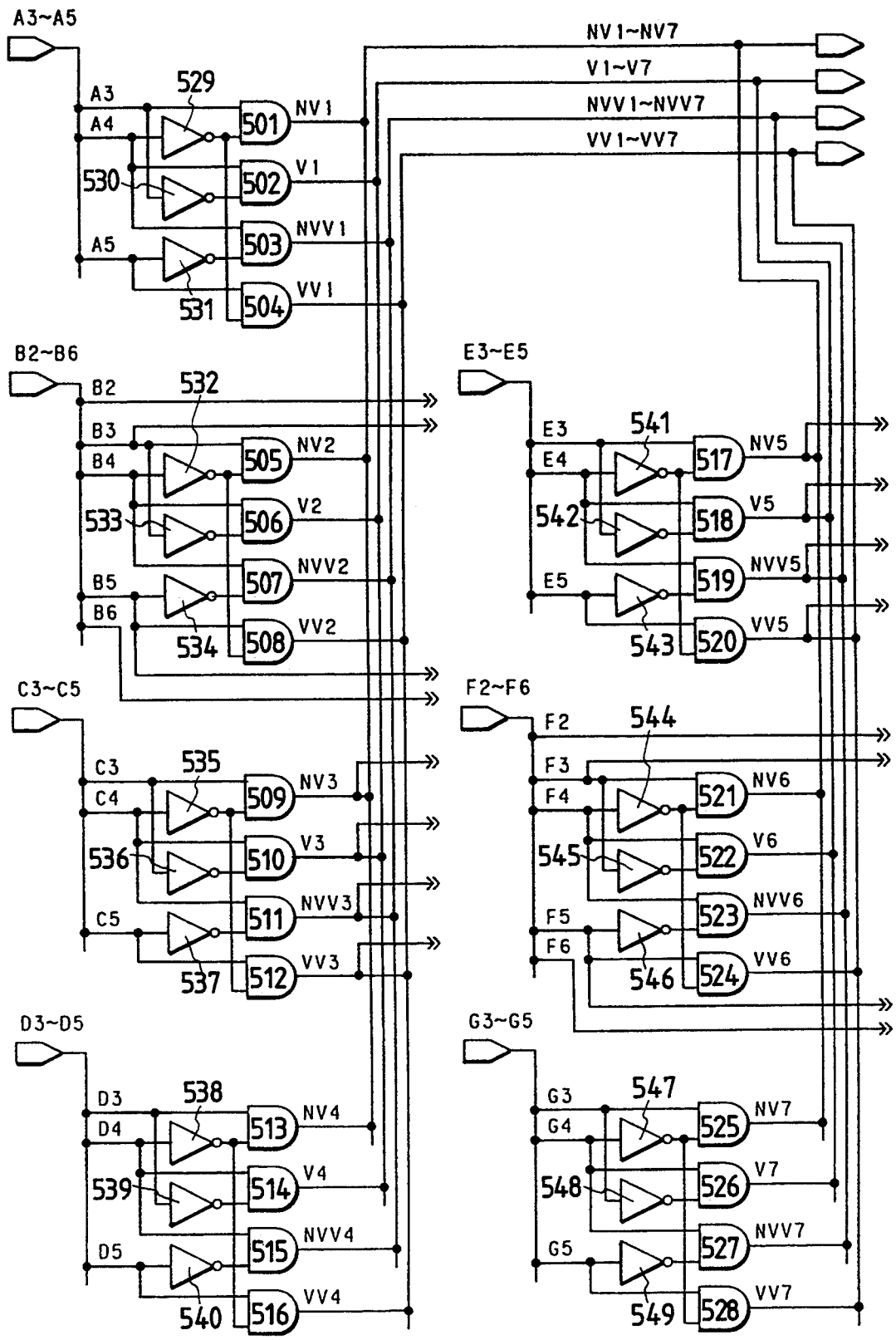
FIG. 11 is a block diagram of a vertical detecting circuit which is contained in the correction circuit of FIG. 5.
Figure 12:
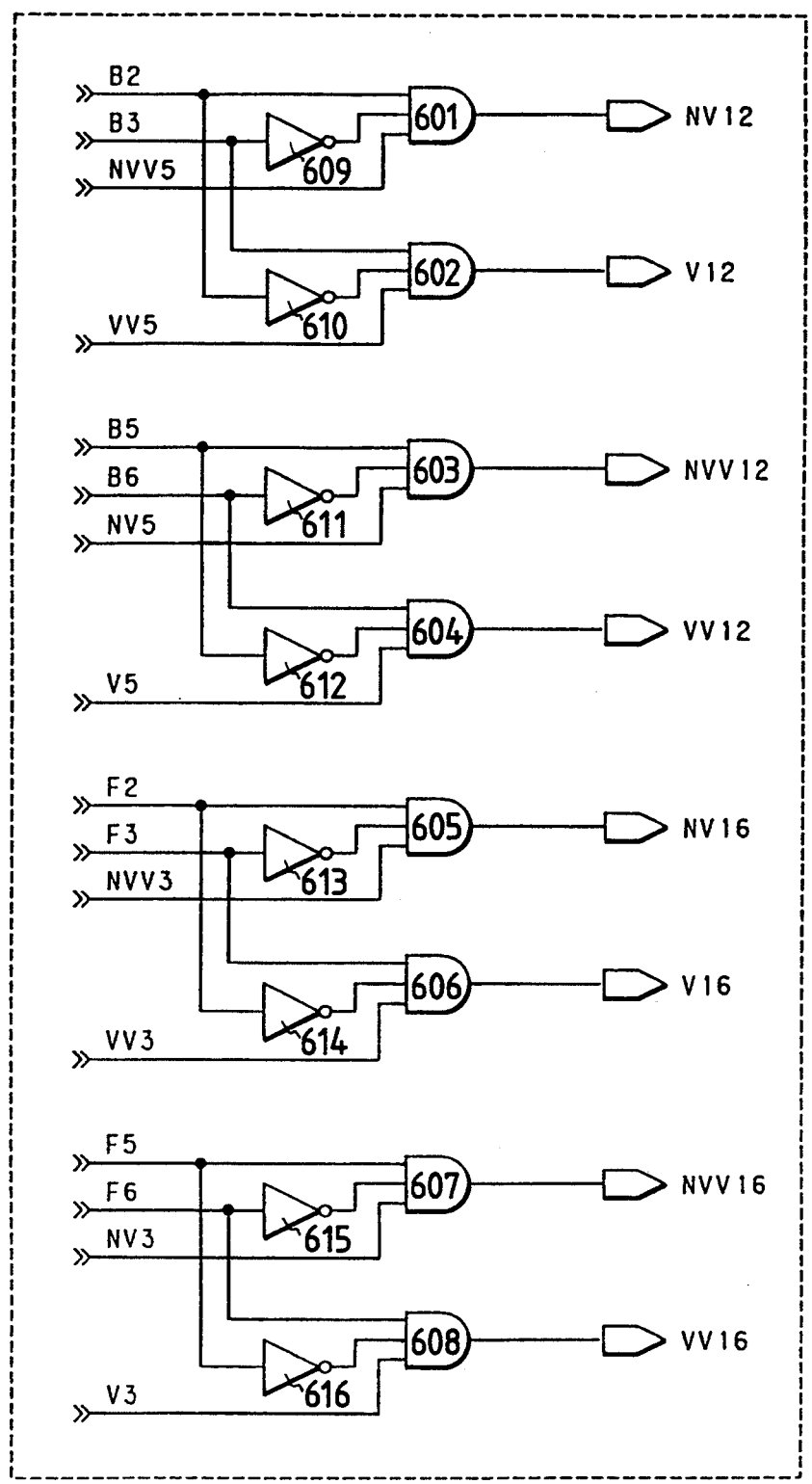
FIG. 12 is a block diagram of a vertical edge data selecting circuit which is contained in the correction circuit of FIG. 5.
Figure 13:
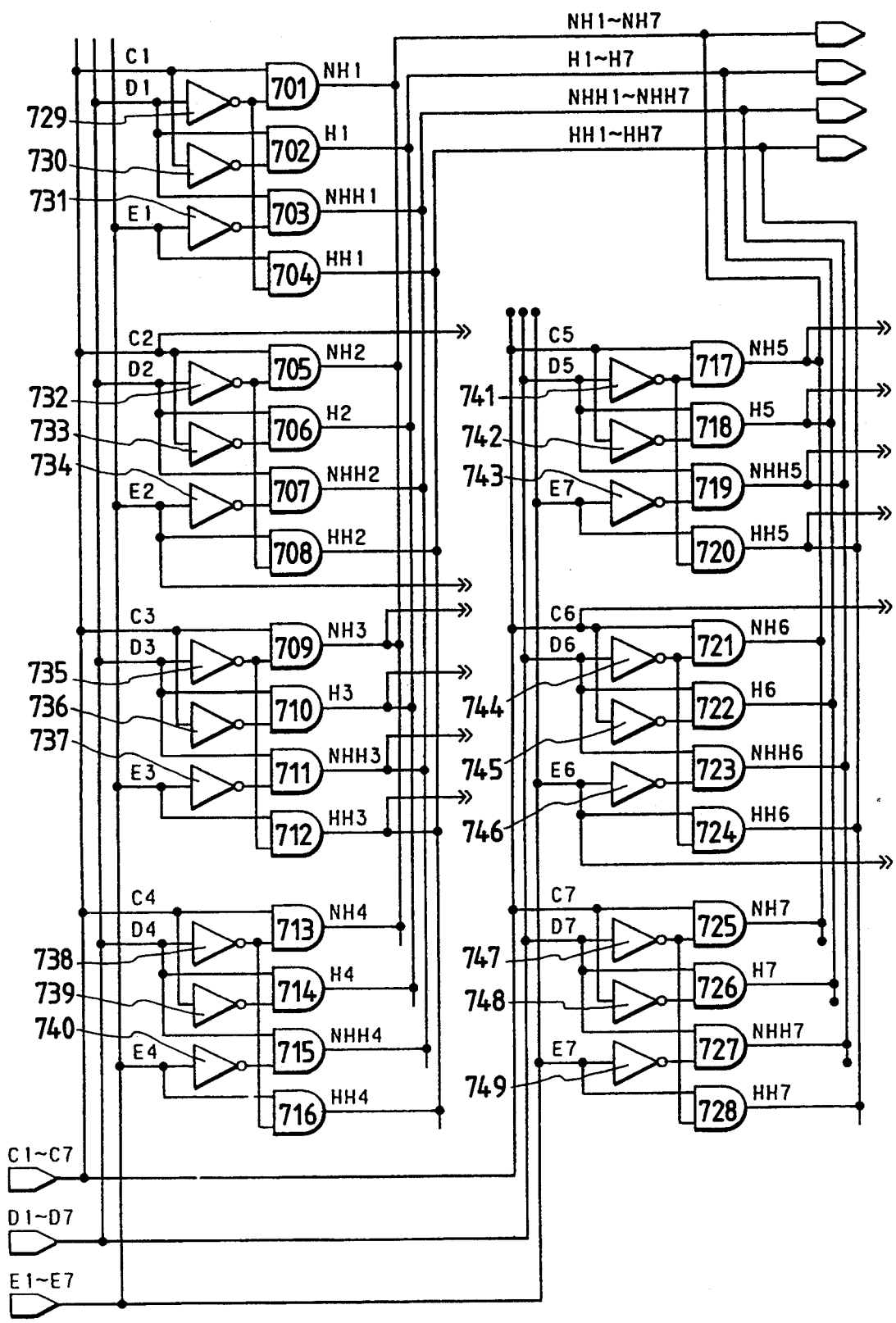
FIG. 13 is a block diagram of a horizontal edge detecting circuit which is contained in the correction circuit of FIG. 5.
Figure 14:
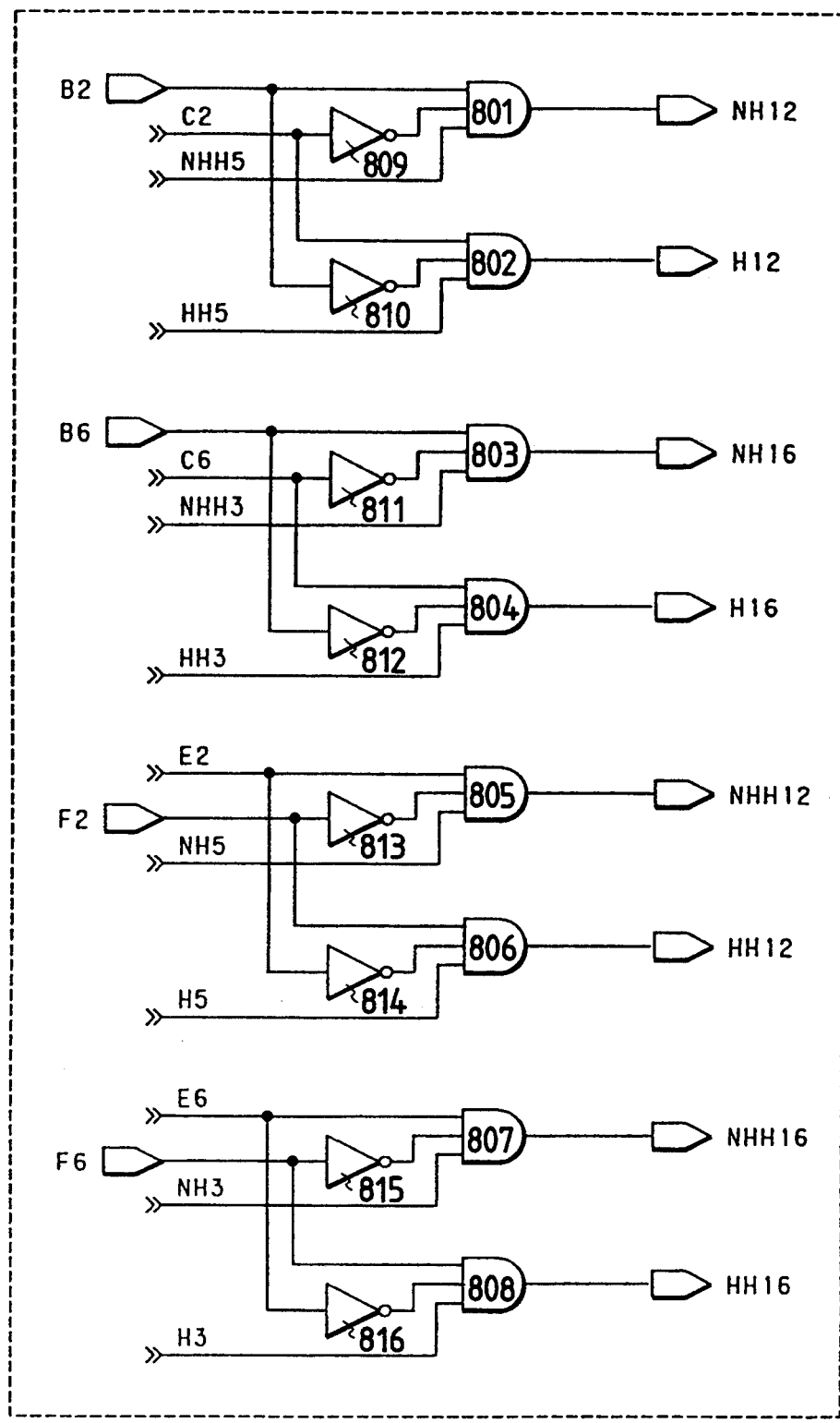
FIG. 14 is a block diagram of a horizontal edge data selecting circuit which is contained in the correction circuit of FIG. 5.
Figure 15:
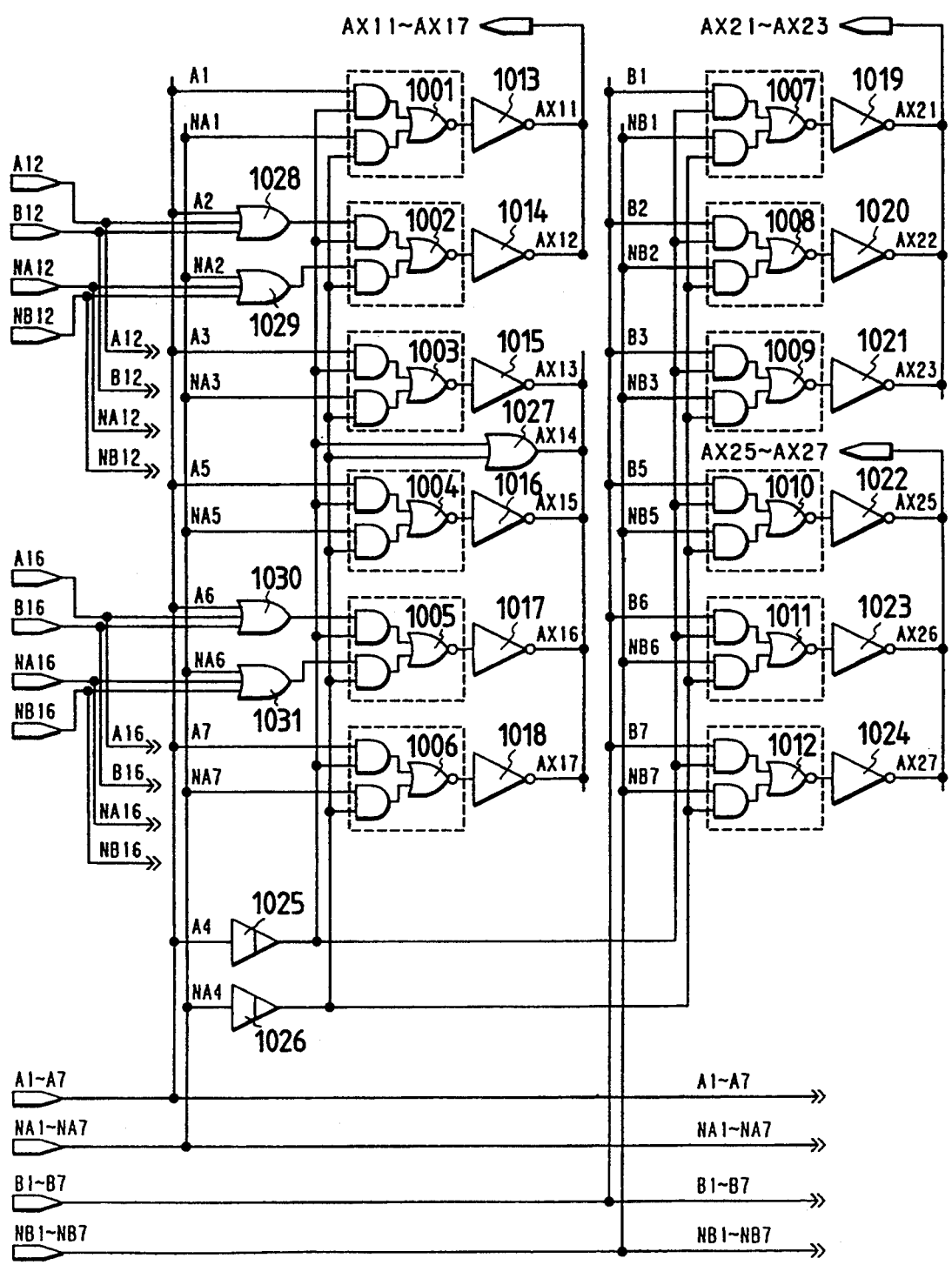
FIG. 15 is a block diagram of a vertical edge data weighting circuit which is contained in the correction circuit of FIG. 5.
Figure 16:
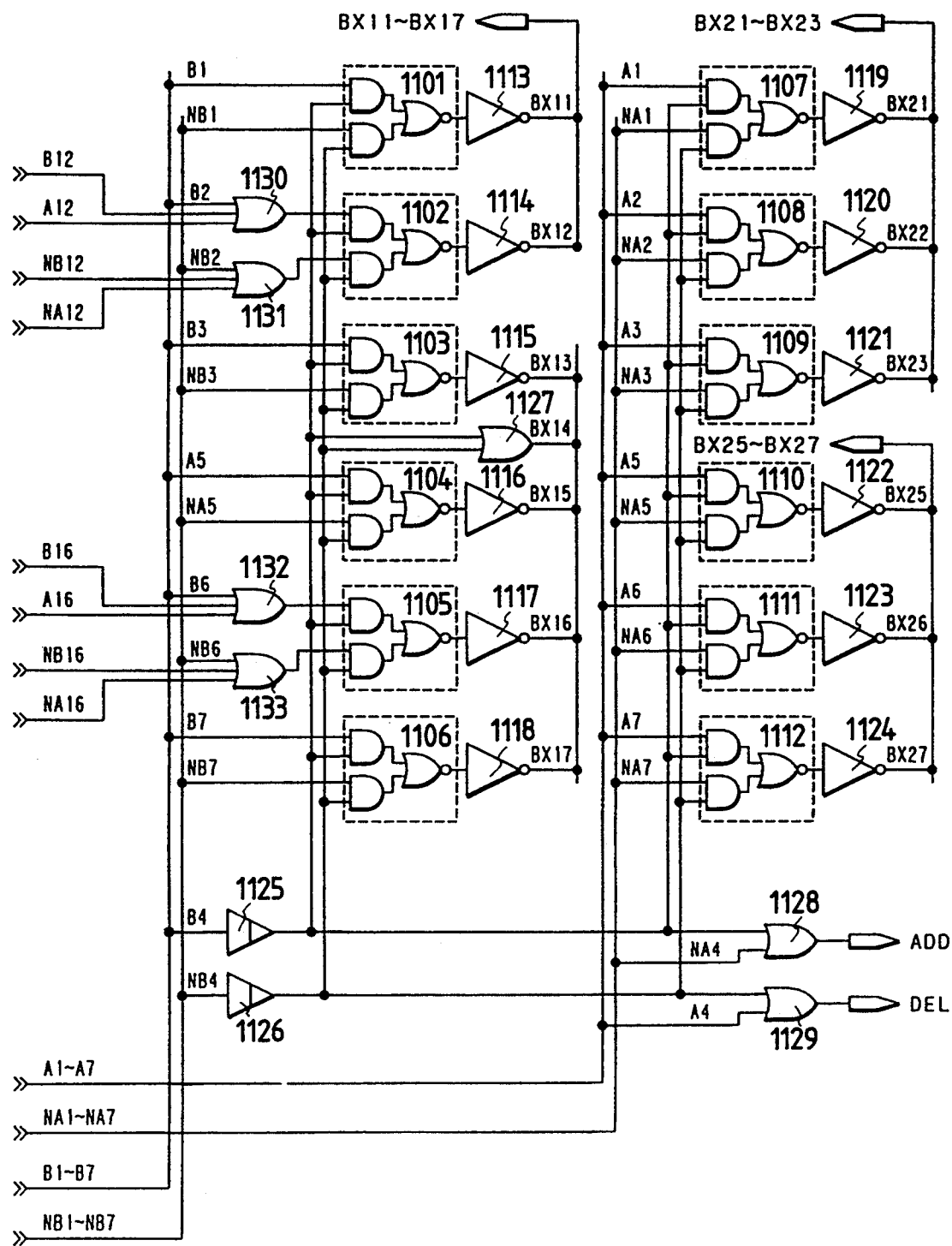
FIG. 16 is a block diagram of the vertical edge data weighting circuit which is contained in the correction circuit of FIG. 5.
Figure 17:
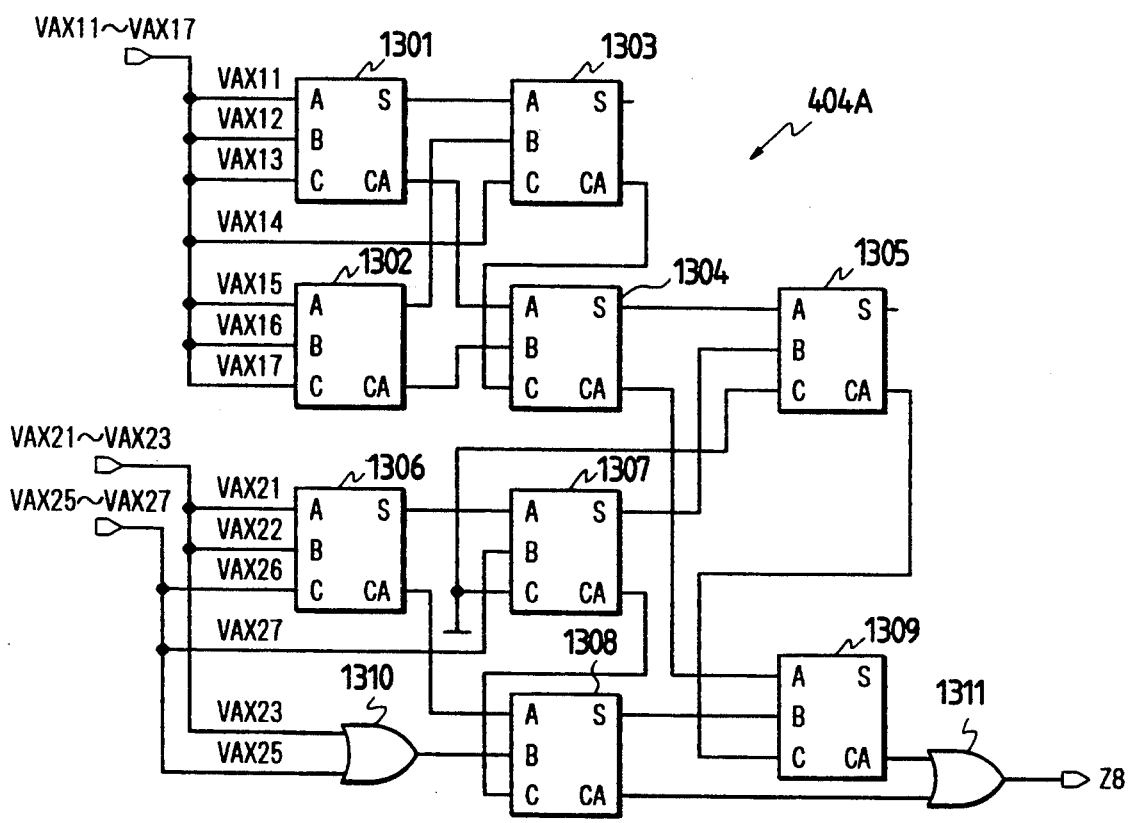
FIG. 17 is a block diagram of an adding circuit which is contained in the correction circuit of FIG. 5.
Figure 18:
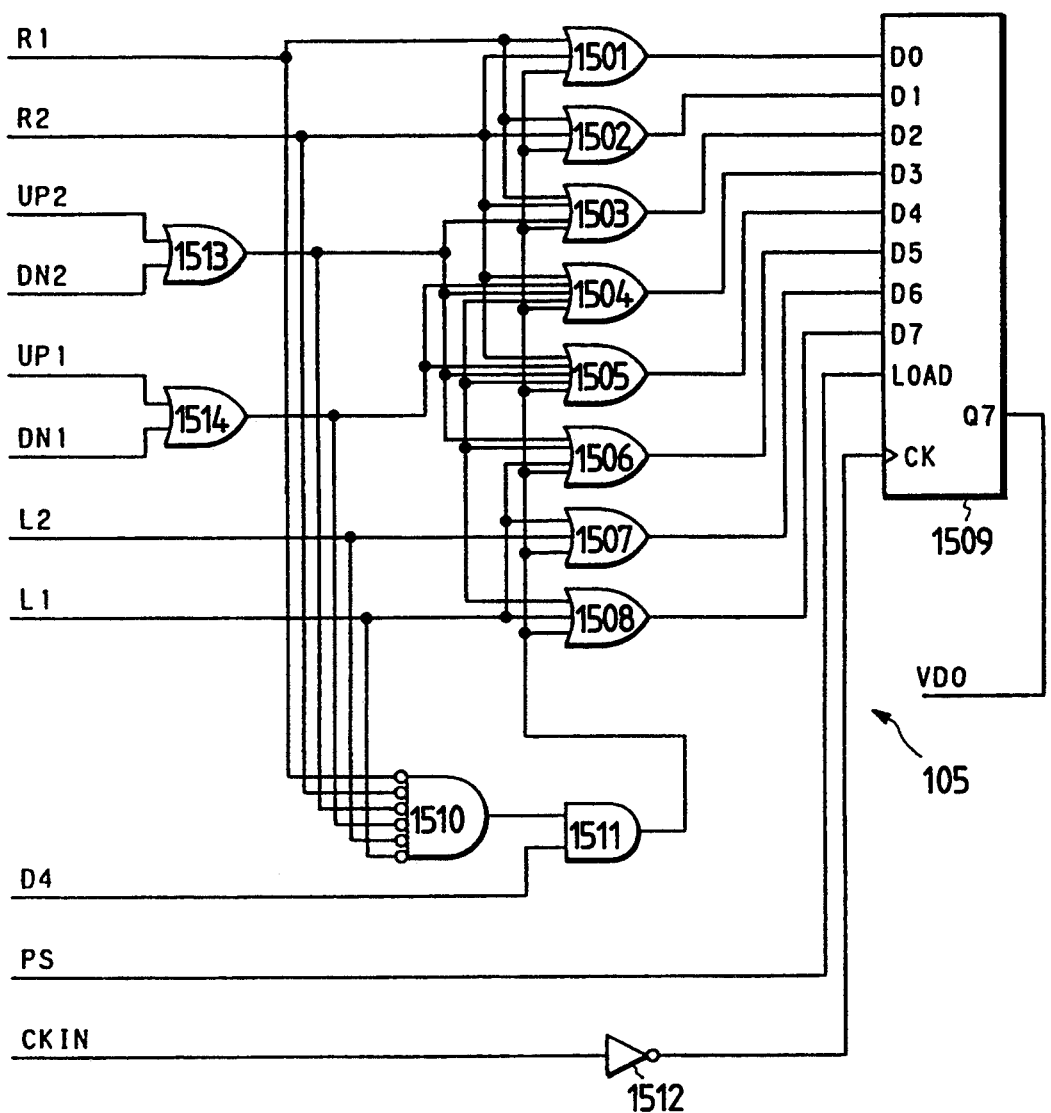
FIG. 18 is a block diagram of the signal generator in FIG. 5.

FIG. 11 shows a vertical edge detecting circuit forming a portion of the vertical edge detecting and selecting circuit 401 which is contained in the edge detector 102. The vertical edge detecting circuit of FIG. 11 includes 2-input AND gates 501-528, and inverters 529-549. FIG. 12 shows a vertical edge data selecting circuit forming a portion of the vertical edge detecting and selecting circuit 401 which is contained in the edge data selector 106. The vertical edge data selecting circuit of FIG. 12 includes 3-input AND gates 601-608, and inverters 609-616. FIG. 13 shows a horizontal edge detecting circuit forming a portion of the horizontal edge detecting and selecting circuit 402 which is contained in the edge detector 102. The horizontal edge detecting circuit of FIG. 13 includes 2-input AND gates 701-728, and inverters 729-749. FIG. 14 shows a horizontal edge data selecting circuit forming a portion of the horizontal edge detecting and selecting circuit 402 which is contained in the edge data selector 106. The horizontal edge data selecting circuit of FIG. 14 includes 3-input AND gates 801-808, and inverters 809-816. FIGS. 15 and 16 show the vertical edge data weighting circuit 403A which includes AND-OR inverters 1001-1012, inverters 1013-1024, buffers 1025 and 1026, a 2-input OR gate 1027, 3-input OR gates 1028-1031, AND-OR inverters 1101-1112, inverters 1113-1124, buffers 1125 and 1126, 2-input OR gates 1127-1129, and 3-input OR gates 1130-1133. The horizontal edge data weighting circuit 403B has a structure similar to the structure of FIGS. 15 and 16. FIG. 17 shows the adding circuit 404A which includes 3-input 1-bit full adders 1301-1309, and 2-input OR gates 1310 and 1311. The adding circuits 404B, 404C, and 404D have a structure similar to the structure of FIG. 17. FIG. 18 shows the signal generator 105 which includes 3-input OR gates 1501, 1502, 1507, and 1508, 5-input OR gates 1504 and 1505, 4-input OR gates 1503 and 1506, an 8-bit parallel-load serial-output shift register 1509, a 6-input NOR gate 1510, a 2-input AND gate 1511, an inverter 1512, and 2-input OR gates 1513 and 1514.

The operation of the correction circuit 218 will be further described hereinafter. In the vertical edge detecting circuit of FIG. 11, signal lines A3-A5, B3-B5, C3-C5, D3-D5, E3-E5, F3-F5, and G3-G5 transmit image data from the sample window circuit 303 of FIG. 5, and the transmitted image data are subjected to logic operation by the inverters 529-549 and the 2-input AND gates 501–528. Thereby, a detection is given of whether the image data in the third and fourth columns and the image data in the fourth and fifth columns in the A line to the G line of the sample window of FIG. 6 change from "0" to "1" (white to black) or "1" to "0" (black to white) in the main scanning direction (the direction along lines). The results of the detection are outputted from the vertical edge detecting circuit as edge data. In the case where the image data in the third column and the A line is white but the image data in the fourth column and the A line is black, the edge data agrees with data of "1" outputted to a signal line V1. In the case where the image data in the third column and the B line is white but the image data in the fourth column and the B line is black, the edge data agrees with data of "1" outputted to a signal line V2. In the case where the C line to the G line satisfy similar conditions, the edge data agree with data of "1" outputted to signal lines V3 to V7 respectively. In the case where the third-column data is black but the fourth-column data is white in the A line to the G line, the edge data agree with data of "1" outputted to signal lines NV1 to NV7 respectively. In the case where the fourth-column data is white but the fifth-column data is black in the A line to the G line, the edge data agree with data of "1" outputted to signal lines VV1 to VV7 respectively. In the case where the fourth-column data is black but the fifth-column data is white in the A line to the G line, the edge data agree with data of "1" outputted to signal lines NVV1 to NVV7 respectively.

The vertical edge data selecting circuit of FIG. 12 receives the image data from the sample window circuit 303 of FIG. 5 via signal lines B2, B3, B5, B6, F2, F3, F5, and F6, and also receives the edge data from the vertical edge detecting circuit of FIG. 11 via the signal lines NVV5, VV5, NV5, V5, NVV3, VV3, NV3, and V3. In the vertical edge data selecting circuit of FIG. 12, the the image data and the edge data are subjected to logic operation by the inverters 609–616 and the 3-input AND gates 601–608. Thereby, a detection is given of whether the image data in the second and third columns of the B line, the image data in the fifth and sixth columns of the B line, the image data in the second and third columns of the F line, and the image data in the fifth and sixth columns of the F line of the sample window of FIG. 6 change from "0" to "1" (white to black) or "1" to "0" (black to white) in the main scanning direction (the direction along lines). Then, a decision is made as to whether or not the results of the detection should be selected and outputted from the vertical edge data selecting circuit of FIG. 12 as edge data in accordance with the received edge data from the signal lines NVV5 and VV5, the signal lines NV5 and V5, the signal lines NVV3 and VV3, and the signal lines NV3 and V3 respectively. Specifically, in the case where the edge data from the signal line NVV5 is "1", that is, in the case where the fourth-column data in the E line is black but the fifth-column data in the E line is white, the edge data, which corresponds to the change that the second-column data in the B line is black but the third-column data in the B line is white, is selected as output edge data and a signal of "1" is outputted to a signal line NV12. In the case where the edge data from the signal line VV5 is "1", that is, in the case where the fourth-column data in the E line is white but the fifth-column data in the E line is black, the edge data, which corresponds to the change that the second-column data in the B line is white but the third-column data in the B line is black, is selected as output edge data and a signal of "1" is outputted to a signal line V12. In the case where the edge data from the signal line NV5 is "1", that is, in the case where the third-column data in the E line is black but the fourth-column data in the E line is white, the edge data, which corresponds to the change that the fifth-column data in the B line is black but the sixth-column data in the B line is white, is selected as output edge data and a signal of "1" is outputted to a signal line NVV12. In the case where the edge data from the signal line V5 is "1", that is, in the case where the third-column data in the E line is white but the fourth-column data in the E line is black, the edge data, which corresponds to the change that the fifth-column data in the B line is white but the sixth-column data in the B line is black, is selected as output edge data and a signal of "1" is outputted to a signal line VV12. In the case where the edge data from the signal line NVV3 is "1", that is, in the case where the fourth-column data in the C line is black but the fifth-column data in the C line is white, the edge data, which corresponds to the change that the second-column data in the F line is black but the third-column data in the F line is white, is selected as output edge data and a signal of "1" is outputted to a signal line NV16. In the case where the edge data from the signal line VV3 is "1", that is, in the case where the fourth-column data in the C line is white but the fifth-column data in the C line is black, the edge data, which corresponds to the change that the second-column data in the F line is white but the third-column data in the F line is black, is selected as output edge data and a signal of "1" is outputted to a signal line V16. In the case where the edge data from the signal line NV3 is "1", that is, in the case where the third-column data in the C line is black but the fourth-column data in the C line is white, the edge data, which corresponds to the change that the fifth-column data in the F line is black but the sixth-column data in the F line is white, is selected as output edge data and a signal of "1" is outputted to a signal line NVV16. In the case where the edge data from the signal line V3 is "1", that is, in the case where the third-column data in the C line is white but the fourth-column data in the C line is black, the edge data, which corresponds to the change that the fifth-column data in the F line is white but the sixth-column data in the F line is black, is selected as output edge data and a signal of "1" is outputted to a signal line VV16.

In the horizontal edge detecting circuit of FIG. 13, signal lines C1-C7, D1-D7, and E1-D7 transmit image data from the sample window circuit 303 of FIG. 5, and the transmitted image data are subjected to logic operation by the inverters 729–749 and the 2-input AND gates 701–728. Thereby, a detection is given of whether the image data in the C and D lines and the image data in the D and E lines in the first column to the seventh column of the sample window of FIG. 6 change from "0" to "1" (white to black) or "1" to "0" (black to white) in the sub scanning direction (the direction perpendicular to lines). The results of the detection are outputted from the horizontal edge detecting circuit as edge data. Specifically, in the case where the C-line data are white but the D-line data are black in the respective first, second, third, fourth, fifth, sixth, and seventh columns, data of "1" are outputted to signal lines H1 to H7 as edge data respectively. In the case where the C-line data are black but the D-line data are white in the respective first, second, third, fourth, fifth, sixth, and seventh columns, data of "1" are outputted to signal lines NH1 to NH7 as edge data respectively. In the case where the D-line data are white but the E-line data are black in the respective first, second, third, fourth, fifth, sixth, and seventh columns, data of "1" are outputted to signal lines HH1 to HH7 as edge data respectively. In the case where the D-line data are black but the E-line data are white in the respective first, second, third, fourth, fifth, sixth, and seventh columns, data of "1" are outputted to signal lines NHH1 to NHH7 as edge data respectively.

The horizontal edge data selecting circuit of FIG. 14 receives the image data from the sample window circuit 303 of FIG. 5 via signal lines B2, C2, B6, C6, E2, F2, E6, and F6, and also receives the edge data from the horizontal edge detecting circuit of FIG. 13 via the signal lines NHH5, HH5, NHH3, HH3, NH5, H5, NH3, and H3. In the horizontal edge data selecting circuit of FIG. 14, the the image data and the edge data are subjected to logic operation by the inverters 809–816 and the 3-input AND gates 801–808. Thereby, a detection is given of whether the image data in the B and C lines of the second column, the image data in the B and C line of the sixth column, the image data in the E and F lines of the second column, and the image data in the E and F lines of the sixth column of the sample window of FIG. 6 change from "0" to "1" (white to black) or "1" to "0" (black to white) in the sub scanning direction (the direction perpendicular to lines). Then, a decision is made as to whether or not the results of the detection should be selected and outputted from the horizontal edge data selecting circuit of FIG. 14 as edge data in accordance with the received edge data from the signal lines NHH5 and HH5, the signal lines NHH3 and HH3, the signal lines NH5 and H5, and the signal lines NH3 and H3 respectively. Specifically, in the case where the edge data from the signal line NHH5 is "1", that is, in the case where the D-line data in the fifth column is black but the E-line data in the fifth column is white, the edge data, which corresponds to the change that the B-line data in the second column is black but the C-line data in the second column is white, is selected as output edge data and a signal of "1" is outputted to a signal line NH12. In the case where the edge data from the signal line HH5 is "1", that is, in the case where the D-line data in the fifth column is white but the E-line data in the fifth column is black, the edge data, which corresponds to the change that the B-line data in the second column is white but the C-line data in the second column is black, is selected as output edge data and a signal of "1" is outputted to a signal line H12. In the case where the edge data from the signal line NHH3 is "1", that is, in the case where the D-line data in the third column is black but the E-line data in the third column is white, the edge data, which corresponds to the change that the B-line data in the sixth column is black but the C-line data in the sixth column is white, is selected as output edge data and a signal of "1" is outputted to a signal line NH16. In the case where the edge data from the signal line HH3 is "1", that is, in the case where the D-line data in the third column is white but the E-line data in the third column is black, the edge data, which corresponds to the change that the B-line data in the sixth column is white but the C-line data in the sixth column is black, is selected as output edge data and a signal of "1" is outputted to a signal line H16. In the case where the edge data from the signal line NH5 is "1", that is, in the case where the C-line data in the fifth column is black but the D-line data in the fifth column is white, the edge data, which corresponds to the change that the E-line data in the second column is black but the F-line data in the second column is white, is selected as output edge data and a signal of "1" is outputted to a signal line NHH12. In the case where the edge data from the signal line H5 is "1", that is, in the case where the C-line data in the fifth column is white but the D-line data in the fifth column is black, the edge data, which corresponds to the change that the E-line data in the second column is white but the F-line data in the second column is black, is selected as output edge data and a signal of "1" is outputted to a signal line HH12. In the case where the edge data from the signal line NH3 is "1", that is, in the case where the C-line data in the third column is black but the D-line data in the third column is white, the edge data, which corresponds to the change that the E-line data in the sixth column is black but the F-line data in the sixth column is white, is selected as output edge data and a signal of "1" is outputted to a signal line NHH16. In the case where the edge data from the signal line H3 is "1", that is, in the case where the C-line data in the third column is white but the D-line data in the third column is black, the edge data, which corresponds to the change that the E-line data in the sixth column is white but the F-line data in the sixth column is black, is selected as output edge data and a signal of "1" is outputted to a signal line HH16.

In the vertical edge data weighting circuit of FIGS. 15 and 16, a data selection block is composed of the AND-OR inverters 1001–1012, the inverters 1013–1024, the buffers 1025 and 1026, the 2-input OR gate 1027 and the 3-input AND gates 1028–1031, and another data selection block is composed of the AND-OR inverters 1101–1112, the inverters 1113–1124, the buffers 1125 and 1126, the 2-input OR gate 1127, and the 3-input AND gates 1130–1133. Signal lines A1-A7, NA1-NA7, B1-B7, NB1-NB7, A12, NA12, B12, NB12, A16, NA16, B16, and NB16 transmit the vertical edge data from the vertical edge detecting circuit FIG. 11 via the signal lines V1-V7, NV1-NV7, VV1-VV7, and NVV1-NVV7 and from the vertical edge data selecting circuit of FIG. 12 via the signal lines V12, NV12, VV12, NVV12, V16, NV16, VV16, and NVV16. The transmitted vertical edge data are classified by the above-mentioned data selection blocks. The classification of the vertical edge data is done in accordance with the type of the edge leftward or rightward of the correction-object central bit D4 of the sample window of FIG. 6. The type of the edge depends on whether the edges correspond to a white-to-black change or a black-to-white change, and also depends on whether the position of the edge is right or left with respect to the central bit D4.

The portion of the vertical edge data weighting circuit which is shown in FIG. 15 operates as follows. With respect to an edge of the type same as the type of the edge leftward of the central bit D4 of the sample window, this portion of the vertical edge data weighting circuit outputs data of "1" to a signal line AX11 when the former edge exists between the third column and the fourth column in the A line of the sample window. Similarly, the portion of the vertical edge data weighting circuit outputs data of "1" to a signal line AX12 when the edge exists between the third column and the fourth column of the B line. Also, the portion of the vertical edge data weighting circuit outputs data of "1" to signal lines AX13 to AX17 when the edge exists between the third column and the fourth column of the C line to the G line respectively. With respect to edges of the type same as the type of the edge leftward of the central bit D4 of the sample window, data of "1" is outputted to the signal line AX12 also when an edge of the type same as the type of an edge of the fourth column and the fifth column in the E line exists in the second column and the third column in the B line of the sample window which are selected by the vertical edge data selecting circuit of FIG. 12, and when an edge of the type same as the type of an edge of the third column and the fourth column in the E line exists in the fifth column and the sixth column in the B line of the sample window which are selected by the vertical edge data selecting circuit of FIG. 12. With respect to edges of the type same as the type of the edge leftward of the central bit D4 of the sample window, data of "1" is outputted to the signal line AX16 also when an edge of the type same as the type of an edge of the fourth column and the fifth column in the C line exists In the second column and the third column in the F line of the sample window which are selected by the vertical edge data selecting circuit of FIG. 12, and when an edge of the type same as the type of an edge of the third column and the fourth column in the C line exists in the fifth column and the sixth column In the F line of the sample window which are selected by the vertical edge data selecting circuit of FIG. 12. In addition, data of "1" are outputted to signal lines AX21 to AX23 when edges exist between the fourth column and the fifth column in the A line to the C line respectively. Data of "1" are outputted to signal lines AX25 to AX27 when edges exist between the fourth column and the fifth column in the E line to the G line respectively.

The portion of the vertical edge data weighting circuit which is shown in FIG. 16 operates as follows. With respect to am edge of the type same as the type of the edge rightward of the central bit D4 of the sample window, this portion of the vertical edge data weighting circuit outputs data of "1" to a signal line BX11 when the former edge exists between the fourth column and the fifth column in the A line of the sample window. Similarly, the portion of the vertical edge data weighting circuit outputs data of "1" to a signal line BX12 when the edge exists between the fourth column and the fifth column of the B line. Also, the portion of the vertical edge data weighting circuit outputs data of "1" to signal lines BX13 to BX17 when the edge exists between the fourth column and the fifth column of the C line to the G line respectively. In addition, the portion of the vertical edge data weighting circuit outputs data of "1" to signal lines BX21 to BX23 when the edge exists between the third column and the fourth column of the A line to the C line respectively. Also, the portion of the vertical edge data weighting circuit outputs data of "1" to signal lines BX25 to BX27 when the edge exists between the third column and the fourth column of the E line to the G line respectively. With respect to edges of the type same as the type of the edge rightward of the central bit D4 of the sample window, data of "1" is outputted to the signal line BX12 also when an edge of the type same as the type of an edge of the fourth column and the fifth column in the E line exists in the second column and the third column in the B line of the sample window which are selected by the vertical edge data selecting circuit of FIG. 12, and when an edge of the type same as the type of an edge of the third column and the fourth column in the E line exists in the fifth column and the sixth column in the B line of the sample window which are selected by the vertical edge data selecting circuit of FIG. 12. With respect to edges of the type same as the type of the edge rightward of the central bit D4 of the sample window, data of "1" is outputted to the signal line BX16 also when an edge of the type same as the type of an edge of the fourth column and the fifth column in the C line exists in the second column and the third column in the F line of the sample window which are selected by the vertical edge data selecting circuit of FIG. 12, and when an edge of the type same as the type of an edge of the third column and the fourth column in the C line exists in the fifth column and the sixth column in the F line of the sample window which are selected by the vertical edge data selecting circuit of FIG. 12. The portion of the vertical edge data weighting circuit outputs data of "1" to a signal line ADD when the correction-object bit D4 is "0", and outputs data of "1" to a signal line DEL when the correction-object bit D4 is "1".

The structure of the horizontal edge data weighting circuit 403B is similar to the structure of the vertical edge data weighting circuit of FIGS. 15 and 16, and a detailed description of the structure of the horizontal edge data weighting circuit 403B will be omitted. In the horizontal edge data weighting circuit 403B, signal lines A1-A7, NA1-NA7, B1-B7, NB1-NB7, A12, A16, NA12, NA16, B12, B16, NB12, and NB16 transmit the horizontal edge data from the horizontal edge detecting circuit FIG. 13 via the signal lines H1-H7, NH1-NH7, HH1-HH7, and NHH1-NHH7 and from the horizontal edge data selecting circuit of FIG. 14 via the signal lines H12, H16, NH12, NH16, HH12, HH16, NHH12, and NHH16. Then, the transmitted horizontal edge data are classified in accordance with the type of an edge upward or downward of the correction-object central bit D4 of the sample window of FIG. 6. The type of the edge depends on whether the edge correspond to a white-to-black change or a black-to-white change, and also depends on whether the position of the edge is "upper" or "lower" relative to the position of the central bit D4. In the horizontal edge data weighting circuit 403B, data of "1" is outputted to signal lines AX11 to AX17, signal lines AX21 to AX23, signal lines AX25 to AX27, signal lines BX11 to BX17, signal lines BX21 to BX23, and signal lines BX25 to BX27 in accordance with the positions of the edges relative to the position of the central bit D4 in the sample window.

FIG. 19 and FIG. 20 show conditions of the vertical edge data which are classified by the vertical edge data weighting circuit 403A in accordance with the type of an edge leftward or rightward of the correction-object central bit D4 in the sample window, and which are collected by the vertical edge data weighting circuit 403A in accordance with the positions of edges relative to the position of the edge adjoining the central bit D4. In FIG. 19 and FIG. 20, the vertical edge data are denoted by circles, and the numerals in the circles denote weights which are predetermined for the related edges respectively and which are used in the correction of the central bit D4. FIG. 21 and FIG. 22 show conditions of the horizontal edge data which are classified by the horizontal edge data weighting circuit 403B in accordance with the type of an edge upward or downward of the correction-object central bit D4 in the sample window, and which are collected by the horizontal edge data weighting circuit 403B in accordance with the positions of edges relative to the position of the edge adjoining the central bit D4. In FIG. 21 and FIG. 22, the horizontal edge data are denoted by circles, and the numerals in the circles denote weights which are predetermined for the related edges respectively and which are used in the correction of the central bit D4.

As shown in FIG. 19, in the case where an edge exists between the central bit D4 and its right-hand bit D5, the weights of edges rightward of the fourth-column bits in the A line to the G line are "1", and the weights of edges leftward of the fourth-column bits in the A line, the B line, the C line, the E line, the F line, and the G line are "2" or "4". In this case, when an edge rightward of the B-line second-column bit is equal in type to an edge rightward of the E-line fourth-column bit, when an edge leftward of the B-line sixth-column bit is equal in type to an edge leftward of the E-line fourth-column bit, when an edge rightward of the F-line second-column is equal in type to an edge rightward of the C-line fourth-column bit, and when an edge leftward of the F-line sixth column bit is equal in type to an edge leftward of the C-line fourth-column bit, the weights of these edges are "1".

As shown in FIG. 20, in the case where an edge exists between the central bit D4 and its left-had bit D3, the weights of edges leftward of the fourth-column bits in the A line to the G line are "1", and the weights of edges rightward of the fourth-column bits in the A line, the B line, the C line, the E line, the F line, and the G line are "2" or "4". In this case, when an edge rightward of the B-line second-column bit is equal in type to an edge rightward of the E-line fourth-column bit, when an edge leftward of the B-line sixth-column bit is equal in type to an edge leftward of the E-line fourth-column bit, when an edge rightward of the F-line second-column is equal in type to an edge rightward of the C-line fourth-column bit, and when an edge leftward of the F-line sixth column bit is equal in type to an edge leftward of the C-line fourth-column bit, the weights of these edges are "1".

As shown in FIG. 21, in the case where an edge exists between the central bit D4 and its lower bit E4, the weights of edges downward of (below) the D-line bits in the first column to the seventh column are "1", and the weights of edges upward of the D-line bits in the first column, the second column, the third column, the fifth column, the sixth column, and the seventh column are "2" or "4". In this case, when an edge upward of the C-line second-column bit is equal in type to an edge downward of (below) the D-line fifth-column bit, when an edge upward of the C-line sixth-column bit is equal in type to an edge downward of (below) the D-line third-column bit, when an edge downward of (below) the E-line second-column is equal in type to an edge upward of the D-line fifth-column bit, and when an edge downward of (below) the E-line sixth-column bit is equal in type to an edge upward of the D-line third-column bit, the weights of these edges are "1".

As shown in FIG. 22, in the case where an edge exists between the central bit D4 and its upper bit C4, the weights of edges upward of the D-line bits in the first column to the seventh column are "1", and the weights of edges downward of (below) the D-line bits in the first column, the second column, the third column, the fifth column, the sixth column, and the seventh column are "2" or "4". In this case, when an edge upward of the C-line second-column bit is equal in type to an edge downward of (below) the D-line fifth-column bit, when an edge upward of the C-line sixth-column bit is equal in type to an edge downward of (below) the D-line third-column bit, when an edge downward of (below) the E-line second-column is equal in type to an edge upward of the D-line fifth-column bit, and when an edge downward of (below) the E-line sixth-column bit is equal in type to an edge upward of the D-line third-column bit, the weights of these edges are "1".

As described previously, the vertical edge data weighting circuit of FIGS. 15 and 16 and the horizontal data weighting circuit classify the edge data in accordance with the type of an edge upward, downward, leftward, or rightward of the correction-object central bit D4 in the sample window, and collect the edge data in accordance with the positions of edges relative to the position of the edge adjoining the central bit D4. In the adding circuits 404A, 404B, 404C, and 404D (see FIG. 17), signal lines VAX11-VAX17, VAX21-VAX23, and VAX25-VAX27 transmit the classified and collected edge data from the vertical edge data weighting circuit and the horizontal edge data weighting circuit via signal lines AX11-AX17, AX21-AX23, and AX25-AX27, and signal lines BX11-BX17, BX21-BX23, and BX25-BX27. In the adding circuits 404A, 404B, 404C, and 404D, edge data from the signal lines VAX11-VAX17 which have weights of "1" (see FIGS. 19-22), edge data from the signal lines VAX21, VAX22, VAX26, and VAX27 which have weights of "2", and edge data from the signal lines VAX23 and VAX25 which have weights of "4" are subjected to logic operation by the 3-input 1-bit full adders 1301–1309 and the 2-input OR gates 1310 and 1311. When the result of this logic operation is equal to or greater than "8" in weight, data of "1" is outputted to a signal line Z8 as a correction signal for correcting the correction-object central bit D4 in the sample window.

Figures 23, 24:
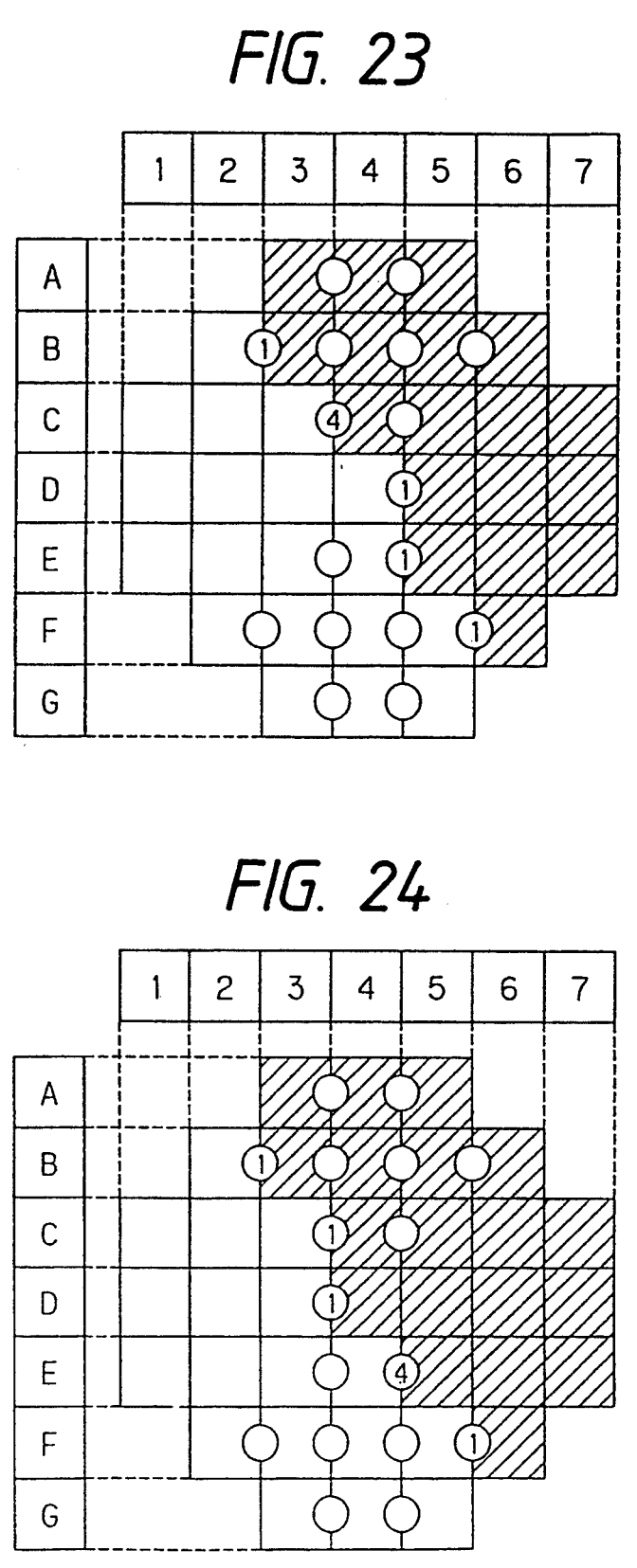
Figure 25:
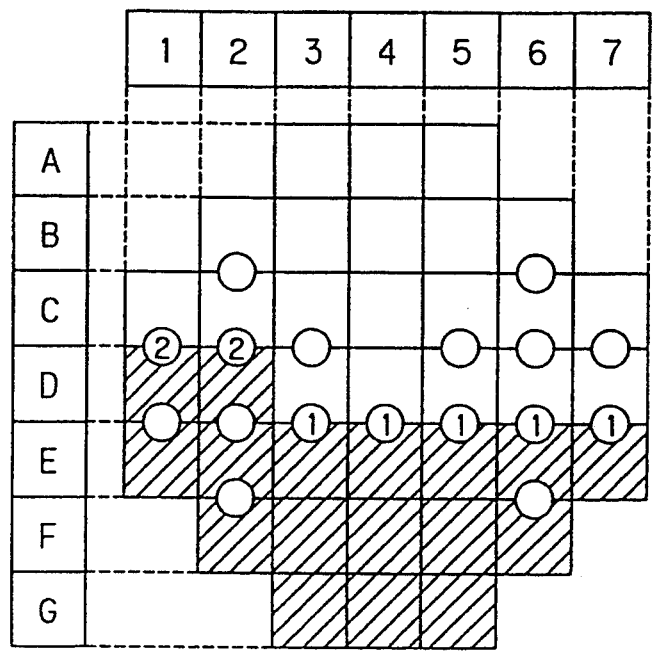
FIG. 25 is a diagram illustrating a third example of an image in the sample window.
Figure 26:
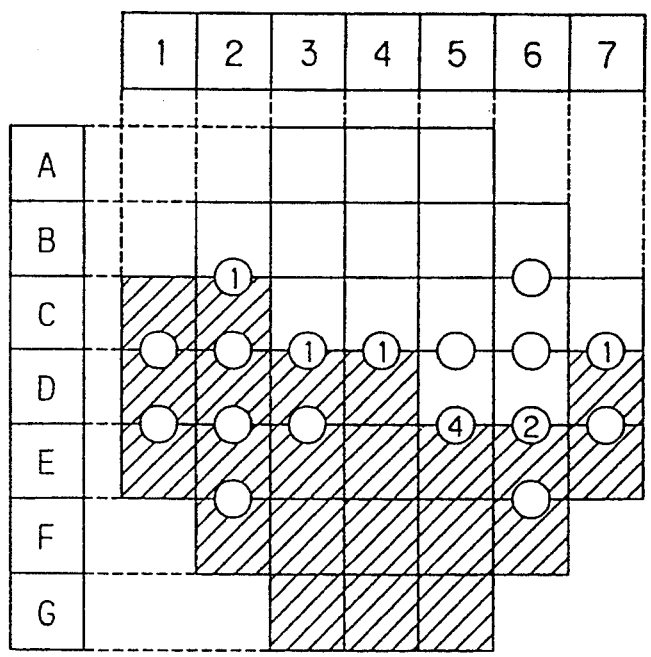
FIG. 26 is a diagram illustrating a fourth example of an image in the sample window.

The operation of the adding circuits 404A, 404B, 404C, and 404D will be further described hereinafter. FIGS. 23, 24, 25, and 26 show examples of black/white dot patterns of image data in the sample window. In FIGS. 23, 24, 25, and 26, the hatched squares correspond to black dots and the non-hatched squares correspond to white dots, and the numerals in the circles denote weights of the related edges. In the pattern of FIG. 23, the result of the logic operation executed by the adding circuit is equal to "8" in weight $(8=1+4+1+1+1)$. In the pattern of FIG. 24, the result of the logic operation executed by the adding circuit is equal to "8" in weight $(8=1+1+1+4+1)$. In the pattern of FIG. 25, the result of the logic operation executed by the adding circuit is equal to "9" in weight $(9=2+2+1+1+1+1+1)$. In the pattern of FIG. 26, the result of the logic operation executed by the adding circuit is equal to "10" in weight $(10=1+1+1+4+2+1)$. Accordingly, the adding circuits 404A, 404B, 404C, and 404D output data of "1" to the signal lines Z8 for the patterns of FIG. 23, FIG. 24, FIG. 25, and FIG. 26.

With reference to FIG. 10, the 2-input AND gates 405–412 execute logic AND operations between the data transmitted from the adding circuits 404A, 404B, 404C, and 404D via the signal lines Z8 and the data transmitted from the vertical edge data weighting circuit 403A and the horizontal edge data weighting circuit 403B via the signal lines ADD and DEL, outputting resultant data to signal lines L1, L2, R1, R2, UP1, UP2, DN1, and DN2. For example, in the case of the pattern of FIG. 23, data of "1" is fed from the adding circuit 404B to the 2-input AND gate 407 via the signal line Z8, and data of "1" is fed from the vertical edge data weighting circuit 403A to the 2-input AND gate 407 via the signal line ADD, so that the 2-input AND gate 407 outputs data of "1" to the signal line R1.

The signal generator 105 of FIG. 18 receives the data from the 2-input AND gates 405–412 via the signal lines L1, L2, R1, R2, UP1, UP2, DN1, and DN2. The signal generator 105 corrects the data represented by the correction-object bit central bit D4 of the sample window in accordance with the output data from the 2-input AND gates 405–412. The 8-bit shift register 1509 in the signal generator 105 outputs the result of the correction.

Figure 27:
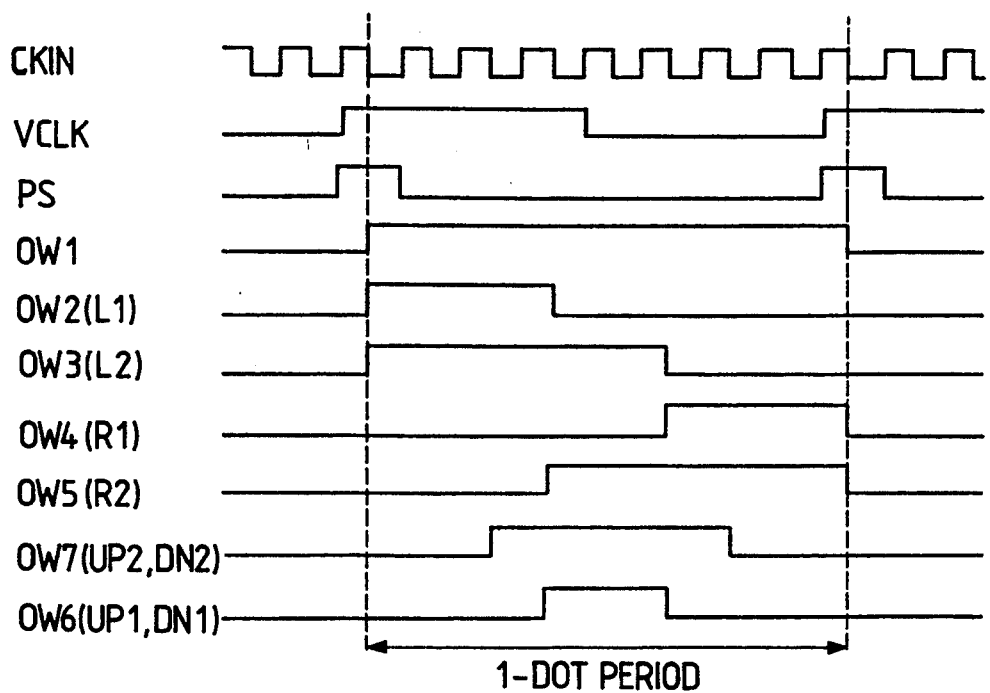
FIG. 27 is a timing diagram showing the waveforms of various signals in the signal generator of FIG. 18.

The operation of the signal generator 105 of FIG. 18 will be further described hereinafter. For example, in the case of the pattern of FIG. 23, the data from the signal line R1 is "1" which is transmitted to the input terminals D0-D2 of the 8-bit shift register 1509 via the 3-input OR gate 1501 and 1502 and the 4-input OR gate 1503, and the data of "0" is applied to the input terminals D3-D7 of the 8-bit shift register 1509. The 8-bit shift register 1509 is loaded with these D0-D7 data in response to a timing signal PS. The timing signal PS has a waveform such as shown in FIG. 27. The 8-bit shift register 1509 receives a clock signal CKIN via the inverter 1512. The clock signal CKIN has a waveform such as shown in FIG. 27. The 8-bit shift register 1509 outputs a corrected image dot signal OW4 to the signal line VDO in response to the clock signal CKIN. The corrected image dot signal OW4 has a waveform such as shown in FIG. 27.

FIG. 27 shows the waveforms of corrected image dot signals OW2-OW7 responsive to the data of "1" transmitted via the signal lines L1, L2, R1, R2, UP1, UP2, DN1, and DN2. In FIG. 27, the signal OW1 is equal to an image dot signal generated when the correction-object central bit D4 in the sample window is "1" and all the data transmitted via the signal lines L1, L2, R1, R2, UP1, UP2, DN1, and DN2 are "0" (that is, the correction-object central bit D4 is free from any correction). The signals OW2-OW7 are equal to image dot signals subjected to corrections. Specifically, the corrected image dot signal OW2 is generated when the correction-object central bit D4 in the sample window is "1" and only the data transmitted via the signal line L1 is "1". The corrected image dot signal OW3 is generated when the correction-object central bit D4 in the sample window is "1" and only the data transmitted via the signal line L2 is "1". The corrected image dot signal OW4 is generated when the correction-object central bit D4 in the sample window is "1" and only the data transmitted via the signal line R1 is "1". The corrected image dot signal OW5 is generated when the correction-object central bit D4 in the sample window is "1" and only the data transmitted via the signal line R2 is "1". The corrected image dot signal OW6 is generated when the correction-object central bit D4 in the sample window is "1" and only the data transmitted via the signal line UP1 or DN1 is "1". The corrected image dot signal OW7 is generated when the correction-object central bit D4 in the sample window is "1" and only the data transmitted via the signal line UP2 or DN2 is "1". In the case where two or more of the corrected image dot signals OW2-OW7 are simultaneously generated, the generated image dot signals are combined through logic OR operation into a final corrected image dot signal VDO.

Figure 28:
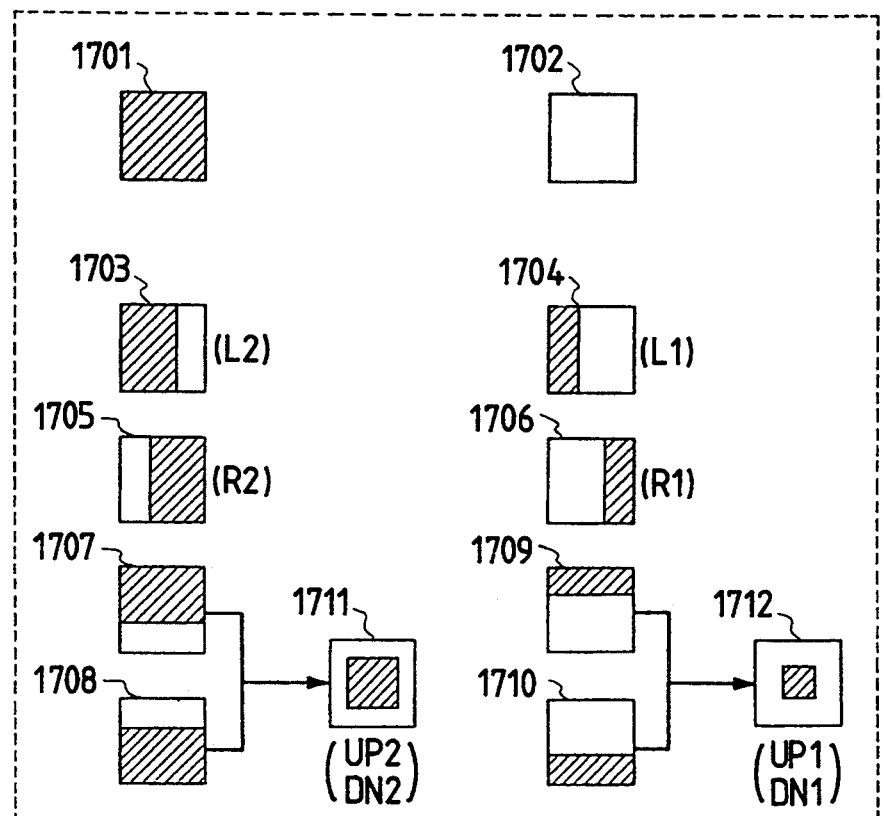
FIG. 28 is a diagram illustrating the relation between corrected image dot signals and corresponding dot images.

FIG. 28 shows dot images corresponding to corrected and uncorrected image dot signals respectively. In FIG. 28, an uncorrected black dot image 1701 corresponds to the image dot signal OW1, and an uncorrected white dot image 1702 corresponds to an image dot signal of "0". In addition, a corrected black dot image 1703, from which a right-hand ⅓ black portion is deleted, corresponds to the corrected image dot signal OW3 (generated when only the data on the signal line L2 is "1"). A corrected white dot image 1704, to which a left-hand ⅓ black portion is added, corresponds to the corrected image dot signal OW2 (generated when only the data on the signal line L1 is "1"). A corrected black dot image 1705, from which a left-hand ⅓ black portion is deleted, corresponds to the corrected image dot signal OW5 (generated when only the data on the signal line R2 is "1"). A corrected white dot image 1706, to which a right-hand ⅓ black portion is added, corresponds to the corrected image dot signal OW4 (generated when only the data on the signal line R1 is "1"). A corrected black dot image 1707, from which a lower ⅓ black portion is deleted, corresponds to the corrected image dot signal OW7 (generated when only the data on the signal line UP2 is "1"). A corrected black dot image 1708, from which an upper ⅓ black portion is deleted, corresponds to the corrected image dot signal OW7 (generated when only the data on the signal line DN2 is "1"). A corrected white dot image 1709, to which an upper ⅓ black portion is added, corresponds to the corrected image dot signal OW6 (generated when only the data on the signal line UP1 is "1"). A corrected white dot image 1710, to which a lower ⅓ black portion is added, corresponds to the corrected image dot signal OW6 (generated when only the data on the signal line DN1 is "1"). The corrected dot images 1703–1710 are selected in accordance with edges related to the correction-object central bit D4 in the sample window of FIG. 6. The conditions of the selection of the corrected dot images 1703–1710 are shown in TABLE 1.

TABLE 1

| SELECTED IMAGE | EDGE POSITION | EDGE TYPE | WEIGHT ADDITION RESULT |
| --- | --- | --- | --- |
| 1703 | LEFT | WHITE→BLACK | ≧j |
| 1705 | RIGHT | BLACK→WHITE | ≧j |
| 1706 | RIGHT | WHITE→BLACK | ≧j |
| 1704 | LEFT | BLACK→WHITE | ≧j |
| 1707 | UPPER | WHITE→BLACK | ≧k |
| 1708 | LOWER | BLACK→WHITE | ≧k |
| 1709 | UPPER | BLACK→WHITE | ≧k |
| 1710 | LOWER | WHITE→BLACK | ≧k |

In TABLE 1: the letter "k" denotes a natural number equal to 1 plus the number of columns of the sample window; the letter "j" denotes a natural number equal to 1 plus the number of lines of the sample window; and the numbers k and j are equal to 8 in this embodiment.

The addition and deletion of ⅓ black portions to provide the corrected dot images 1703–1706 of FIG. 28 are performed by controlling the period during which the electric drive current remains applied to the solid state laser 2002. Since it is generally difficult to provide the corrected dot images 1707 and 1708 of FIG. 28, a corrected black dot image 1711 of FIG. 28 is used in substitution for the corrected dot images 1707 and 1708. The corrected black dot image 1711 corresponds to the corrected dot image signal OW7 of FIG. 27 which feeds the electric drive current to the solid state laser 2002 only during an intermediate portion of the 1-dot period. Since it is generally difficult to provide the corrected dot images 1709 and 1710 of FIG. 28, a corrected white dot image 1712 of FIG. 28 is used in substitution for the corrected dot images 1709 and 1710. The corrected white dot image 1712 corresponds to the corrected dot image signal OW6 of FIG. 27 which feeds the electric drive current to the solid state laser 2002 only during a central portion of the 1-dot period.

Figure 29A:
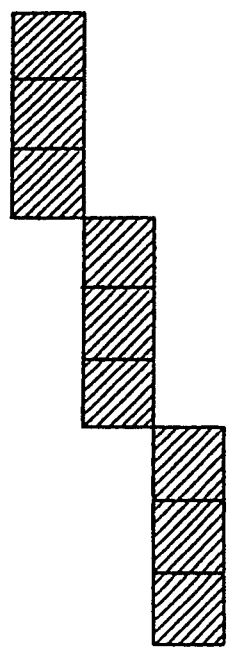
FIG. 29 includes diagrams (a) and (b) which show an original image and a correction-resultant image respectively.
Figure 29B:
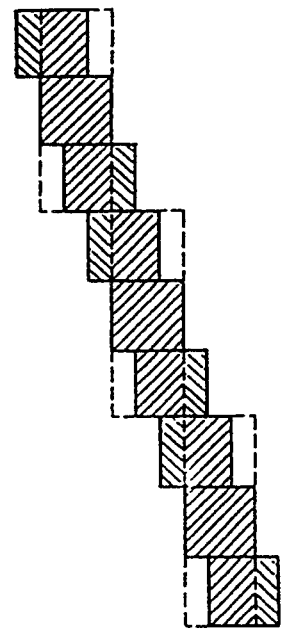
Figure 30A:
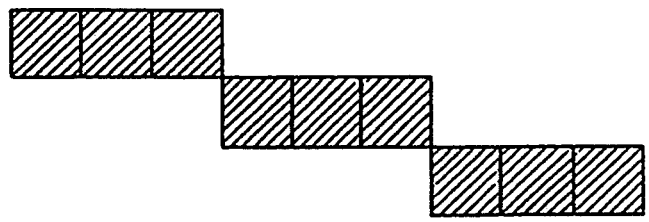
FIG. 30 includes diagrams (a), (b), and (c) which show an original image and correction-resultant images respectively.
Figure 30B:
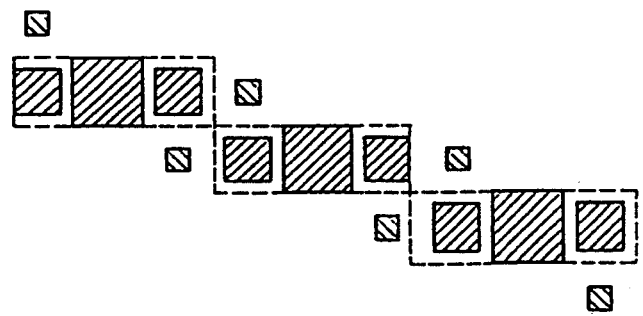
Figure 30C:
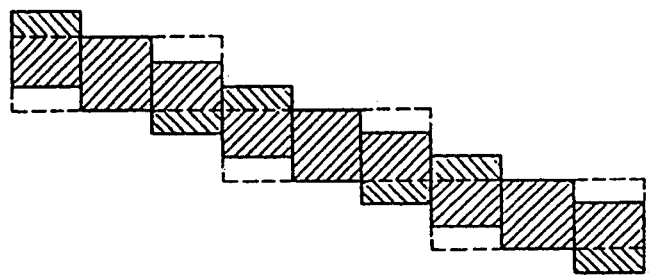

As a result of the correction by this embodiment, an original image of the section (a) of FIG. 29 is revised into an image of the section (b) of FIG. 29. In the case of an original image shown in the section (a) of FIG. 30, the original image is corrected into an image of the section (b) of FIG. 30. Since limited print resolution and visual resolution cause the edges of the image of the section (b) of FIG. 30 to be ambiguous, the image of the section (b) of FIG. 30 is approximately equivalent to an image of the section (c) of FIG. 30 in visual sensation.

Figures 31, 32:
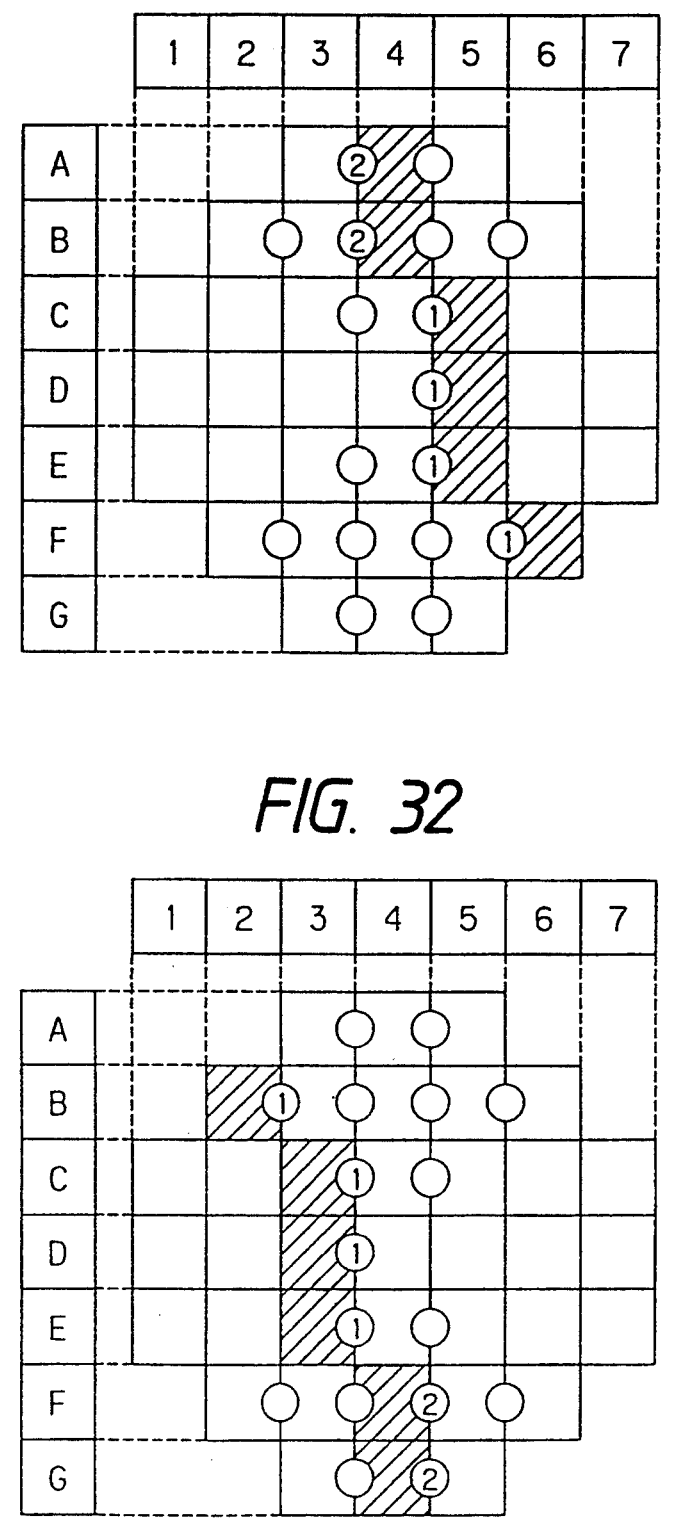
Figure 33A:
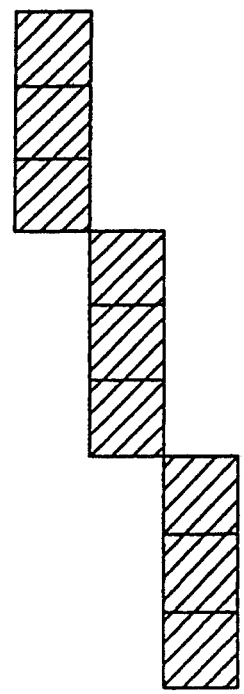
FIG. 33 includes diagrams (a) and (b) which show an original image and a correction-resultant image respectively.
Figure 33B:
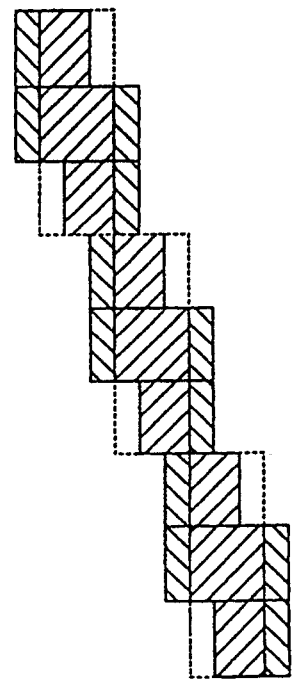

It should be noted that this embodiment may be modified as follows. The edge data selector 106 of FIG. 5 is removed. In this modified case, edge data is calculated through an addition process from the edge detecting positions and the weights of the edges which are denoted by the circles and the numerals in the circles of FIGS. 19–22. For example, in the case of an image pattern of FIG. 31, the result of the addition of the weights of edges is equal to 8 (8=2+2+1+1+1+1) so that a small black portion is added to a right-hand side of the correction-object central dot D4. In the case of an image pattern of FIG. 32, the result of the addition of the weights of edges is equal to 8 (8=1+1+1+1+2+2) so that a small black portion is added to a left-had side of the correction-object central dot D4. Accordingly, an image of the section (a) of FIG. 33 is corrected into an image of the section (b) of FIG. 33.

Figures 34, 35:
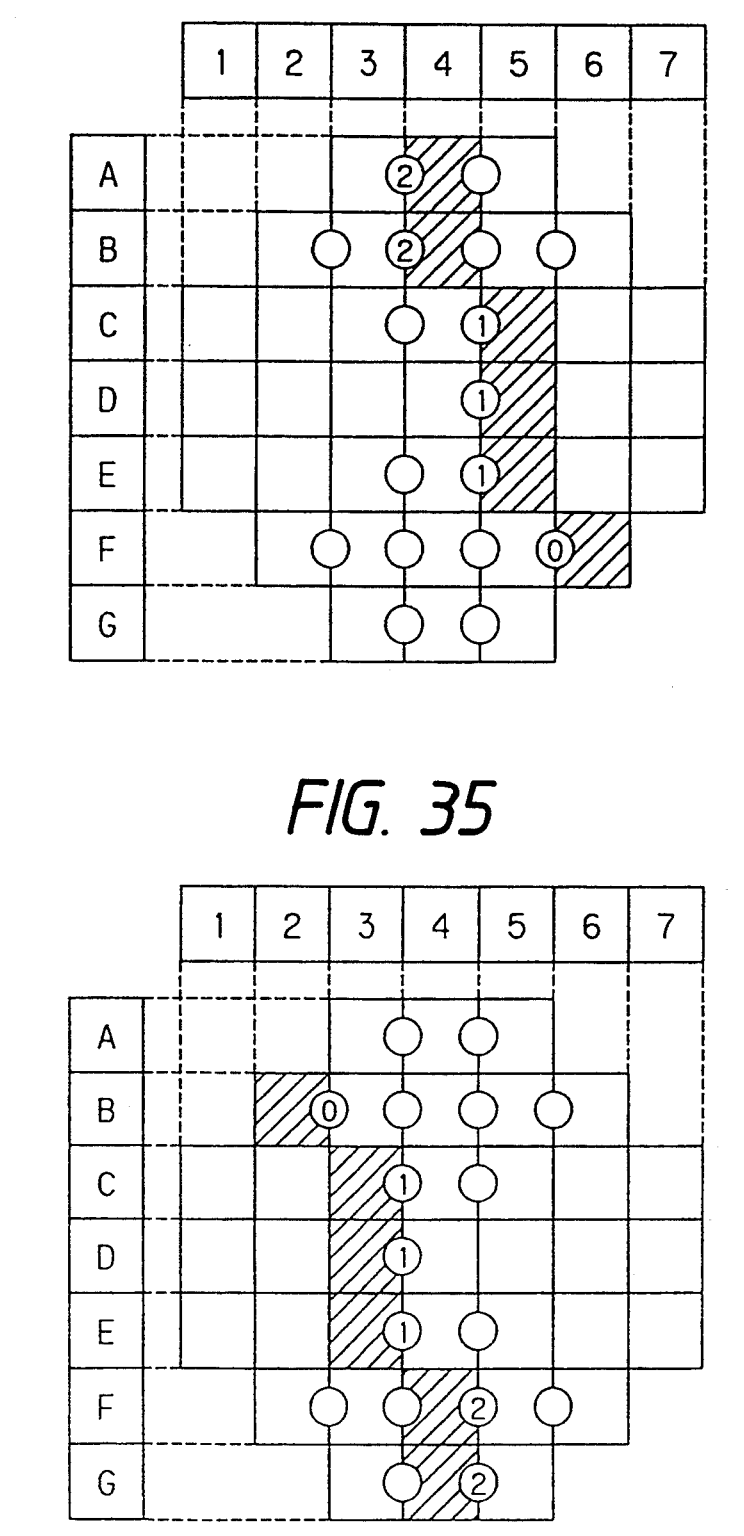
Figure 36A:
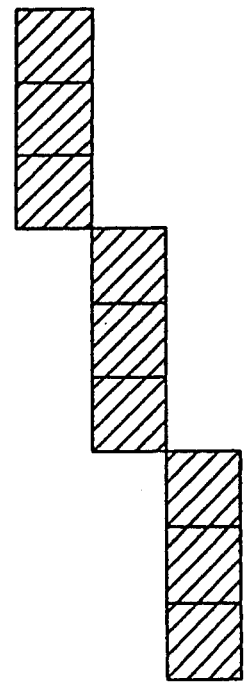
FIG. 36 includes diagrams (a) and (b) which show an original image and a correction-resultant image respectively.
Figure 36B:
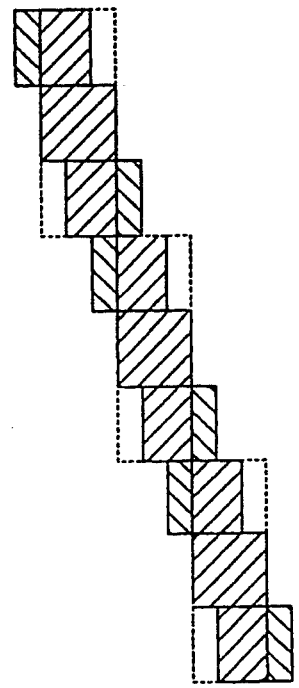
Figure 37:
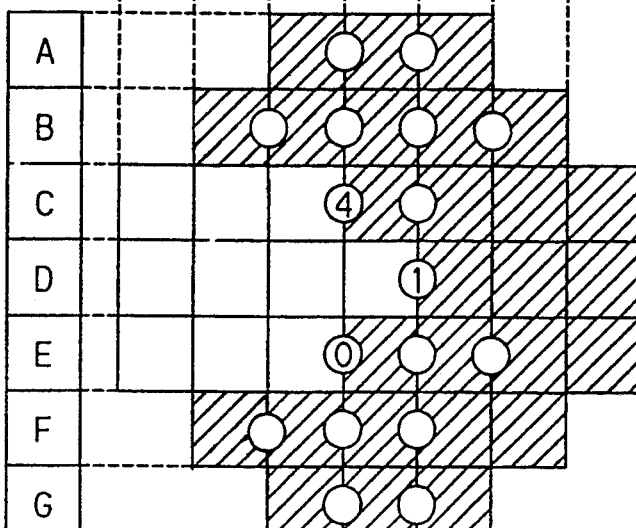
FIG. 37 is a diagram illustrating a ninth example of an image in the sample window.
Figure 38:
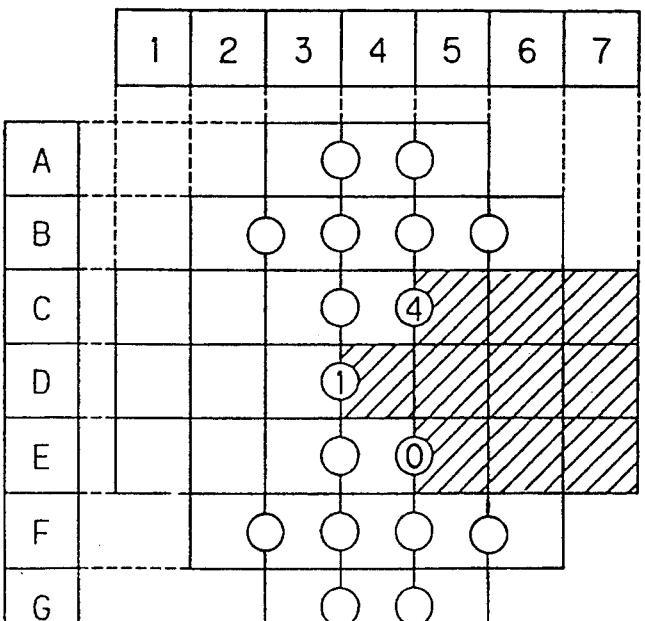
FIG. 38 is a diagram illustrating a tenth example of an image in the sample window.
Figure 39:
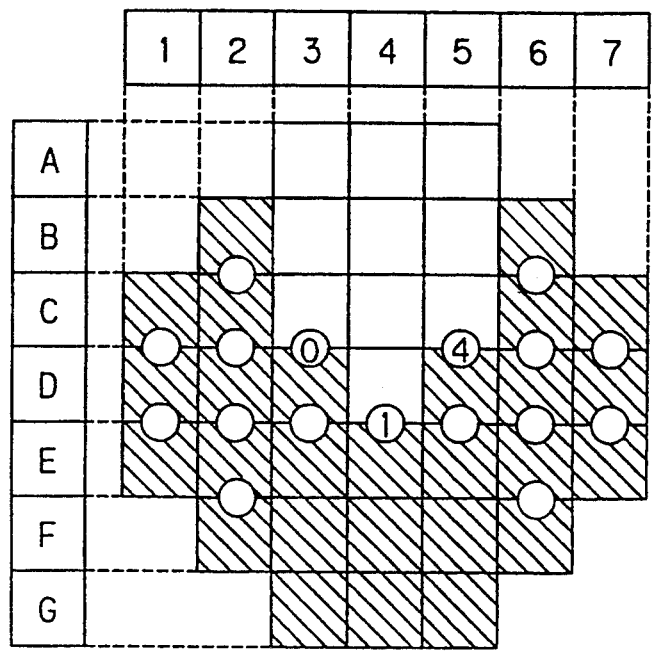
FIG. 39 is a diagram illustrating an eleventh example of an image in the sample window.
Figure 40:
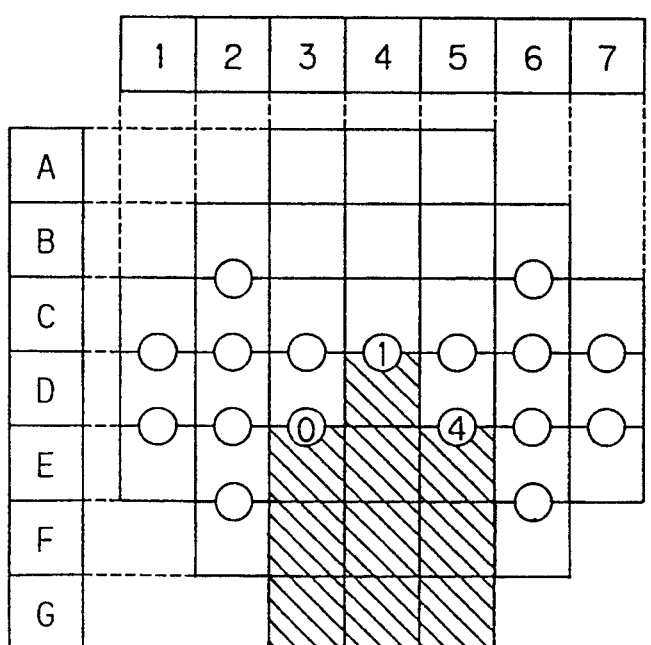
FIG. 40 is a diagram illustrating a twelfth example of an image in the sample window.

In the presence of the edge data selector 106 of FIG. 5, an image of FIG. 34 is handled as follows. The edge data selector 106 ignores the edge between the fifth-column bit and the sixth-column bit in the F line, so that the result of the addition of the weights of edges is equal to 7 (7=2+2+1+1+1+0). Thus, the correction-object central dot D4 is free from any correction. An image of FIG. 35 is handled as follows. The edge data selector 106 ignores the edge between the second-column bit and the third-column bit in the B line, so that the result of the addition of the weights of edges is equal to 7 (7=0+1+1+1+2+2). Thus, the correction-object central dot D4 is free from any correction. Accordingly, an image of the section (a) of FIG. 36 is corrected into an image of the section (b) of FIG. 36.

The adding circuits 404A, 404B, 404C, and 404D (see FIG. 17) will be further described hereinafter. As shown in FIG. 17, the adding circuit includes signal lines VAX23 and VAX25 which transmit the data of the two edges to the 2-input OR gate 1310 from the vertical edge data weighting circuit of FIGS. 15 and 16 and the horizontal edge data weighting circuit via the signal lines AX23 and AX25 or BX23 and BX25. The two edges represented by the data transmitted to the 2-input OR gate 1310 are equal to edges which start outward from the adjacent comers of the central bit D4 along extensions of the side of the central bit D4 opposite the edge adjoining the central bit D4. For example, with reference to FIG. 19, the two edges represented by the data transmitted to the 2-input OR gate 1310 are equal to edges ED2 and ED3 with weights of "4" for the central edge ED1. In the presence of both the two edges, the 2-input OR gate 1310 restricts the two edges into a single edge or ignores one of the two edges, so that final edge data is generated on the basis of only one of the two edges. In the case of U-shaped image patterns of FIGS. 37, 38, 39, and 40, the 2-input OR gate 1310 ignores one of the two weight-4 edges so that the result of the addition of the weights of the edges is equal to 5 (5=4+1+0), and thus the central bit D4 is free from any correction. In this way, the 2-input OR gate 1310 operates to prevent a bit of such a U-shaped image from undergoing correction.

It should be noted that all the weights of edges may be equal to the same coefficient such as "1". In addition, the threshold value for deciding whether or not the correction-object central bit D4 is corrected may be different from "8".

DESCRIPTION OF THE SECOND PREFERRED EMBODIMENT

Figure 41:
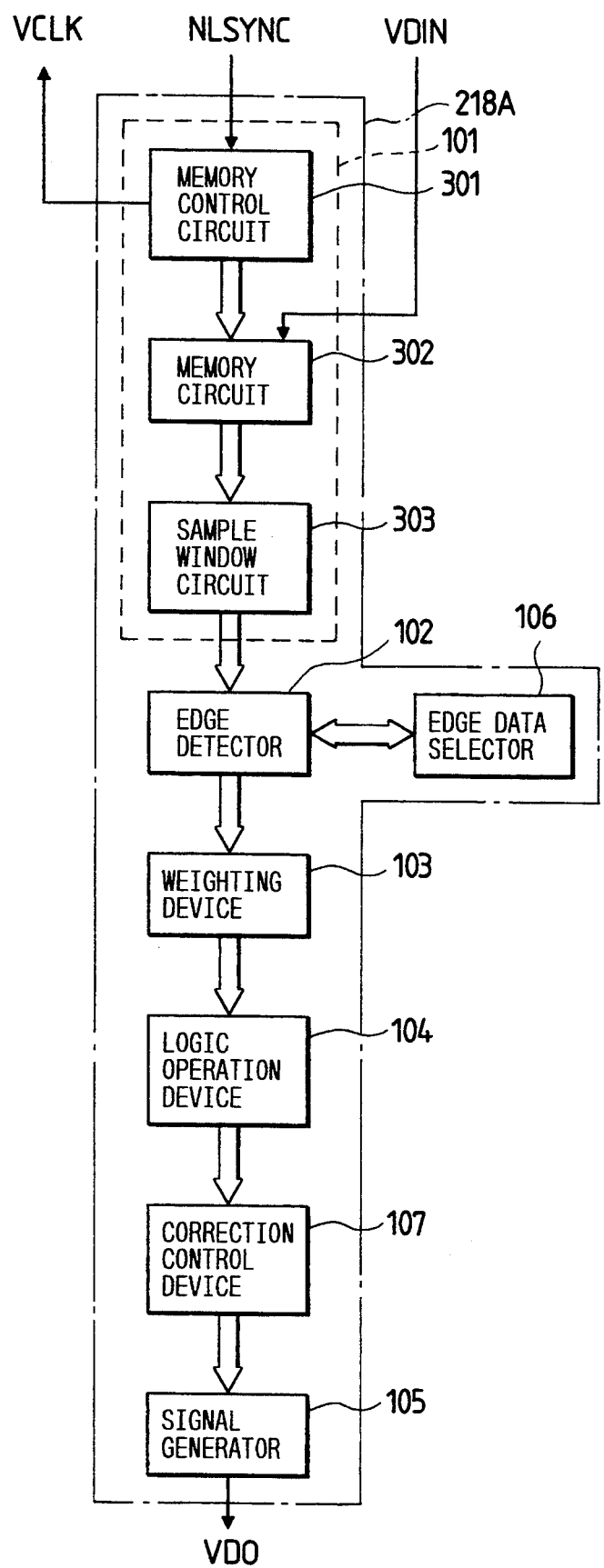
FIG. 41 is a block diagram of a correction circuit according to a second embodiment of this invention.

A second embodiment of this invention is similar to the embodiment of FIGS. 1–40 except for design changes indicated later. FIG. 41 shows a correction circuit 218A in the second embodiment which is basically similar to the correction circuit 218 in the embodiment of FIGS. 1–40 except that a correction control device 107 is added between a logic operation device 104 and a signal generator 105.

Figure 42:
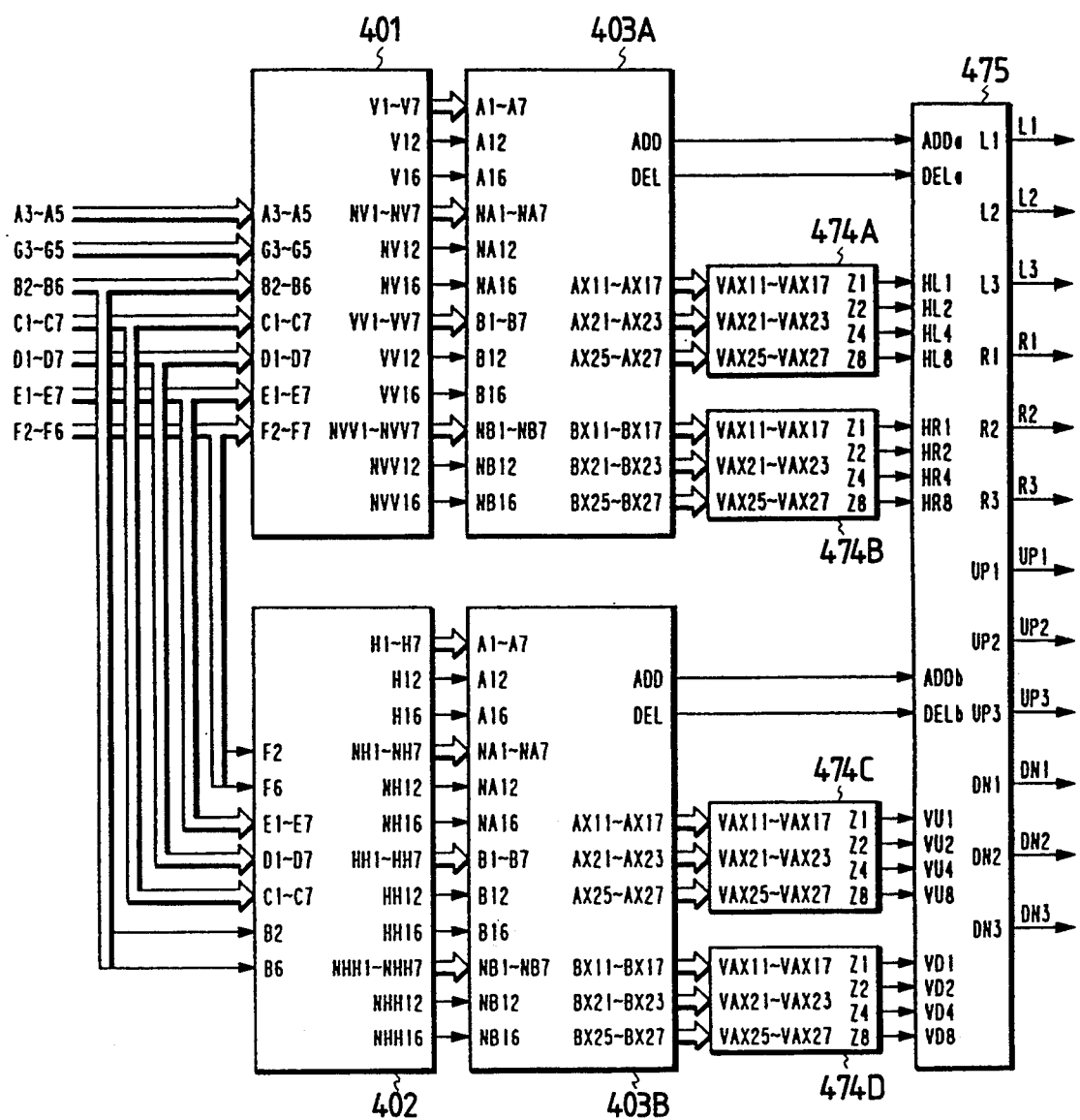
FIG. 42 is a block diagram of a circuitry forming the edge detector, the edge data selector, the weighting device, the logic operation device, and the correction control device in FIG. 41.

FIG. 42 shows a circuitry forming an edge detector 102, an edge data selector 106, a weighting device 103, the logic operation device 104, and the correction control device 107. The circuitry of FIG. 42 includes a vertical edge detecting and selecting circuit 401, a horizontal edge detecting and selecting circuit 402, a vertical edge data weighting circuit 403A, a horizontal edge data weighting circuit 403B, adding circuits 474A, 474B, 474C, and 474D, and a correction control circuit 475. The adding circuits 474A, 474B, 474C, and 474D compose the logic operation device 104. The correction control circuit 475 forms the correction control device 107.

Figure 43:
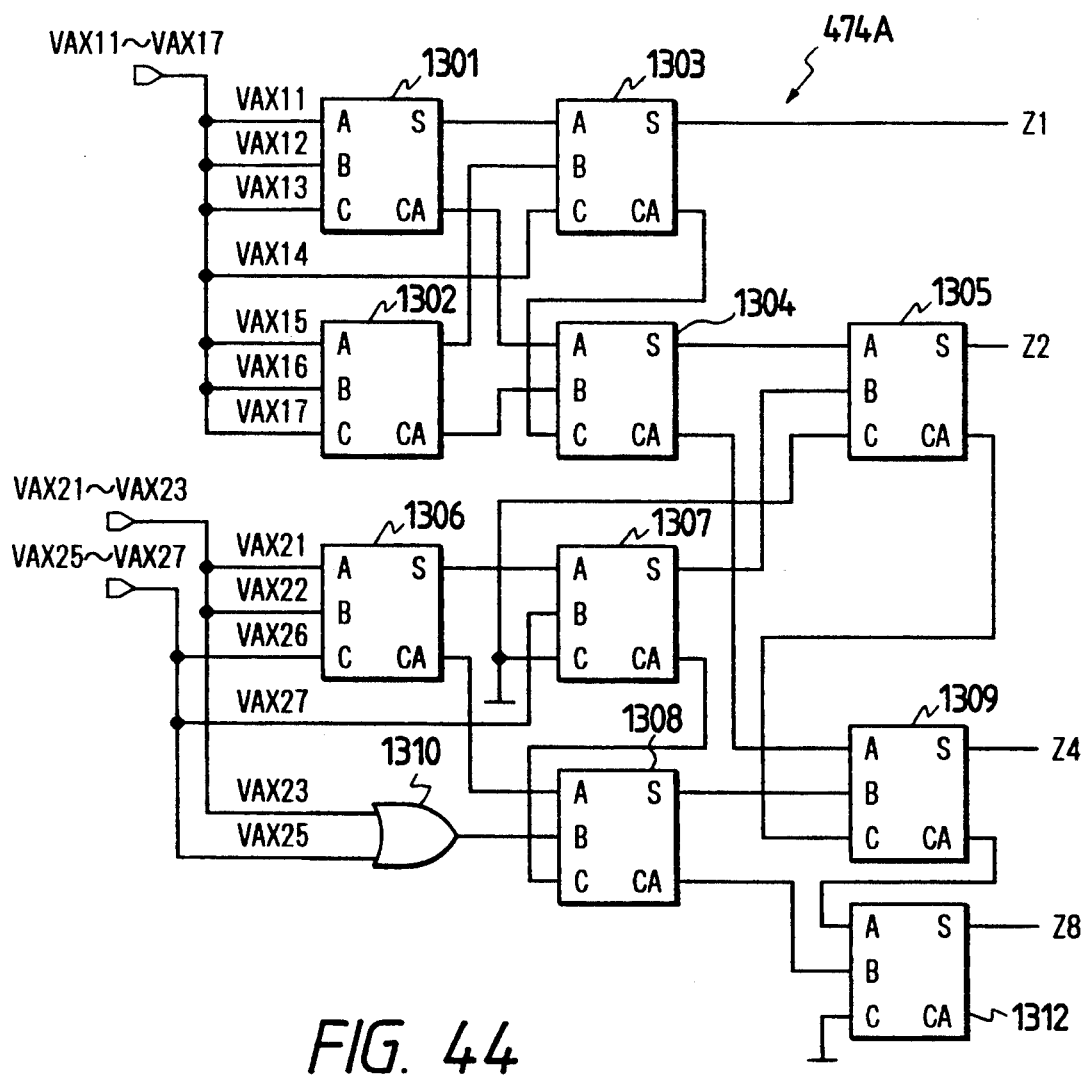
FIG. 43 is a block diagram of an adding circuit which is contained in the correction circuit of FIG. 41.
Figure 44:
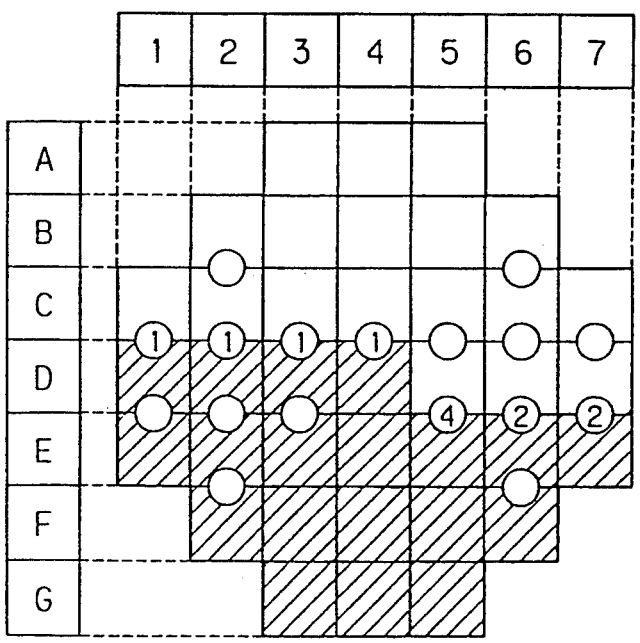
FIG. 44 is a diagram illustrating a thirteenth example of an image in the sample window.

FIG. 43 shows the adding circuit 404A which includes 3-input 1-bit full adders 1301–1309 and 1312, and a 2-input OR gate 1310. The adding circuits 474B, 474C, and 474D have a structure similar to the structure of FIG. 43. In the adding circuits 474A, 474B, 474C, and 474D (see FIG. 43), signal lines VAX11-VAX17, VAX21-VAX23, and VAX25-VAX27 transmit the classified and collected edge data from the vertical edge data weighting circuit and the horizontal edge data weighting circuit via signal lines AX11-AX17, AX21-AX23, and AX25-AX27, and signal lines BX11-BX17, BX21-BX23, and BX25-BX27. In the adding circuits 474A, 474B, 474C, and 474D, edge data from the signal lines VAX11-VAX17 which have weights of "1" (see FIGS. 19–22), edge data from the signal lines VAX21, VAX22, VAX26, and VAX27 which have weights of "2", and edge data from the signal lines VAX23 and VAX25 which have weights of "4" are subjected to logic operation by the 3-input 1-bit full adders 1301–1309 and 1312 and the 2-input OR gate 1310. The result of the logic operation is outputted via signal lines Z1, Z2, Z4, and Z8 as binary-coded correction data. For example, in the pattern of FIG. 23, the result of the logic operation executed by the adding circuit is equal to "8" in weight (8=1+4+1+1+1), and "8" is expressed as "1000" in binary notation so that data of "1" is outputted only to the signal line Z8. In the pattern of FIG. 24, the result of the logic operation executed by the adding circuit is equal to "8" in weight (8=1+1+1+4+1), and "8" is expressed as "1000" in binary notation so that data of "1" is outputted only to the signal line Z8. In the pattern of FIG. 25, the result of the logic operation executed by the adding circuit is equal to "9" in weight (9=2+2+1+1+1+1+1), and "9" is expressed as "1001" in binary notation so that data of "1" is outputted to the signal lines Z1 and Z8. In the pattern of FIG. 26, the result of the logic operation executed by the adding circuit is equal to "10" in weight (10=1+1+1+4+2+1), and "10" is expressed as "1010" in binary notation so that data of "1" is outputted to the signal lines Z2 and Z8. In the pattern of FIG. 44, the result of the logic operation executed by the adding circuit is equal to "12" in weight (12=1+1+1+1+4+2+2), and "12" is expressed as "1100" in binary notation so that data of "1" is outputted to the signal lines Z4 and Z8.

Figure 45:
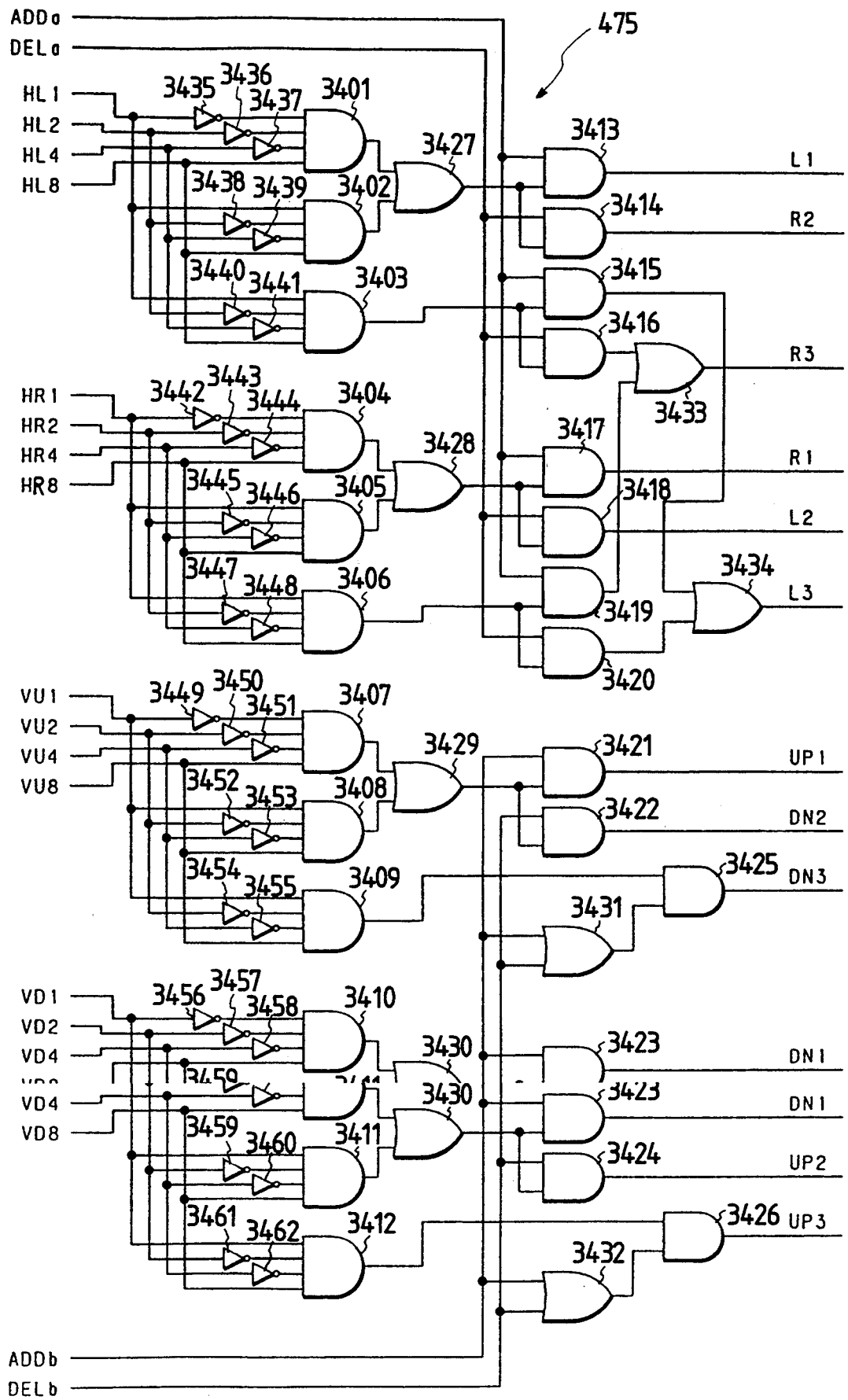
FIG. 45 is a block diagram of the correction control device in FIG. 41.

FIG. 45 shows the correction control circuit 475 which includes 4-input AND gates 3401-3412, 2-input AND gate 3413-3426, 2-input OR gates 3427-3434, and inverters 3435-3462. In the correction control circuit 475, signal lines HL1, HL2, HL4, HL8. HR1, HR2, HR4, and HR8, VU1, VU2, VU4, VU8, VD1, VD2. VD4, and VD8 transmit the correction data from the adding circuits 474A, 474B, 474C, and 474D via the signal lines Z1, Z2, Z4, and Z8. In addition, signal lines ADDa, DELa, ADDb, and DELb transmit the data from the vertical edge data weighting circuit 403A and the horizontal edge data weighting circuit 403B via the signal lines ADD and DEL. The data transmitted from the adding circuits 474A, 474B, 474C, and 474D, and the data transmitted from the vertical edge data weighting circuit 403A and the horizontal edge data weighting circuit 403B are subjected to logic operation by the 4 input AND gates 3401-3412, the 2-input AND gates 3413-3426, the 2-input OR gates 3427-3434, and the inverters 3435-3462. The data which results from this logic operation is outputted to signal lines L1, L2, L3, R1, R2, R3, UP1, UP2, UP3, DN1, DN2, and DN3. For example, in the case of the pattern of FIG. 23, data of "1" is fed from the adding circuit 474B to the signal line HR8 via the signal line Z8, and data of "1" is fed from the vertical edge data weighting circuit 403A to the signal line ADDa via the signal line ADD, so that the 2-input AND gate 3417 outputs data of "1" to the signal line R1. In the case of the pattern of FIG. 44, data of "1" are fed from the adding circuit 474C to the signal lines VU4 and VU8 via the signal lines Z4 and Z8, and data of "1" is fed from the horizontal edge data weighting circuit 403B to the signal line DELb via the signal line DEL, so that the 2-input AND gate 3425 outputs data of "1" to the signal line DN3.

Figure 46:
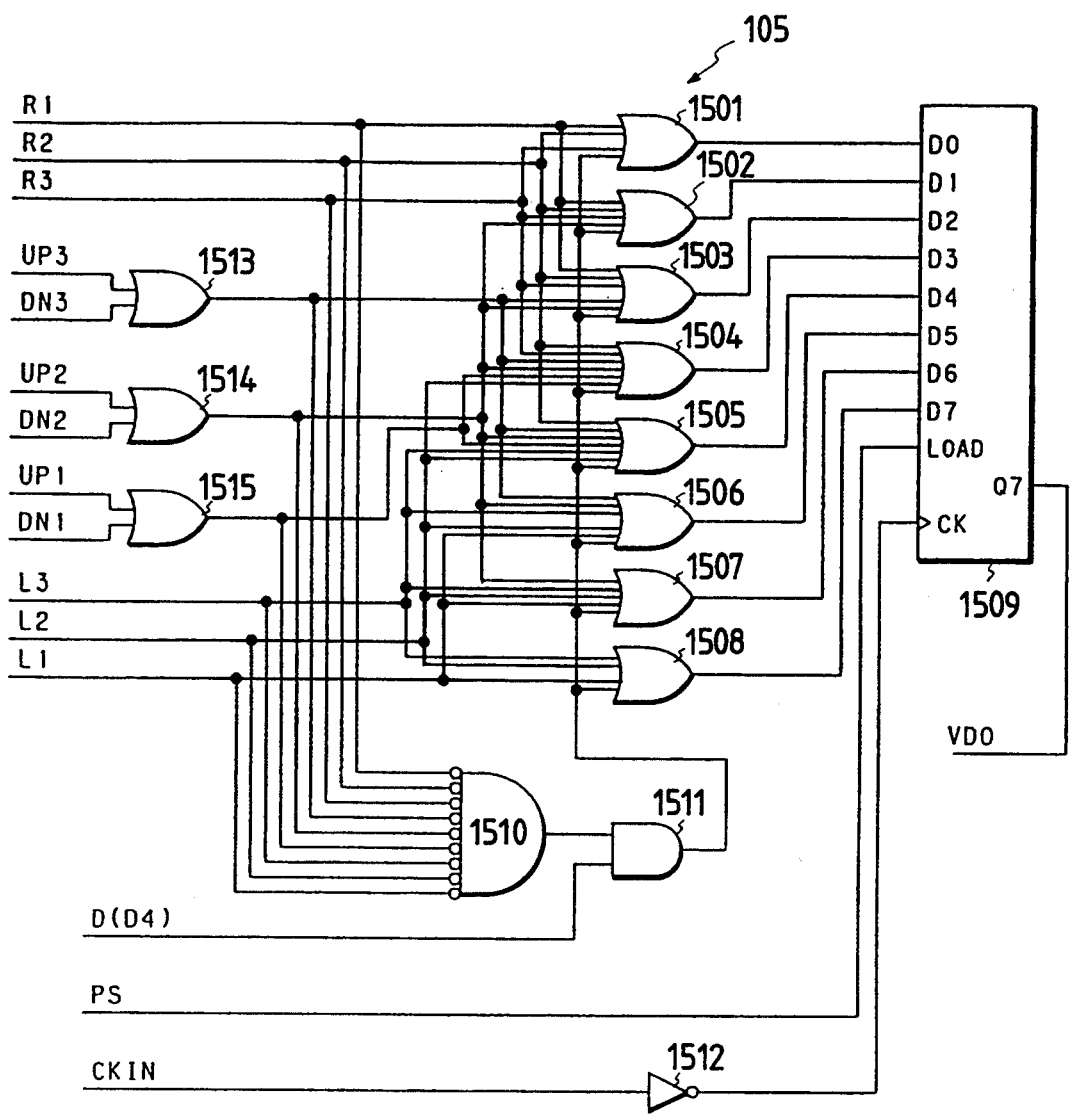
FIG. 46 is a block diagram of the signal generator in FIG. 41.

FIG. 46 shows the signal generator 105 which includes 4-input OR gates 1501 and 1508, 5-input OR gates 1502 and 1507, 6-input OR gates 1503 and 1506, 7-input OR gates 1504 and 1505, an 8-bit parallel-load serial-output shift register 1509, a 9-input NOR gate 1510, a 2-input AND gate 1511, an inverter 1512, and 2-input OR gates 1513, 1514, and 1515. The signal generator 105 of FIG. 46 receives the data from the correction control circuit 475 of FIG. 45 via the signal lines L1, L2, L3, R1, R2, R3, UP1, UP2, UP3, DN1, DN2, and DN3. The signal generator 105 corrects the data represented by the correction-object bit central bit D4 of the sample window in accordance with the output data from the correction control circuit 474. The 8-bit shift register 1509 in the signal generator 105 outputs the result of the correction.

Figure 47:
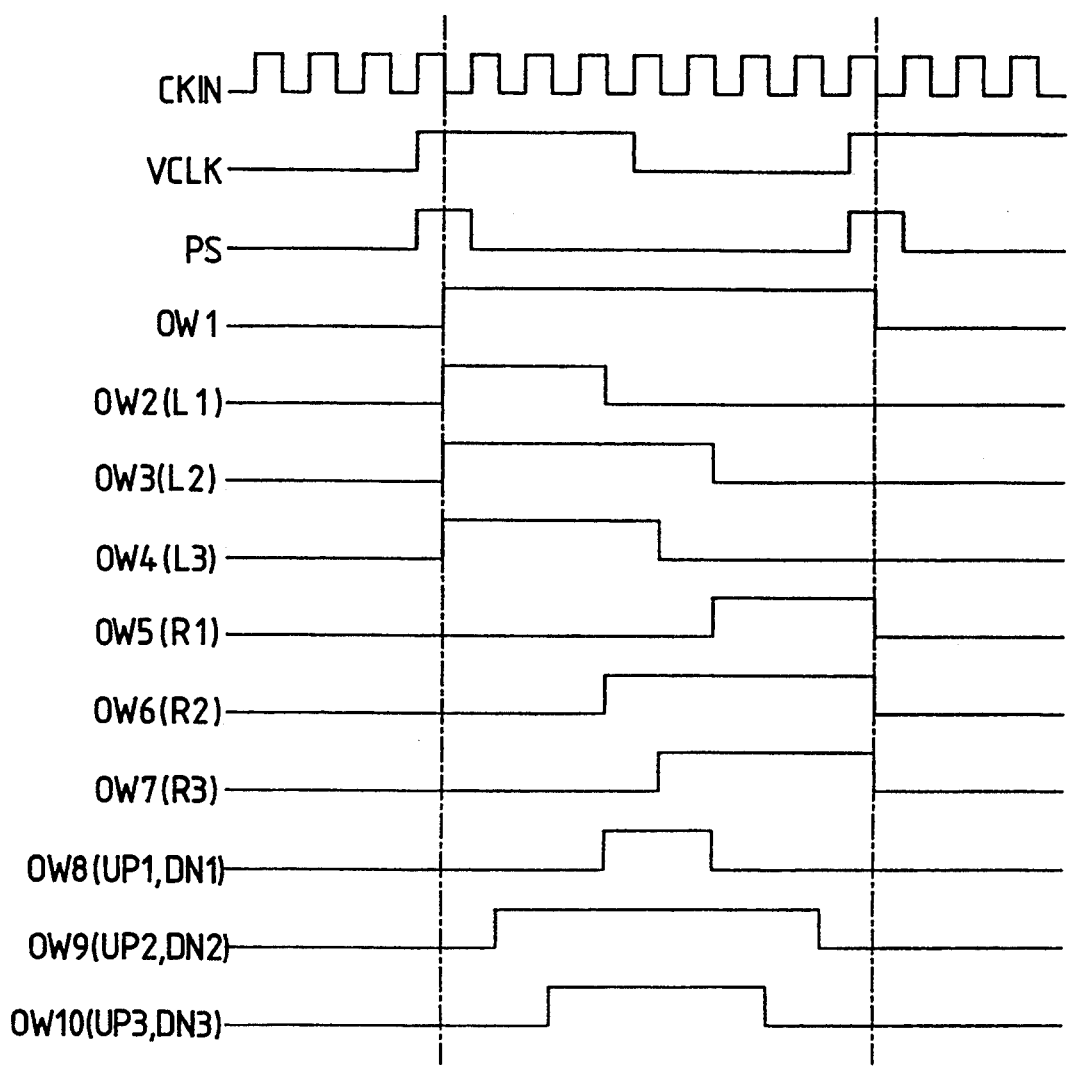
FIG. 47 is a timing diagram showing the waveforms of various signals in the signal generator of FIG. 46.

The operation of the signal generator 105 of FIG. 46 will be further described hereinafter. For example, in the case of the pattern of FIG. 23, the data from the signal line R1 is "1" which is transmitted to the input terminals D0-D2 of the 8-bit shift register 1509 via the 4-input OR gate 1501, the 5-input OR gate 1502, and the 6-input OR gate 1503, and the data of "0" is applied to the input terminals D3-D7 of the 8-bit shift register 1509. The 8-bit shift register 1509 is loaded with these D0-D7 data in response to a timing signal PS. The timing signal PS has a waveform such as shown in FIG. 47. The 8-bit shift register 1509 receives a clock signal CKIN via the inverter 1512. The clock signal CKIN has a waveform such as shown in FIG. 47. The 8-bit shift register 1509 outputs a corrected image dot signal OW5 to the signal line VDO in response to the clock signal CKIN. The corrected image dot signal OW5 has a waveform such as shown in FIG. 47. In the case of the pattern of FIG. 44, the data from the signal line DN3 is "1" which is transmitted to the input terminals D2-D5 of the 8obit shift register 1509 via the 2-input OR gate 1513, the 6-input OR gates 1503 and 1506, and the 7-input OR gates 1504 and 1505, and the data of "0" is applied to the input terminals D0, D 1, D6, and D7 of the 8-bit shift register 1509. The 8-bit shift register 1509 is loaded with these D0-D7 data in response to the timing signal PS (see FIG. 47). The 8-bit shift register 1509 outputs a corrected image dot signal OW10 to the signal line VDO in response to the clock signal CKIN (see FIG. 47). The corrected image dot signal OW10 has a waveform such as shown in FIG. 47.

FIG. 47 shows the waveforms of corrected image dot signals OW2-OW10 responsive to the data of "1" transmitted via the signal lines L1, L2, L3, R1, R2, R3, UP1, UP2, UP3, DN1, DN2, and DN3. In FIG. 47, the signal OW1 is equal to an image dot signal generated when the correction-object central bit D4 in the sample window is "1" and all the data transmitted via the signal lines L1, L2, L3, R1, R2, R3, UP1, UP2, UP3, DN1, DN2, and DN3 are "0" (that is, the correction-object central bit D4 is free from any correction). The signals OW2-OW10 are equal to image dot signals subjected to corrections. Specifically, the corrected image dot signal OW2 is generated when the correction-object central bit D4 in the sample window is "1" and only the data transmitted via the signal line L1 is "1". The corrected image dot signal OW3 is generated when the correction-object central bit D4 in the sample window is "1" and only the data transmitted via the signal line L2 is "1". The corrected image dot signal OW4 is generated when the correction-object central bit D4 in the sample window is "1" and only the data transmitted via the signal line L3 is "1". The corrected image dot signal OW5 is generated when the correction-object central bit D4 in the sample window is "1" and only the data transmitted via the signal line R1 is "1". The corrected image dot signal OW6 is generated when the correction-object central bit D4 in the sample window is "1" and only the data transmitted via the signal line R2 is "1". The corrected image dot signal OW7 is generated when the correction-object central bit D4 in the sample window is "1" and only the data transmitted via the signal line R3 is "1". The corrected image dot signal OW8 is generated when the correction-object central bit D4 in the sample window is "1" and only the data transmitted via the signal line UP1 or DN1 is "1". The corrected image dot signal OW9 is generated when the correction-object central bit D4 in the sample window is "1" and only the data transmitted via the signal line UP2 or DN2 is "1". The corrected image dot signal OW10 is generated when the correction-object central bit D4 in the sample window is "1" and only the data transmitted via the signal line UP3 or DN3 is "1". In the case where two or more of the corrected image dot signals OW2-OW10 are simultaneously generated, the generated image dot signals are combined through logic OR operation into a final corrected image dot signal VDO.

Figure 48:
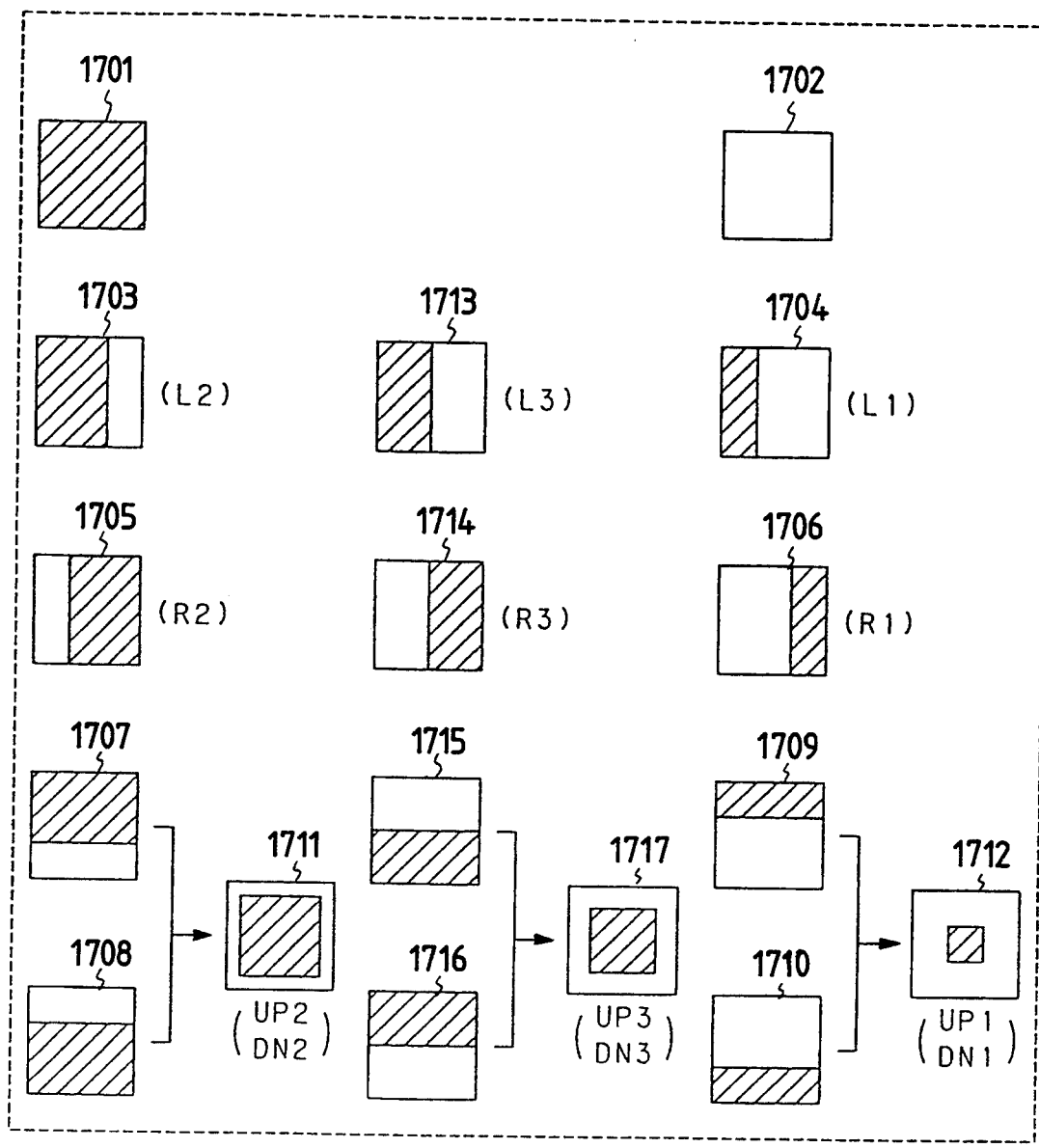
FIG. 48 is a diagram illustrating the relation between corrected image dot signals and corresponding dot images.

FIG. 48 shows dot images corresponding to corrected and uncorrected image dot signals respectively. In FIG. 48, an uncorrected black dot image 1701 corresponds to the image dot signal OW1, and an uncorrected white dot image 1702 corresponds to an image dot signal of "0". In addition, a corrected black dot image 1703, from which a right-hand $\frac{1}{3}$ black portion is deleted, corresponds to the corrected image dot signal OW3 (generated when only the data on the signal line L2 is "1"). A corrected white dot image 1704, to which a left-hand $\frac{1}{3}$ black portion is added, corresponds to the corrected image dot signal OW2 (generated when only the data on the signal line L1 is "1"). A corrected black dot image 1705, from which a left-hand $\frac{1}{3}$ black portion is deleted, corresponds to the corrected image dot signal OW6 (generated when only the data on the signal line R2 is "1"). A corrected black dot image 1707, from which a lower $\frac{1}{3}$ black portion is deleted, corresponds to the corrected image dot signal OW9 (generated when only the data on the signal line UP2 is "1"). A corrected black dot image 1708, from which an upper $\frac{1}{3}$ black portion is deleted, corresponds to the corrected image dot signal OW9 (generated when only the data on the signal line DN2 is "1"). A corrected white dot image 1709, to which an upper $\frac{1}{3}$ black portion is added, corresponds to the corrected image dot signal OW8 (generated when only the data on the signal line UP1 is "1"). A corrected white dot image 1710, to which a lower $\frac{1}{3}$ black portion is added, corresponds to the corrected image dot signal OW8 (generated when only the data on the signal line DN1 is "1"). A corrected black dot image 1713, from which a right-hand $\frac{1}{2}$ black portion is deleted, corresponds to the corrected image dot signal OW4 (generated when only the data on the signal line L3 is "1"). A corrected black dot image 1714, from which a left-hand $\frac{1}{2}$ black portion is deleted, corresponds to the corrected image dot signal OW7 (generated when only the data on the signal line R3 is "1"). A corrected black dot image 1715, from which an upper $\frac{1}{2}$ black portion is deleted, corresponds to the corrected image dot signal OW10 (generated when only the data on the signal line UP3 is "1"). A corrected black dot image 1716, from which a lower $\frac{1}{2}$ black portion is deleted, corresponds to the corrected image dot signal OW10 (generated when only the data on the signal line DN3 is "1"). The corrected dot images 1703-1710, and 1713-1716 are selected in accordance with edges related to the correction-object central bit D4 in the sample window of FIG. 6.

The addition and deletion of $\frac{1}{3}$ and $\frac{1}{2}$ black portions to provide the corrected dot images 1703-1706, 1713, and 1714 of FIG. 48 are performed by controlling the period during which the electric drive current remains applied to a solid state laser 2002 (see FIG. 2). Since it is generally difficult to provide the corrected dot images 1707 and 1708 of FIG. 48, a corrected black dot image 1711 of FIG. 48 is used in substitution for the corrected dot images 1707 and 1708. The corrected black dot image 1711 corresponds to the corrected dot image signal OW9 of FIG. 47 which feeds the electric drive current to the solid state laser 2002 only during a larger intermediate portion of the 1-dot period. Since it is generally difficult to provide the corrected dot images 1709 and 1710 of FIG. 48, a corrected white dot image 1712 of FIG. 48 is used in substitution for the corrected dot images 1709 and 1710. The corrected white dot image 1712 corresponds to the corrected dot image signal OW8 of FIG. 47 which feeds the electric drive current to the solid state laser 2002 only during a central portion of the 1-dot period. Since it is generally difficult to provide the corrected dot images 1715 and 1716 of FIG. 48, a corrected white dot image 1717 of FIG. 48 is used in substitution for the corrected dot images 1715 and 1716. The corrected white dot image 1717 corresponds to the corrected dot image signal OW10 of FIG. 47 which feeds the electric drive current to the solid state laser 2002 only during a smaller intermediate portion of the 1-dot period.

Figure 49A:
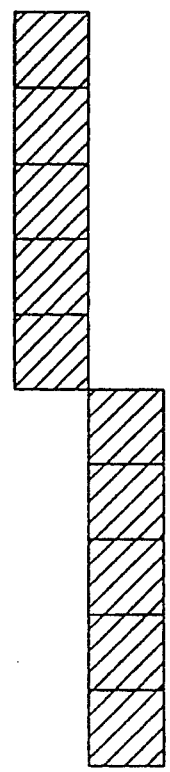
FIG. 49 includes diagrams (a) and (b) which show an original image and a correction-resultant image respectively.
Figure 49B:
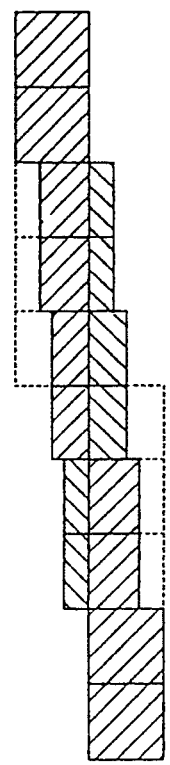
Figure 50A:
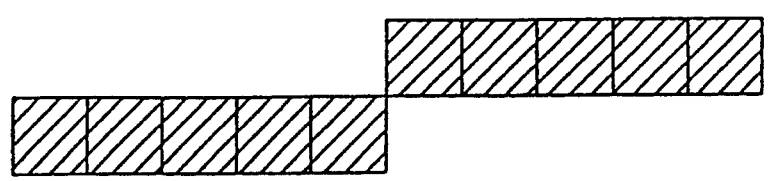
FIG. 50 includes diagrams (a), (b), and (c) which show an original image and correction-resultant images respectively.
Figure 50B:
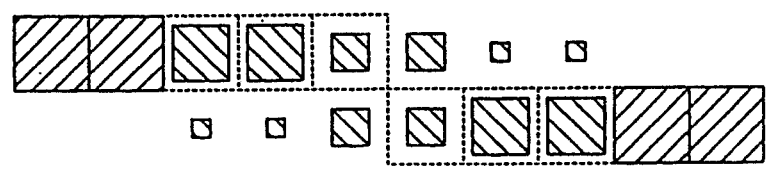
Figure 50C:
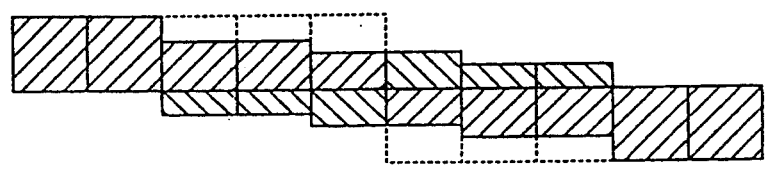

As a result of the correction by this embodiment, an original image of the section (a) of FIG. 49 is revised into an image of the section (b) of FIG. 49. In the case of an original image shown in the section (a) of FIG. 50, the original image is corrected into an image of the section (b) Of FIG. 50. Since limited print resolution and visual resolution cause the edges of the image of the section (b) of FIG. 50 to be ambiguous, the image of the section (b) of FIG. 50 is approximately equivalent to an image of the section (c) of FIG. 50 in visual sensation.

DESCRIPTION OF THE THIRD PREFERRED EMBODIMENT

Figure 51:
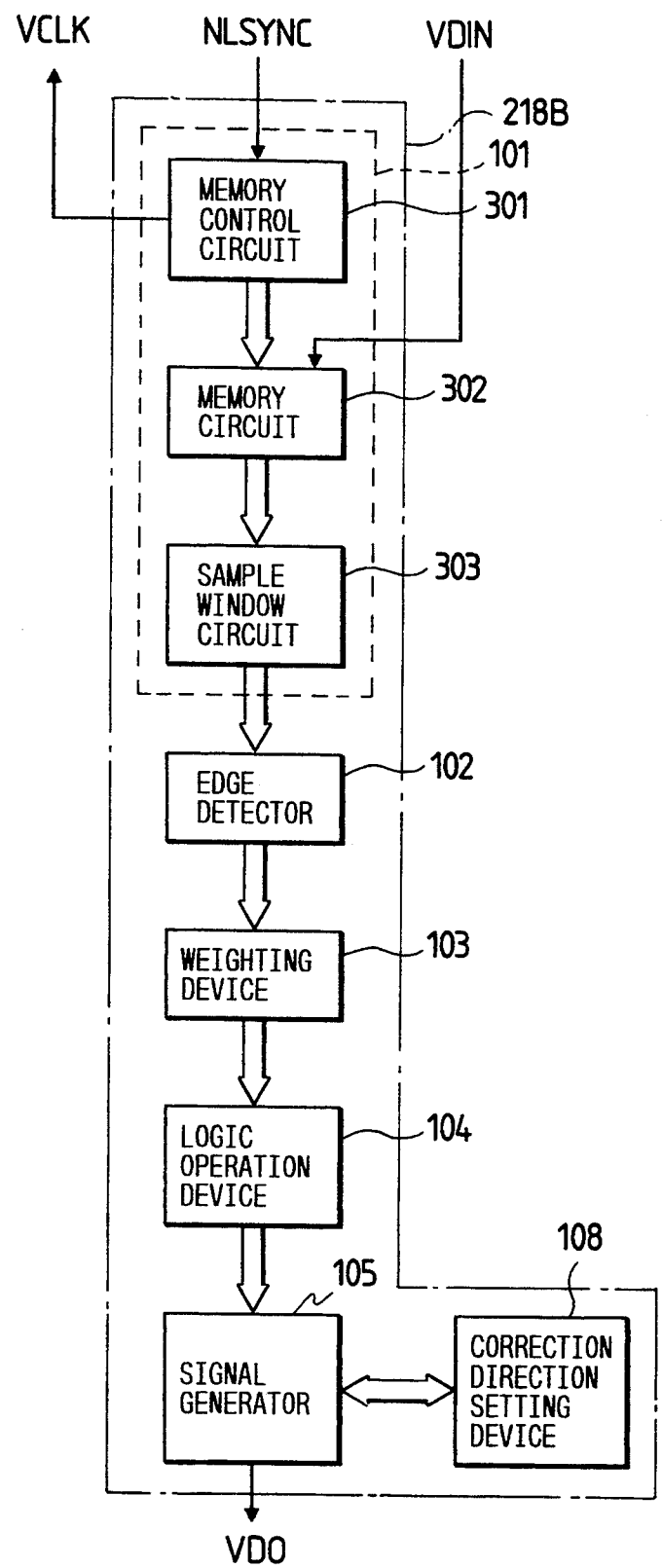
FIG. 51 is a block diagram of a correction circuit according to a third embodiment of this invention.

A third embodiment of this invention is similar to the embodiment of FIGS. 1-40 except for design changes indicated later. FIG. 51 shows a correction circuit 218B in the third embodiment which is basically similar to the correction circuit 218 in the embodiment of FIGS. 1-40 except that a correction direction setting device 108 is added but an edge data selector 106 is omitted.

Figure 52:
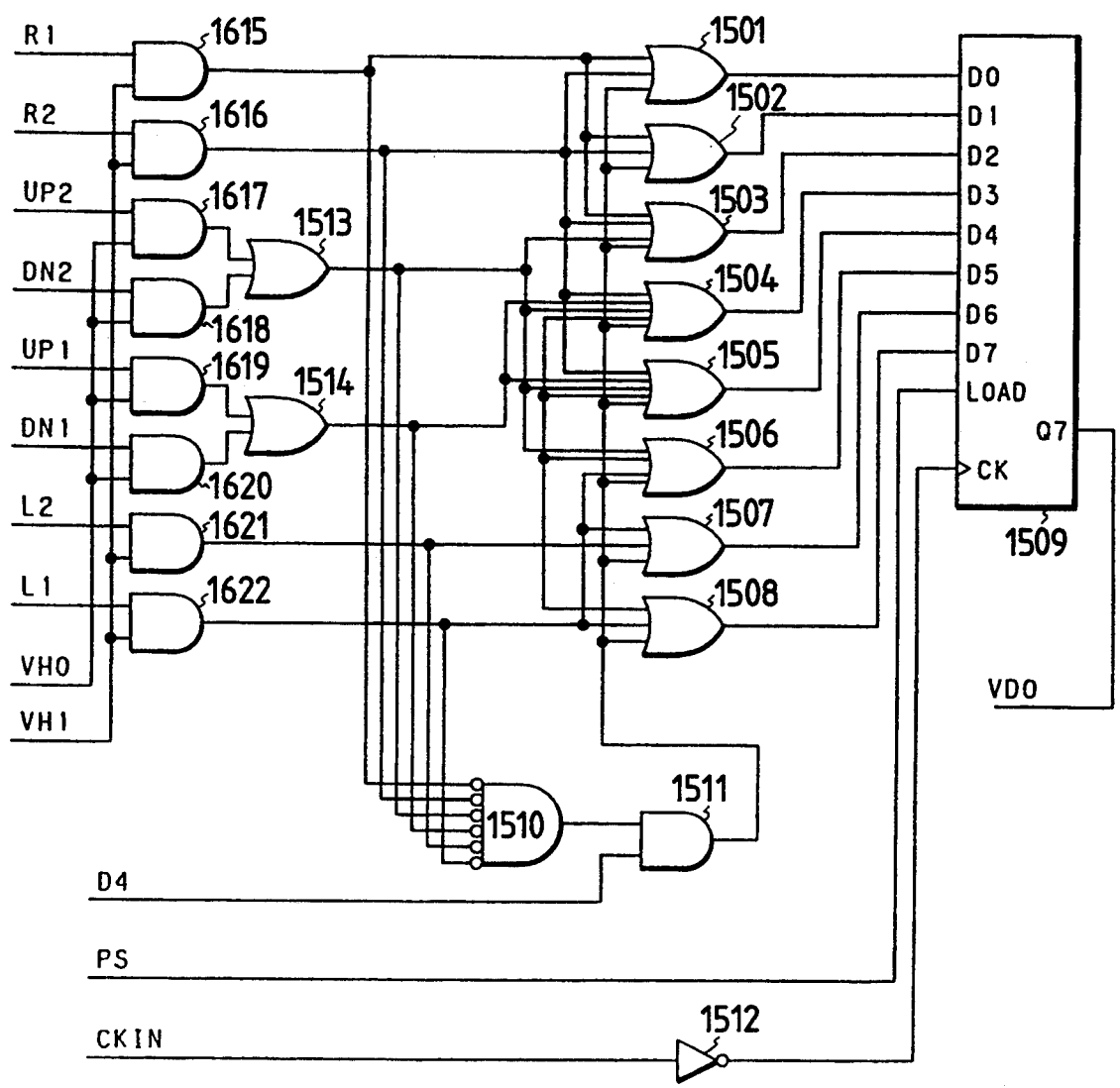
FIG. 52 is a block diagram of a circuitry forming the signal generator and the correction direction setting device in FIG. 51.

FIG. 52 shows a circuitry forming a signal generator 105 and the correction direction setting device 108. The circuitry of FIG. 8 includes 3-input OR gates 1501, 1502, 1507, and 1508, 5-input OR gates 1504 and 1505, 4-input OR gates 1503 and 1506, an 8-bit parallel-load serial-output shift register 1509, a 6-input NOR gate 1510, a 2-input AND gate 1511, an inverter 1512, 2-input OR gates 1513 and 1514, and 2-input AND gates 1615-1622.

The circuitry of FIG. 52 receives the data from the 2-input AND gates 405-412 (see FIG. 10) via the signal lines L1, L2, R1, R2, UP1, UP2, DN1, and DN2. In addition, the circuitry of FIG. 52 receives setting data via signal lines VH0 and VH1 which determine which of horizontal-direction edges and vertical-direction edges are subjected to the correction. The circuitry of FIG. 52 corrects the data represented by the correction-object central bit D4 of the sample window in accordance with the output data from the 2-input AND gates 405-412 (see FIG. 10) and the setting data fed via the signal lines VH0 and VH1. The 8-bit shift register 1509 in the circuitry of FIG. 52 outputs the result of the correction.

The operation of the circuitry of FIG. 52 will be further described hereinafter. Operating a manual switch (not shown) in a control panel within a printer engine 209 (see FIG. 4) changes the setting data on the signal lines VH0 and VH1. When vertical-direction edges are required to undergo the correction, the manual switch is operated so that the setting data on the signal line VH0 will be "0" but the setting data on the signal line VH1 will be "1". When horizontal-direction edges are required to undergo the correction, the manual switch is operated so that the setting data on the signal line VH0 will be "1" but the setting data on the signal line VH1 will be "0". When both vertical-edges and horizontal-direction edges are required to undergo the correction, the manual switch is operated so that the setting data on the signal line VH0 will be "1" and also the setting data on the signal line VH1 will be "1". When no correction is required, the manual switch is operated so that the setting data on the signal line VH0 will be "0" and also the setting data on the signal line VH1 will be "0".

When both the data on the signal lines VH0 and VH1 are "1", the 2-input AND gates 1615–1622 are opened so that all the data from the 2-input AND gates 405–412 (see FIG. 10) via the signal lines L1, L2, R1, R2, UP1, UP2, DN1, and DN2 are further transmitted to the inner portion of the circuitry of FIG. 52. In this case, the inner portion of the circuitry of FIG. 52 operates similarly to the operation of the signal generator 105 of FIG. 18, and both vertical-direction edges and horizontal-direction edges are subjected to the correction. When both the data on the signal lines VH0 and VH1 are "0", the 2-input AND gates 1615–1622 are closed so that all the data from the 2-input AND gates 405–412 (see FIG. 10) via the signal lines L1, L2, R1, R2, UP1, UP2, DN1, and DN2 are inhibited from entering the inner portion of the circuitry of FIG. 52. In this case, no correction is executed on any vertical-direction edges and horizontal-direction edges. When both the data on the signal line VH0 is "0" but the data on the signal line VH1 is "1", the 2-input AND gates 1617–1620 are closed but the 2-input AND gates 1615, 1616, 1621, and 1622 are opened so that only the data from the 2-input AND gates 405–408 (see FIG. 10) via the signal lines L1, L2, R1, and R2 are further transmitted to the inner portion of the circuitry of FIG. 52. In this case, only vertical-direction edges are subjected to the correction. When both the data on the signal line VH0 is "1" but the data on the signal line VH1 is "0", the 2-input AND gates 1617–1620 are opened but the 2-input AND gates 1615, 1616, 1621, and 1622 are closed so that only the data from the 2-input AND gates 409–412 (see FIG. 10) via the signal lines UP1, UP2, DN1, and DN2 are further transmitted to the inner portion of the circuitry of FIG. 52. In this case, only horizontal-direction edges are subjected to the correction.

DESCRIPTION OF THE FOURTH PREFERRED EMBODIMENT

Figure 53:
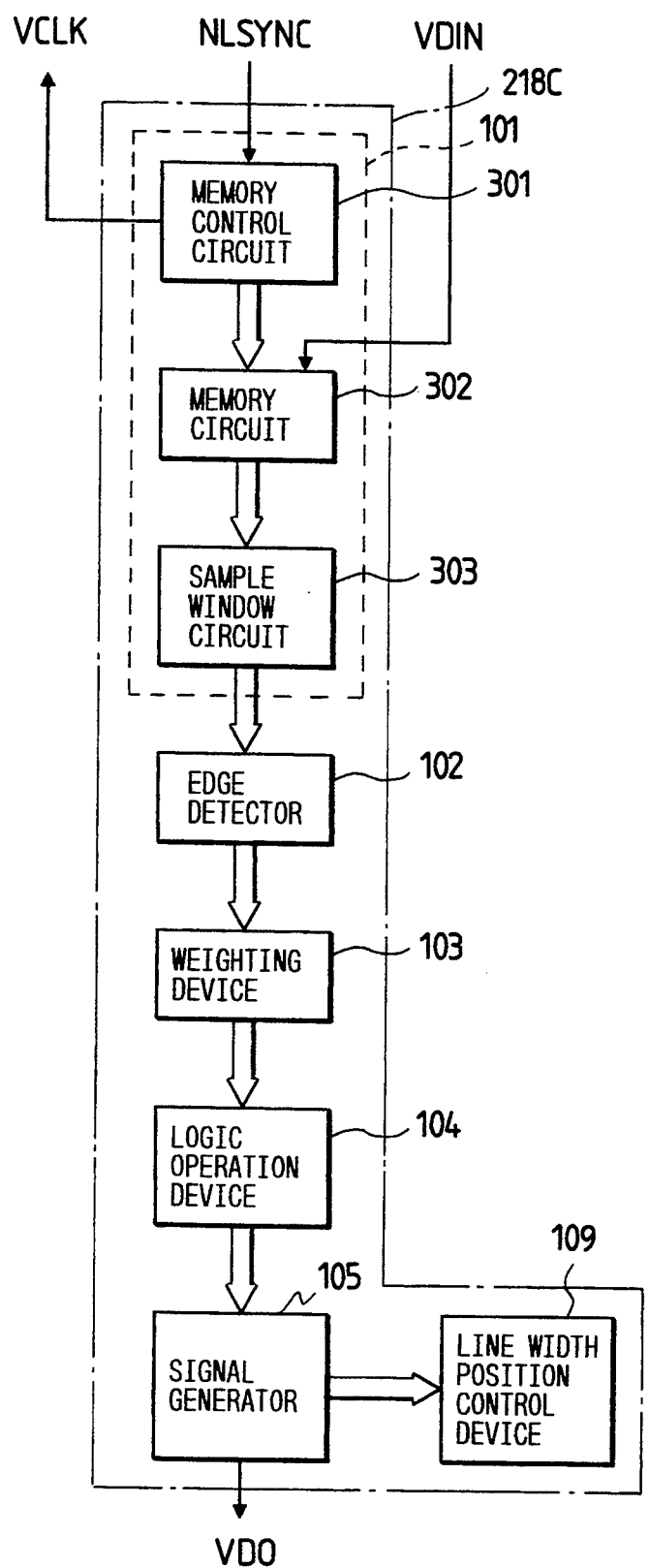
FIG. 53 is a block diagram of a correction circuit according to a fourth embodiment of this invention.

A fourth embodiment of this invention is similar to the embodiment of FIGS. 1–40 except for design changes indicated later. FIG. 53 shows a correction circuit 218C in the fourth embodiment which is basically similar to the correction circuit 218 in the embodiment of FIGS. 1–40 except that a line width position control device 109 is added but an edge data selector 106 is omitted.

Figure 54:
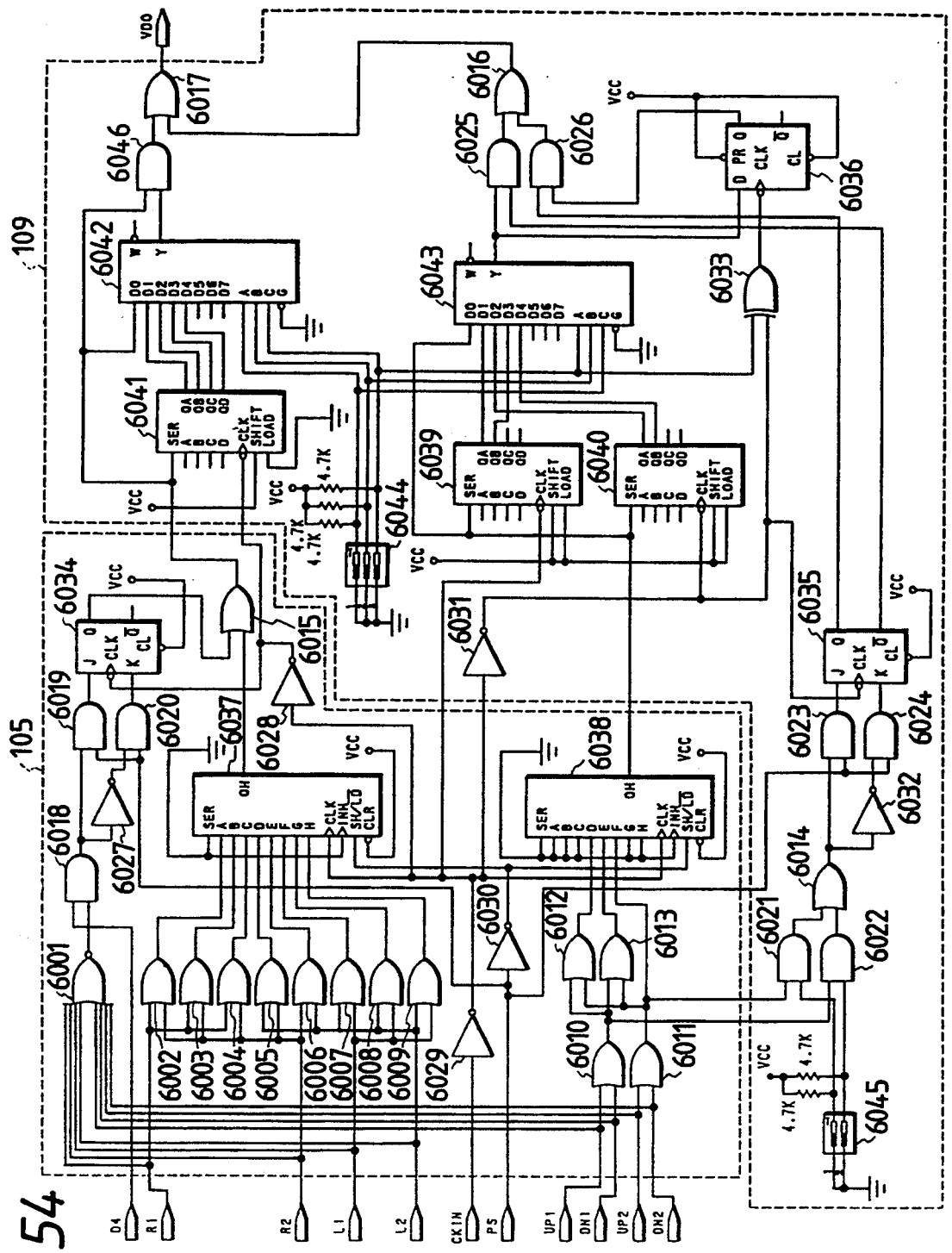
FIG. 54 is a block diagram of a circuitry forming the signal generator and the line width position control device in FIG. 53.

FIG. 54 shows a circuitry forming a signal generator 105 and the line width position control device 109. The circuitry of FIG. 54 includes an 8-input NOR gate 6001, 2-input OR gates 6002–6017, 2-input AND gates 6018–6026, inverters 6027–6032, a 2-input Exclusive-OR gate 6033, JK flip-flops 6034 and 6035, a flip-flop 6036, an 8-bit parallel-load serial-output shift register 6038, 4-bit shift registers 6039, 6040, and 6041, data selectors 6042 and 6043, switches 6044 and 6045, and a 2-input AND gate 6046.

The signal generator 105 receives the output data from the sample window circuit 303 via the signal line D4, and also receives the data from the 2-input AND gates 405–412 (see FIG. 10) via the signal lines L1, L2, R1, R2, UP1, UP2, DN1, and DN2. The data on the signal lines L1, L2, R1, and R2 are further transmitted to the 8-bit shift register 6037 via the 2-input OR gates 6002–6009. The signal which results from the correction of the central bit D4 within the sample window is outputted from the 8-bit shift register 6037 to the 2-input OR gate 6015, being then transmitted to the line width position control device 109. The data on the signal lines UP1, UP2, DN1, and DN2 are further transmitted to the 8-bit shift register 6038 via the 2-input OR gates 6010–6013. The signal which results from the correction of the central bit D4 within the sample window is outputted from the 8-bit shift register 6038 to the line width position control device 109.

When all the data on the signal lines L1, L2, R1, R2, UP1, UP2, DN1, and DN2 are "0", the 8-input NOR gate 6001 outputs data of "1" so that the data of the correction-object central bit D4 is latched by the JK flip-flop 6034. The data of the correction-object central bit D4 is outputted from the JK flip-flop 6034 to the 2-input OR gate 6015, being then fed to the line width position control device 109.

The output data from the 8-bit shift register 6037 and the JK flip-flop 6034 are fed to the 4-bit shift register 6041, the data selector 6042, and the 2-input AND gate 6046 of the line width position control device 109 via the 2-input OR gate 6015. Thereby, an initial portion of the output data which corresponds to first several clock pulses is deleted so that the horizontal width of a vertical line can be decreased. The size of the deleted portion, that is, the decrease in the horizontal width of a vertical line, is set by the switch 6044.

The left-hand sides of the uncorrected dots and the dots corrected in response to the data on the signal lines L1, L2, R1, and R2 are deleted by the 4-bit shift register 6041, the data selector 6042, and the 2-input AND gate 6046. Therefore, the positions of the dots corrected in response to the data on the signal lines UP1, UP2, DN1, and DN2 with respect to the positions of the uncorrected dots and the positions of the dots corrected in response to the data on the signal lines L1, L2, R1, and R2 are different according to whether they exist at the left-hand side or the right-hand side of the deleted dots. The signals of the dots corrected in response to the data on the signal lines UP1, UP2, DN1, and DN2 are fed to the 4-bit shift registers 6039 and 6040 and the data selector 6043, being outputted from the data selector 6043 while being shifted in phase by an amount corresponding to a half of the several-clock period set by the switch 6044 for which the deletion is done by the 4-bit shift register 6041, the data selector 6042, and the 2-input AND gate 6046.

In some cases, the black portion of a signal of the corrected dot tends would be off-centered according to the type of the data inputted into the 8-bit shift register 6038 via the signal lines UP1, UP2, DN1, and DN2. In such cases, the flip-flop 6036 further shifts the phase of the output data from the data selector 6043 by an amount corresponding to a half of the clock period, and the resultant signal is outputted from the 2-input OR gate 6016. The amount of the phase shift is set by the switch 6045.

The output data from the 2-input AND gate 6046 and the output data from the 2-input OR gate 6016 are subjected to logic OR operation by the 2-input OR gate 6017, being combined into the corrected image dot signal outputted to the signal line VDO.

The above-mentioned processes make it possible that the positions of the dots corrected in response to the data on the signal lines UP1, UP2, DN1, and DN2 with respect to the positions of the uncorrected dots and the positions of the dots corrected in response to the data on the signal lines L1, L2, R1, and R2 are equal regardless of whether they exist at the left-hand side or the right-hand side of the deleted dots.

Figure 55:
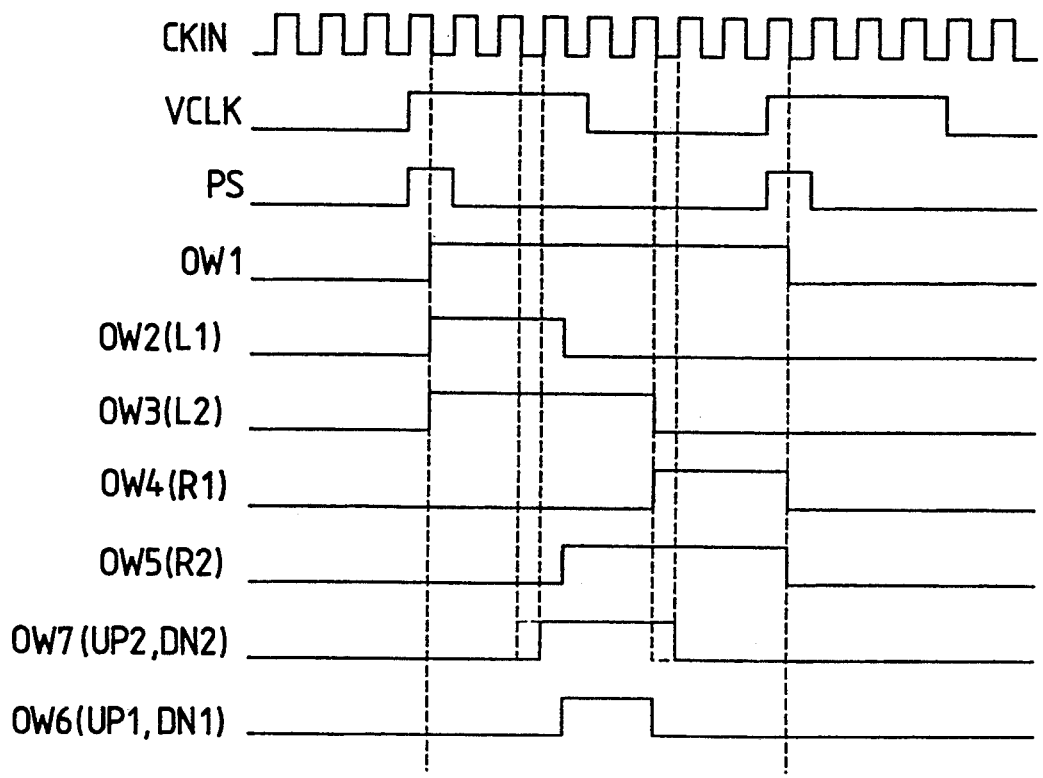
FIG. 55 is a timing diagram showing the waveforms of various signals in the circuitry of FIG. 54.

When the first, second, and third sections of the switch 6044 are in ON states, the deleted width of a dot is nullified. When the second section of the switch 6045 is in an ON state, the phase of a signal of a dot corrected in response to the data on the line UP2 and DN2 is retarded by a half of the clock period. FIG. 55 is a timing chart showing the waveforms of various corrected image dot signals, which occur in the above-mentioned cases, with respect to the data transmitted from the 2-input AND gates 405-412 (see FIG. 10) via the signal lines L1, L2, R1, R2, UP1, UP2, DN1, and DN2.

In FIG. 55, the signal OW1 is equal to an image dot signal generated when the correction-object central bit D4 in the sample window is "1" and all the data transmitted via the signal lines L1, L2, R1, R2, UP1, UP2, DN1, and DN2 are "0" (that is, the correction-object central bit D4 is free from any correction). The signals OW2-OW7 are equal to image dot signals subjected to corrections. Specifically, the corrected image dot signal OW2 is generated when the correction-object central bit D4 in the sample window is "1" and only the data transmitted via the signal line L1 is "1". The corrected image dot signal OW3 is generated when the correction-object central bit D4 in the sample window is "1" and only the data transmitted via the signal line L2 is "1". The corrected image dot signal OW4 is generated when the correction-object central bit D4 in the sample window is "1" and only the data transmitted via the signal line R1 is "1". The corrected image dot signal OW5 is generated when the correction-object central bit D4 in the sample window is "1" and only the data transmitted via the signal line R2 is "1". The corrected image dot signal OW6 is generated when the correction-object central bit D4 in the sample window is "1" and only the data transmitted via the signal line UP1 or DN1 is "1". The corrected image dot signal OW7 is generated when the correction-object central bit D4 in the sample window is "1" and only the data transmitted via the signal line UP2 or DN2 is "1". In the case where two or more of the corrected image dot signals OW2-OW7 are simultaneously generated, the generated image dot signals are combined through logic OR operation into a final corrected image dot signal VDO.

Figure 56:
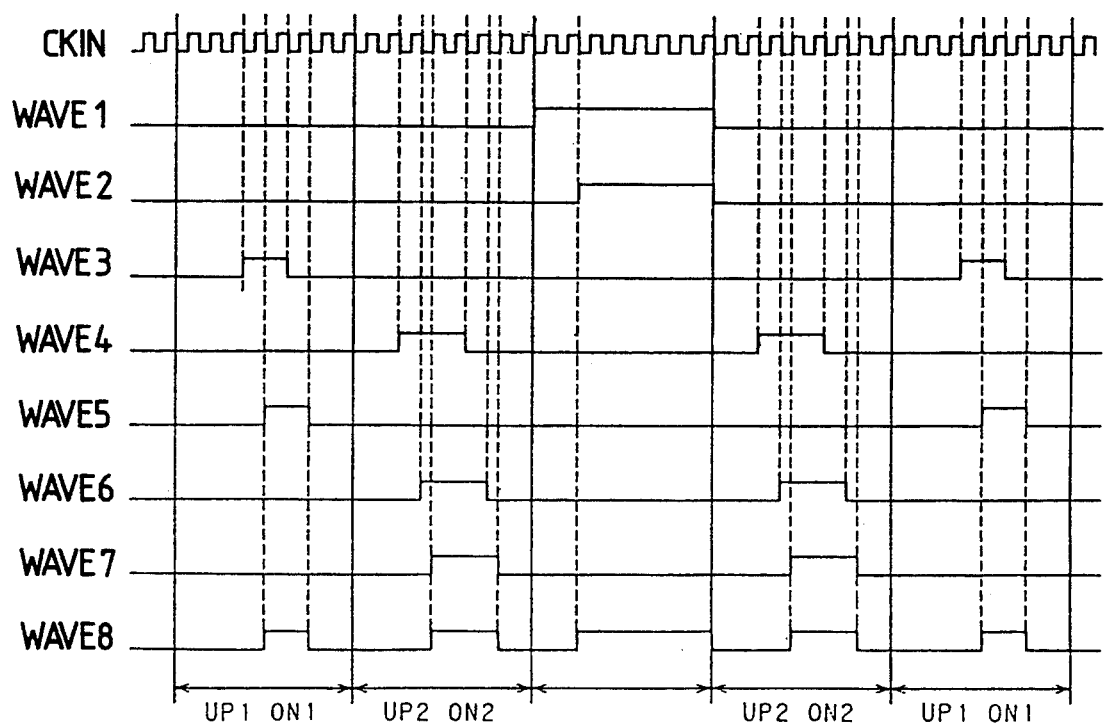
FIG. 56 is a timing diagram showing the waveforms of various signals in the circuitry of FIG. 54.

When the first and third sections of the switch 6044 are in ON states, the deleted width of a dot is set to a value corresponding to two clock periods. When the second section of the switch 6045 is in an ON state, the phase of a signal of a dot corrected in response to the data on the line UP2 and DN2 is retarded by a half of the clock period. FIG. 56 is a timing chart showing the waveforms of various signals in the circuitry of FIG. 54 which occur in the above-mentioned cases.

In FIG. 56, the signal WAVE 1 is equal to an image signal generated when the correction-object central bit D4 in the sample window is "1" and all the data transmitted via the signal lines L1, L2, R1, R2, UP1, UP2, DN1, and DN2 are "0" (that is, the correction-object central bit D4 is free from any correction). The signal WAVE1 includes a 1-dot corresponding segment which has a length equal to eight cycles of the clock signal CKIN. The signals WAVE2-WAVE7 are equal to image signals subjected to corrections. Specifically, the corrected image signal WAVE2 is an output signal from the 2-input AND gate 6046 in FIG. 54, and results from deleting a 2-clock initial black portion from the uncorrected image signal WAVE1. The corrected image signal WAVE3 is an output signal from the 8-bit shift register 6038 in FIG. 54, and corresponds to the signal which occurs in the case where the data on the signal line UP1 or DN1 is "1". The corrected image signal WAVE4 is an output signal from the 8-bit shift register 6038 in FIG. 54, and corresponds to the signal which occurs in the case where the data on the signal line UP2 or DN2 is "1". The corrected image signal WAVE5 is an output signal from the data selector 6043 in FIG. 54, and results from delaying the image signal WAVE3 by the 1-clock period which is equal to a half of the 2-clock period corresponding to the deleted 2-clock width. The corrected image signal WAVE6 is an output signal from the data selector 6043 in FIG. 54, and results from delaying the image signal WAVE4 by the 1-clock period which is equal to a half of the 2-clock period corresponding to the deleted 2-clock width. The corrected image signal WAVE7 is an output signal from the 2-input OR gate 6016 in FIG. 54, and results from delaying the image signal WAVE6 by a half of the 1-clock period. The corrected image signal, WAVE8 results from the combination of the image signals WAVE2, WAVE5, and WAVE7. In the corrected image signal WAVE8, the centers of the separated black portions (the separated "1"-level portions) are spaced by approximately equal intervals.

What is claimed is:

1. An image processing apparatus comprising:

window setting means for setting a portion of a written region of an image composed of dots in an orthogonal matrix as a window, and for moving the set portion within the written region;

first edge detecting means for detecting differences between image data of a given dot in the window set by the window setting means and image data of dots neighboring said given dot, and for detecting directions of said detected differences;

second edge detecting means for detecting edges between neighboring dots other than said given dot, said detected edges relating to image data differences and image data difference directions respectively equal to the image data differences and the image data difference directions detected by said first edge detecting means;

calculating means for providing said edges, detected by said second edge detecting means, with predetermined coefficients respectively, and for adding said predetermined coefficients for said edges detected by said second edge detecting means to calculate a sum of said predetermined coefficients; and signal generating means for generating an image signal which varies a size of said given dot in accordance with the sum of the predetermined coefficients which is calculated by said calculating means.

2. An image processing apparatus comprising:
window setting means for setting a portion of a written region of an image composed of dots in an orthogonal matrix as a window, and for moving the set portion within the written region;
first edge detecting means for detecting differences between image data of a given dot in the window set by the window setting means and image data of dots neighboring said given dot, and for detecting directions of said detected differences;
second edge detecting means for detecting edges between neighboring dots other than said given dot, said detected edges relating to image data differences and image data difference directions respectively equal to the image data differences and the image data difference directions detected by said first edge detecting means;
weighting means for setting predetermined values with respect to said edges detected by said second edge detecting means respectively, said predetermined values depending on positions of the related edges relative to a position of an edge corresponding to the image data differences and the image data difference directions detected by said first edge detecting means;
calculating means for adding said predetermined values set by said weighting means to calculate a sum of said predetermined values; and
signal generating means for generating an image signal which varies a size of said given dot in accordance with the sum of the predetermined values which is calculated by said calculating means.

3. An image processing apparatus comprising:
window setting means for setting a portion of a written region of an image composed of dots in an orthogonal matrix as a window, and for moving the set portion within the written region;
first edge detecting means for detecting differences between image data of a given dot in the window set by the window setting means and image data of dots neighboring said given dot, and for detecting directions of said detected differences;
second edge detecting means for detecting edges between neighboring dots other than said given dot, said detected edges relating to image data differences and image data difference directions respectively equal to the image data differences and the image data difference directions detected by said first edge detecting means;
weighting means for setting predetermined values with respect to said edges detected by said second edge detecting means respectively, said predetermined values depending on positions of the related edges relative to a position of an edge corresponding to the image data differences and the image data difference directions detected by said first edge detecting means, said predetermined values increasing as the positions of the related edges, which lie on extensions of an inter-dot boundary opposite the edge detected by said first edge detecting means, are closer to said given dot;
calculating means for adding said predetermined values set by said weighting means to calculate a sum of said predetermined values; and
signal generating means for generating an image signal which varies a size of said given dot in accordance with the sum of the predetermined values which is calculated by said calculating means.

4. The image processing apparatus of claim 2, wherein said signal generating means comprises means for selecting one of predetermined dot sizes, and for setting the size of said given dot equal to said selected one of the predetermined dot sizes.

5. The image processing apparatus of claim 2, wherein said signal generating means comprises means for outputting the image signal which does not vary the size of said given dot when said first edge detecting means detects the differences between the image data of said given dot in the window set by the window setting means and the image data of the dots neighboring said given dot in three difference directions.

6. The image processing apparatus of claim 2, further comprising means for, when said second edge detecting means detects an edge of a prescribed position in the window, limiting an output of data of an edge of a position having a specified relation with said prescribed position.

7. The image processing apparatus of claim 2, further comprising correction direction setting means for setting a direction in which the size of said given dot is varied, and wherein the image signal varies the size of said given dot in accordance with the sum of the predetermined values which is calculated by said calculating means when edges detected by said first edge detecting means contain edges in a direction equal to the direction set by the correction direction setting means.

8. The image processing apparatus of claim 2, further comprising means for, when the image signal generated by said signal generating means is varying the size of said given dot in accordance with the sum of the predetermined values which is calculated by said calculating means, correcting the image signal generated by said signal generating means so as to equalize distances between centers of neighboring dots.

9. The image processing apparatus of claim 1, further comprising a laser beam printer for forming an image in accordance with the image signal generated by said signal generating means.

10. The image processing apparatus of claim 2, further comprising a laser beam printer for forming an image in accordance with the image signal generated by said signal generating means.

11. An apparatus for processing biostate pixel-corresponding signals, wherein an image is composed of an array of bi-state pixels represented by the bi-state pixel-corresponding signals respectively, wherein an edge is defined as a boundary between pixels which are represented by bi-state pixel-corresponding signals having different states respectively, and wherein the bi-state pixels are classified into a pixel of interest and pixels of non-interest which surround the pixel of interest, the apparatus comprising:
first detecting means for detecting whether or not a first edge adjoining the pixel of interest is present;
selecting means for selecting boundaries between pixels of non-interest, the selected boundaries extending in positions having predetermined relations with a position of the first edge detected by the first detecting means;
second detecting means for, when the first detecting means detects that a first edge adjoining the pixel of interest is present, detecting second edges extending at the boundaries selected by the selecting means;

calculating means for calculating a number of the second edges detected by the second detecting means;

means for converting the bi-state pixel-corresponding signal representing the pixel of interest into an analog signal; and means for correcting the analog signal in accordance with the number of the second edges which is calculated by the calculating means.

12. An apparatus for processing bi-state pixel-corresponding signals, wherein an image is composed of an array of bi-state pixels represented by the bi-state pixel-corresponding signals respectively, wherein an edge is defined as a boundary between pixels which are represented by bi-state pixel-corresponding signals having different states respectively, and wherein the bi-state pixels are classified into a pixel of interest and pixels of non-interest which surrounds the pixel of interest, the apparatus comprising:

first detecting means for detecting whether or not a first edge adjoining the pixel of interest is present;

selecting means for selecting boundaries between pixels of non-interest, the selected boundaries extending in positions having predetermined relations with a position of the first edge detected by the first detecting means;

second detecting means for, when the first detecting means detects that a first edge adjoining the pixel of interest is present, detecting second edges extending at the boundaries selected by the selecting means;

weighting means for providing a weight value to the first edge detected by the first detecting means, and for providing weight values to the second edges detected by the second detecting means respectively, wherein the weight values of the second edges are varied as a function of the positions of the second edges relative to the position of the first edge detected by the first detecting means;

calculating means for calculating a sum of the weight values of the first and second edges which are provided by the weighting means;

means for converting the bi-state pixel-corresponding signal representing the pixel of interest into an analog signal; and means for correcting the analog signal in accordance with the sum which is calculated by the calculating means.

13. An image processing apparatus comprising:

window setting means for setting a portion of a region of an image composed of dots in an orthogonal matrix as a window, and for moving the set portion within the written region;

edge detecting means for detecting differences between image data of neighboring dots in the window set by the window setting means, and detecting directions of said detected differences to detect edges;

calculating means for multiplying coefficient with respect to said edges detected by said edge detecting means respectively, and calculating a sum of results of said multiplying; and means for varying a size of a given dot in accordance with the sum calculated by said calculating means.

14. An image processing apparatus comprising:

window setting means for setting a portion of a region of an image composed of dots in an orthogonal matrix as a window, and for moving the set portion within the written region;

edge detecting means for detecting differences between image data of a given dot in the window set by the window setting means and image data of dots neighboring said given dot, for detecting directions of said detected differences, and for detecting edges between neighboring dots other than said given dot, said detected edges relating to image data differences and image data difference directions respectively equal to said detected image data differences and said detected image data difference directions;

calculating means for multiplying coefficients with respect to said edges detected by said edge detecting means respectively, and calculating a sum of results of said multiplying; and means for varying a size of said given dot in accordance with the sum calculated by said calculating means.

* * * * *